US010880682B2

(12) United States Patent
Liang et al.

(10) Patent No.: US 10,880,682 B2
(45) Date of Patent: *Dec. 29, 2020

(54) SYSTEMS AND METHODS FOR CREATING AND USING GEO-BLOCKS FOR LOCATION-BASED INFORMATION SERVICE

(71) Applicant: xAd, Inc., New York, NY (US)

(72) Inventors: Can Liang, Mountain View, CA (US); Huitao Luo, Fremont, CA (US); Pravesh Katyal, Mountain View, CA (US); Saravana Ravindran, Mountain View, CA (US); Hari Venkatesan, Cupertino, CA (US); Yi Jia, San Jose, CA (US); Shashi Seth, Mountain View, CA (US)

(73) Assignee: XAD, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,191

(22) Filed: Jan. 28, 2020

(65) Prior Publication Data

US 2020/0245096 A1 Jul. 30, 2020

Related U.S. Application Data

(63) Continuation of application No. 16/397,368, filed on Apr. 29, 2019, now Pat. No. 10,547,971, which is a
(Continued)

(51) Int. Cl.
*H04W 4/021* (2018.01)
*H04W 4/18* (2009.01)
(Continued)

(52) U.S. Cl.
CPC ............ *H04W 4/021* (2013.01); *G06N 20/00* (2019.01); *H04W 4/029* (2018.02); *H04W 4/185* (2013.01)

(58) Field of Classification Search
CPC ....... H04W 4/21; H04W 72/06; H04W 88/02; H04W 4/021; H04W 4/022; H04W 4/023;
(Continued)

(56) References Cited

U.S. PATENT DOCUMENTS

| 7,574,661 B2 | 8/2009 | Matsura et al. |
| 8,438,127 B2 | 5/2013 | Kurata et al. |

(Continued)

FOREIGN PATENT DOCUMENTS

| WO | WO-2013184603 A1 * | 12/2013 | ............ H04W 4/029 |
| WO | WO-2015058123 A1 * | 4/2015 | ............ H04L 67/22 |

(Continued)

OTHER PUBLICATIONS

Xad, Inc, Notice of Allowance, U.S. Appl. No. 16/660,686, filed Mar. 3, 2020, 11 pgs.
(Continued)

*Primary Examiner* — Matthew C Sams
(74) *Attorney, Agent, or Firm* — Morgan, Lewis & Bockius LLP

(57) ABSTRACT

A system coupled to a packet-based network is configured to generate geo-blocks for location-based information services. Each of the geo-blocks corresponds to a geographical region within a geographical area and has at least one border defined by a real-world object. The system is configured to obtain geo data related to real-world objects including transportation routes and natural boundaries in the geographical area, partition the geographical area into initial geo-blocks using the geo data, process a plurality of information requests with respect to at least some of the initial geo-blocks and with respect to initial geo-fences associated with a plurality of points of interests (POIs) to generate entries in one or more databases, and enrich at least some of the initial geo-block with block-level meta data extracted
(Continued)

from the entries in the one or more databases to form enriched geo-blocks that are highly indicative of location dependent attributes such as intention and demographics.

24 Claims, 37 Drawing Sheets

Related U.S. Application Data continuation of application No. 15/999,330, filed on Aug. 17, 2018, now Pat. No. 10,278,014, which is a continuation-in-part of application No. 15/344,482, filed on Nov. 4, 2016, now Pat. No. 10,165,403.

(60) Provisional application No. 62/251,090, filed on Nov. 4, 2015.

(51) Int. Cl.
*G06N 20/00* (2019.01)
*H04W 4/029* (2018.01)

(58) Field of Classification Search
CPC .......... H04L 43/16; G06Q 30/0261; G06Q 30/0259; G06Q 30/0267; G06Q 30/0201; H04M 1/72522
See application file for complete search history.

(56) References Cited

U.S. PATENT DOCUMENTS

| | | |
|---|---|---|
| 8,832,003 B1 | 9/2014 | Bowers et al. |
| 9,280,749 B1 | 3/2016 | Porteous et al. |
| 9,602,970 B1 | 3/2017 | Mahapatra |
| 9,706,355 B1 | 7/2017 | Cali et al. |
| 9,712,970 B2 | 7/2017 | Barrand et al. |
| 9,838,843 B1 | 12/2017 | Bajaj et al. |
| 9,841,286 B1 | 12/2017 | Hayward |
| 9,928,468 B2 | 3/2018 | Katsuki et al. |
| 10,064,007 B1 | 8/2018 | Deluca et al. |
| 10,149,111 B1 | 12/2018 | Subbian |
| 10,165,403 B2 | 12/2018 | Liang et al. |
| 10,217,028 B1 | 2/2019 | Wang et al. |
| 10,278,014 B2 | 4/2019 | Liang et al. |
| 10,349,208 B1 | 7/2019 | Liang et al. |
| 10,455,363 B2 | 10/2019 | Liang et al. |
| 2002/0111172 A1 | 8/2002 | DeWolf et al. |
| 2003/0064735 A1 | 4/2003 | Spain et al. |
| 2006/0156209 A1 | 7/2006 | Matsura et al. |
| 2007/0026870 A1 | 2/2007 | Spain et al. |
| 2007/0233631 A1 | 10/2007 | Kobayashi et al. |
| 2010/0312599 A1 | 12/2010 | Durst |
| 2011/0081634 A1 | 4/2011 | Kurata et al. |
| 2011/0099045 A1 | 4/2011 | Carr et al. |
| 2011/0244919 A1 | 10/2011 | Aller et al. |
| 2012/0053991 A1 | 3/2012 | Shimizu et al. |
| 2012/0179534 A1 | 7/2012 | Moukas et al. |
| 2012/0284769 A1 | 11/2012 | Dixon et al. |
| 2013/0006522 A1 | 1/2013 | Vellaikal et al. |
| 2013/0066818 A1 | 3/2013 | Assadollahi et al. |
| 2013/0073388 A1 | 3/2013 | Heath |
| 2013/0099977 A1 | 4/2013 | Sheshadri et al. |
| 2013/0225282 A1 | 8/2013 | Williams et al. |
| 2013/0231137 A1 | 9/2013 | Hugie et al. |
| 2013/0275511 A1 | 10/2013 | Wilson et al. |
| 2013/0304869 A1 | 11/2013 | Gupta et al. |
| 2013/0324160 A1 | 12/2013 | Sabatellil et al. |
| 2014/0018096 A1 | 1/2014 | Jagannath |
| 2014/0045529 A1* | 2/2014 | Bolon .............. H04W 4/021 455/456.1 |
| 2014/0053261 A1 | 2/2014 | Gupta et al. |
| 2014/0150100 A1 | 5/2014 | Gupta et al. |
| 2014/0164118 A1 | 6/2014 | Polachi |
| 2014/0164369 A1 | 6/2014 | Nichols et al. |
| 2014/0317734 A1 | 10/2014 | Valencia et al. |
| 2014/0337862 A1 | 11/2014 | Valencia et al. |
| 2014/0342337 A1 | 11/2014 | Bowden et al. |
| 2014/0365307 A1 | 12/2014 | Cheung |
| 2015/0066593 A1 | 3/2015 | Huang et al. |
| 2015/0213497 A1 | 7/2015 | Jain et al. |
| 2015/0278864 A1 | 10/2015 | McDevitt |
| 2015/0287072 A1 | 10/2015 | Golden et al. |
| 2015/0332329 A1 | 11/2015 | Luo et al. |
| 2015/0341747 A1 | 11/2015 | Barrand et al. |
| 2016/0094944 A1 | 3/2016 | Kong et al. |
| 2017/0013408 A1 | 1/2017 | Grzywaczewski et al. |
| 2017/0127233 A1 | 5/2017 | Liang et al. |
| 2017/0161659 A1 | 6/2017 | Goldstein et al. |
| 2017/0164649 A1 | 6/2017 | La Cagnina |
| 2017/0171704 A1 | 6/2017 | Frenz |
| 2017/0289756 A1 | 10/2017 | Barrand et al. |
| 2018/0260393 A1 | 9/2018 | Liang et al. |
| 2018/0350144 A1* | 12/2018 | Rathod .............. G06Q 20/3276 |
| 2019/0007793 A1 | 1/2019 | Liang et al. |
| 2019/0014441 A1 | 1/2019 | Diamanti et al. |
| 2019/0045331 A1 | 2/2019 | Liang et al. |
| 2019/0098448 A1 | 3/2019 | Jain et al. |
| 2019/0114544 A1 | 4/2019 | Sundaram et al. |
| 2020/0003472 A1 | 1/2020 | Narendra |

FOREIGN PATENT DOCUMENTS

| | | | |
|---|---|---|---|
| WO | WO 2017/079697 A1 | 5/2017 | |
| WO | WO 2016/183766 A1 | 11/2017 | |
| WO | WO-2018092016 A1 * | 5/2018 | ............ G06F 16/29 |

OTHER PUBLICATIONS

Liang, Notice of Allowance, U.S. Appl. No. 15/344,482, filed Apr. 19, 2018, 13 pgs.
Liang, Notice of Allowance U.S. Appl. No. 15/999,330, filed Dec. 7, 2018, 11 pgs.
xAd, Inc., International Search Report and Written Opinion, PCT/US2016/060727, dated Mar. 31, 2017, 7 pgs.
xAd, Inc., International Preliminary Report on Patentability, PCT/US2016/060727, dated May 8, 2018, 6 pgs.
Groundtruth, Inc., International Search Report / Written Opinion, PCT/US2018/055293, dated Dec. 21, 2018, 9 pgs.
xAd, Inc., Letter of Decision, Japanese Patent Application No. JP 2018-522739, Jan. 7, 2020, 3 pgs.
xAd, Inc., Examination Report No. 1, Australian Patent Application No. AU 2016349513, dated Jun. 18, 2019, 4 pgs.
xAd, Inc., Office Action, Japanese Patent Application No. JP 2018-522739, dated May 13, 2019, 8 pgs.
xAd Inc., Extended Search Report, EU 16863131.5, dated Jun. 13, 2019, 12 pgs.
Liang, Non-Final Office Action, U.S. Appl. No. 16/506,940, dated Jun. 25, 2020, 6 pgs.
Xad, Inc., Office Action, Japanese Patent Application No. 2018-522739, dated Jul. 29, 2020, 5 pgs.
Xad, Inc., Decision to Grant EP Application No. 16863131.5, dated Jun. 5, 2020, 2 pgs.
Xad, Inc., Notice of Acceptance for Patent Application, AU Application No. 2016349513, dated Jun. 24, 2020, 3 pgs.
Xad, Inc., Response to Second Exam Report AU Patent Application No. 2016349513, dated Jun. 4, 2020, 2 pgs.

* cited by examiner

| Fence ID | Fence Type | Category | Name/Brand | Municipality | Spatial Data | Doc ID |
|---|---|---|---|---|---|---|
| 19-35175 | BC | General | Costco | US/CA/Almaden | a1, a2, ..., ai | 132475 |
| 19-35176 | BP | General | Costco | US/CA/Almaden | b1, b2, ..., bj | 135678 |
| 19-35177 | BR | General | Costco<br>T.J Maxx<br>Red Lobster<br>Trader Joe's<br>Chevy's<br>Barnes&Nobel<br>...<br>Almaden Plaza | US/CA/Almaden | c1, c2, ..., ck | 136572 |
| 19-35163 | BC | Department | T.J Maxx | US/CA/Almaden | d1, d2, ..., dl | 156321 |
| 19-35164 | BP | Department | T.J Maxx | US/CA/Almaden | e1, e2, ..., em | 154376 |
| 19-35151 | BC | Grocery | Trader Joe's | US/CA/Almaden | f1, f2, ..., fn | 256321 |
| | | ...... | | ...... | ...... | |

FIG. 5

| Geo-Bock ID | Spatial Data | Meta Data | | | | |
|---|---|---|---|---|---|---|
| | | City/State | Functionality | Major POI | Demographic | inventory |
| ...... | ...... | ...... | ...... | ...... | ...... | ...... |
| 1234568 | a1, a2, ..., ai | Santa Clara/CA | Residential | Santa Clara High School | ...... | ...... |
| 1234569 | b1, b2, ..., bj | Santa Clara/CA | Retail | New India Bazar | ...... | ...... |
| 1234570 | c1, c2, ..., ck | Santa Clara/CA | Residential | Pomeroy Elementary | ...... | ...... |
| 1234571 | d1, d2, ..., dl | Santa Clara/CA | Retail | Moonlite Shopping Center | ...... | ...... |
| ...... | ...... | ...... | ...... | ...... | ...... | ...... |
| 1234573 | f1, f2, ..., fn | Santa Clara/CA | Recreational | Branham Park | ...... | ...... |
| ...... | ...... | ...... | ...... | ...... | ...... | ...... |

FIG. 7

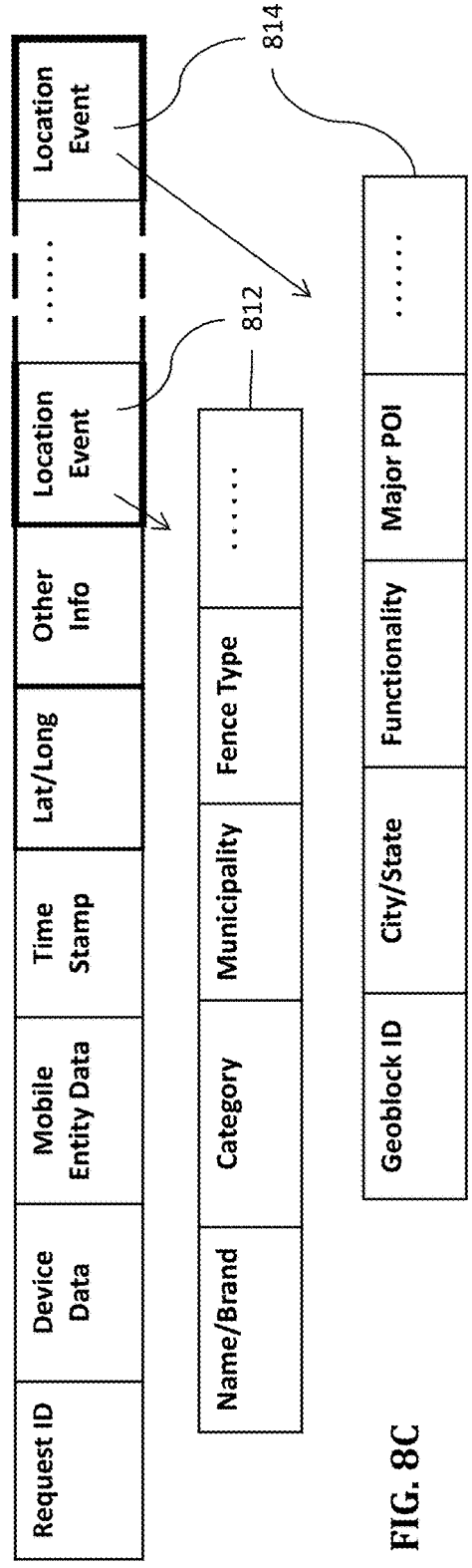

| Packet ID | Device Information | | User Information | | | | Location Events | | | | App Used | Time Stamp | |
|---|---|---|---|---|---|---|---|---|---|---|---|---|---|
| | UID | Make/Model | Age | Gender | Ed | Lat/Long | Geo-Fence | Fence Type | Geo-Block | | | Day | Hour |
| 0136819976 | 36****412 | Samsung 1179 | 23 | M | G/S | x.x/x..x | B175 | X | 396841 | | A310 | 1/1/2018 | 12:55 |
| 0136819975 | XX****XXX | Iphone 5 | 47 | F | HS | x.x/x..x | B138 | Y | 547412 | | A298 | 1/1/2018 | 12:53 |
| 0136819974 | XX****XXX | Nokia 2300 | 25 | M | C/U | x.x/x..x | B176 | Y | 681247 | | A215 | 1/1/2018 | 12:53 |
| 0136819973 | XX****XXX | Nokia 4566 | 36 | F | HS | x.x/x..x | Null | Null | 559654 | | A027 | 1/1/2018 | 12:52 |
| 0136819972 | 36****412 | Samsung 1179 | 23 | M | G/S | x.x/x..x | B175 | Z | 396841 | | A310 | 1/1/2018 | 12:51 |
| ... | ... | ... | ... | ... | ... | x.x/x..x | ... | ... | ... | | ... | ... | ... |
| 0125785238 | XX****XXX | Samsung 1179 | 42 | F | C/U | x.x/x..x | B168 | Y | 546987 | | A547 | 11/24/2017 | 10:31 |
| 0125785237 | XX****XXX | Iphone 5 | 47 | F | HS | x.x/x..x | Null | Null | 135748 | | a1 | 11/24/2017 | 10:30 |

FIG. 9

| Packet ID | User Information | | | | | Feedback | | | Time Stamp | |
|---|---|---|---|---|---|---|---|---|---|---|
| | UID | Make/Model | Age | Gender | Other Info | Doc ID | App Used | Event | Day | Hour |
| 2031459874 | 23***214 | Iphone 7 | 21 | F | C/U | D325 | A537 | Click | 1/1/2018 | 12:57 |
| 5236874125 | 52***256 | Iphone 6S | 36 | F | G/S | D078 | A082 | Impression | 1/1/2018 | 12:58 |
| 0256897412 | 21***457 | Samsung 1179 | 52 | M | C/U | D133 | A219 | S/A | 1/1/2018 | 12:59 |
| 3201456852 | 57***479 | Iphone 6 | 47 | F | G/S | D021 | A164 | Call | 1/1/2018 | 13:00 |
| 1023547592 | 27***870 | Nokia 4566 | 53 | M | HS | D657 | A065 | Impression | 1/1/2018 | 13:01 |
| ⋮ | ⋮ | ⋮ | ⋮ | ⋮ | ⋮ | | | | ⋮ | ⋮ |
| | 65***431 | Samsung 1179 | 18 | F | HS | D829 | A013 | Click | 11/24/2017 | 10:51 |
| 0134792033 | 55**458 | Nokia 4566 | 27 | F | C/U | D368 | A397 | Impression | 11/24/2017 | 10:52 |

| UID | Device & User Meta Data | | | | | | | | |
|---|---|---|---|---|---|---|---|---|---|
| | Age | G | E | ... | GBx | | | GBy | |
| | | | | | Number of Visits | Time of Last Visit | Average Length of Stay | Number of Visits | Time of Last Visit | Average Length of Stay |

| | | | | | TB1 | TB2 | TB3 | | | TB1 | TB2 | TB3 | | |
|---|---|---|---|---|---|---|---|---|---|---|---|---|---|---|
| 36***412 | 35 | M | C | ... | 10 | 7 | 3 | 8 | 0.2 | 0 | 0 | 21 | 2 | 0.7 |

Bx

| Number of Visits | | | Time of Last Visit | Average Length of Stay |
|---|---|---|---|---|
| TB1 | TB2 | TB3 | | |
| 0 | 5 | 2 | 6 | 0.3 |

By

| Number of Visits | | | Time of Last Visit | Average Length of Stay |
|---|---|---|---|---|
| TB1 | TB2 | TB3 | | |
| 3 | 9 | 0 | 3 | 0.5 |

Docx

| Imp | C/C | S/A |
|---|---|---|
| 6 | 0 | 0 |

Docy

| Imp | C/C | S/A |
|---|---|---|
| 3 | 1 | 1 |

Appx

| Number of Uses | | | Time of Last Use | Average Length of Use |
|---|---|---|---|---|
| TB1 | TB2 | TB3 | | |
| 4 | 0 | 8 | 1 | 0.1 |

Appy

| Number of Uses | | | Time of Last Use | Average Length of Use |
|---|---|---|---|---|
| TB1 | TB2 | TB3 | | |
| 0 | 0 | 30 | 2 | 0.5 |

1420

36***412; 35, M, C, ...; GBx: 10, 7, 3, 8, 0.2, GB3; ...; Gby: 0, 0, 21, 2, 0.7, GB9; TBx: 0, 5, 6, 0.3, GB55; ...; TBy: 3, 9, 0, 3, 0.5, GB6; Docx: 6, 0, 0; ...; Docy: 3, 1, 1; Appx:4, 0, 8, 1, 0.1; Appy: 0, 0, 30, 2, 0.5; ...

FIG. 14

| UID | Device & User Meta Data | | | | GBB₁ | | | | GBBₘ | | | |
|---|---|---|---|---|---|---|---|---|---|---|---|---|
| | Age | G | E | ... | Number of Visits | | | Time of Last Visit | Average Length of Stay | Number of Visits | | | Time of Last Visit | Average Length of Stay |
| | | | | | TB1 | TB2 | TB3 | | | TB1 | TB2 | TB3 | | |
| 52**256 | 35 | M | C | | 32 | 15 | 21 | 3 | 0.7 | 16 | 5 | 83 | 1 | 1 |

| BB₁ (or BBB₁) | | | | | | BBₙ (or BBBₙ) | | | | |
|---|---|---|---|---|---|---|---|---|---|---|
| Number of Visits | | | Time of Last Visit | Average Length of Stay | Number of Visits | | | Time of Last Visit | Average Length of Stay |
| TB1 | TB2 | TB3 | | | TB1 | TB2 | TB3 | | |
| 11 | 0 | 3 | 12 | 0.8 | 0 | 25 | 7 | 3 | 0.3 |

| Mobility | | Retail Geoblocks | |
|---|---|---|---|
| Brands | GB Ratio | Weighted Visits | Net Visits |
| 27 | 0.08 | 3.2 | 11 |

| MFVGB-1 | | | | | MFVGB-n | | | | |
|---|---|---|---|---|---|---|---|---|---|
| Number of Visits | | | Distance from nearest location in the location group | Number of Visits | | | Distance from nearest location in the location group |
| TB1 | TB2 | TB3 | | TB1 | TB2 | TB3 | |
| 37 | 0 | 82 | 3.6 | 3 | 21 | 35 | 5.7 |

| Feedbacks | | |
|---|---|---|
| Pre-exposure | C/C Ratio | S/A Ratio |
| 17 | 0.06 | 0.00 |

FIG. 16

| UID | LG | Off-Line Prediction Results | | | |
|---|---|---|---|---|---|
| | | P1 (TF1) | P2 (TF2) | ...... | Pn (TFn) |
| 36\*\*\*412 | xxxxxx | 2% | 7% | ...... | 15% |
| 56\*\*\*845 | xxxxxx | xx% | xx% | ...... | xx% |
| 36\*\*\*963 | xxxxxx | xx% | xx% | ...... | xx% |
| 45\*\*\*895 | xxxxxx | xx% | xx% | ...... | xx% |
| 36\*\*\*412 | ...... | ...... | ...... | ...... | ...... |
| 78\*\*\*697 | xxxxxx | xx% | xx% | ...... | xx% |
| 56\*\*\*845 | xxxxxx | xx% | xx% | ...... | xx% |

FIG. 18

Device & User Meta Data

| UID | Age | G | E | ... | ... |
|---|---|---|---|---|---|
| 52**256 | 35 | M | C | ... | ... |

Most recently used App

| App Name | Version | Duration (Hr) |
|---|---|---|
| Google Map | xxx | 0.05 |

Most recently visited Geo-Block

| Related MFVGB | Functionality | Time (Hr) | Length of Stay (Hr) | Distance to LG? (Miles) |
|---|---|---|---|---|
| 0 | Retail | 0.3 | 0.3 | 1.2 |

Most recently visited Brand

| Brand Category | Time (Hour) | Length of Stay (Hour) | Distance to LG? (Miles) |
|---|---|---|---|
| Restaurant | 0.8 | 0.5 | 1.5 |

| # of Brands Visited | # of GB's Visited |
|---|---|
| 2 | 3 |

Distances to LG from Locations in different time intervals (Miles)

| t1 | t2 | t3 | t4 | t5 |
|---|---|---|---|---|
| 1.5 | 1.5 | 1.3 | 1.2 | 1.2 |

| Hour of Day | Day of Week | Weather |
|---|---|---|
| 10:00 | Sat | 0, 7 |

| Speed (miles/hr) | Road | City |
|---|---|---|
| 25 | 32571 | 28750 |

Off-Line labels (or Prediction Result)

| P1 | P2 | ... | Pn |
|---|---|---|---|
| 0.11 | 0.17 | ... | 0.25 |

FIG. 21

| Data Groups | Device Information | | User Information | | | Location Information | | Time of Request | |
|---|---|---|---|---|---|---|---|---|---|
| | IMEI | Make/Model | Age | Gender | Education | Device Location | Block ID | Day | Hour |
| 1 | 22****369 | Iphone 4 | 22 | F | C/U | (38.45, -102.27) | 0237456 | 8/1/2015 | 09:55 |
| 2 | 56****845 | Iphone 5 | 17 | F | HS | (45.32, -110.78) | 1125789 | 8/1/2015 | 09:53 |
| 3 | 36****963 | Nokia 2300 | 25 | M | C/U | (45.35, -110.75) | 1245879 | 81/2015 | 09:53 |
| 4 | 45****895 | Nokia 4566 | 36 | F | HS | (39.45, -104.98) | 6587498 | 8/1/2015 | 09:32 |
| 5 | 36****412 | Samsung 1179 | 23 | M | G/S | (45.33, -110.76) | 5236478 | 8/1/2015 | 09:21 |
| ... | ... | ... | ... | ... | ... | ... | | | |
| 9975 | 78****697 | Samsung 1179 | 22 | F | C/U | (45.35, -110.74) | 7854216 | 7/31/2015 | 10:01 |
| 9976 | 75****326 | Nokia 4500 | 40 | M | HS | (30.14, -98.25) | 5468785 | 7/31/2015 | 10:00 |
| ... | ... | ... | ... | ... | ... | ... | | | |

FIG. 28

SYSTEMS AND METHODS FOR CREATING AND USING GEO-BLOCKS FOR LOCATION-BASED INFORMATION SERVICE

CROSS REFERENCE TO RELATED APPLICATION

The present application is a continuation of U.S. patent application Ser. No. 16/397,368, filed Apr. 29, 2019, which is a continuation of U.S. patent application Ser. No. 15/999,330, filed Aug. 17, 2018, now U.S. Pat. No. 10,278,014, which a continuation-in-part of U.S. patent application Ser. No. 15/344,482, filed Nov. 4, 2016, now U.S. Pat. No. 10,165,403, which claims priority to U.S. Provisional Application No. 62/251,090, filed Nov. 4, 2015, entitled "Systems and Methods for Creating and Using Geo-Blocks." Each of the above-referenced applications is incorporated herein by reference in its entirety.

FIELD

The present disclosure is related to location-based information services, and more particularly to systems and methods for creating and using geo-blocks to process information requests associated with mobile devices communicating with a packet-based network.

DESCRIPTION OF RELATED ART

Mobile device locations are becoming more commonly available to mobile service providers. A main challenge in location-based information services is how to effectively translate location signals, which are typically expressed in (latitude, longitude) pairs, into meaningful signals such as intention, demographics, and lifestyles that are useful for serving relevant information to mobile device users.

Existing location-based targeting systems make use of various static geo-fences that mark a set of geographical regions. Some examples of this type of geo-fences include zipcode boundaries and circles centered at certain business entities. In the context of mobile advertising, before the start of an ad campaign, a geo-fence for the campaign is defined based on industry standard practices, considerations of various performance metrics as well as the total volume of reachable mobile device users. During the campaign, each user's real time location is checked with respect to the predefined geo-fence and users that are inside the geo-fence become potential candidates for receiving advertisements (or ads). In reality, many complications, such as the randomness in user behavior, uncertainty in location signal generation, coexisting competing service providers, collectively render a reachable volume of mobile device users highly unpredictable. As a result, the design of geo-fences often needs to ensure a large safety margin of reachable user volume, at the cost of significantly limiting the space for performance optimization.

Zip code has been used for location-based targeting, where a location signal (e.g., latitude/longitude pair) is first mapped to a zip code, and advertisement targeting, inventory analysis, and behavior analysis are carried out at the zip code level. One advantage of this approach is that zip code level demographic profiles are easily available through government sources. In many cases, however, areas sharing the same zip code tend to serve wildly different functionalities and include a diverse range of communities. Consequently, zip codes often fail to provide satisfactory mapping from location to signals mentioned above for serving relevant information to mobile device users.

As an improvement to zip code level partitioning, PlaceIQ proposed to cover the world with 1 billion 100 meter by 100 meter virtual tiles. (See http://www.placeiq.com/2013/11/27/placeiq-patent-validates-innovative-approach-to-mobile-targeting/). This approach divides or groups real world objects in arbitrary fashion and falls short in capturing similarities or highlight differences between nearby tiles when they share the same or have distinctly different properties. Furthermore, high volume of road traffic running through the tiles can pose a significant challenge for accurately determining tile related location intent. Lastly, since the majority of the globe is not populated, most of the proposed 1 billion tiles cover nothing that is interesting to location-based information services.

BRIEF DESCRIPTION OF THE DRAWINGS

FIG. 5 is a table illustrating some of the content in a geo-fence database according to certain embodiments.

FIG. 7 is a table illustrating some of the content in a geo-block database according to certain embodiments.

FIGS. 8A-8C are block diagrams illustrating request data at different stages of processing according to certain embodiments.

FIG. 9 is a table illustrating some of the content in a request log according to certain embodiments.

FIG. 10 is a table illustrating some of the content in a feedback log according to certain embodiments.

FIG. 14 includes tables illustrating extracted mobile device data corresponding to a time period or time frame according to certain embodiments.

FIG. 16 includes tables of exemplary features in a feature space according to certain embodiments.

FIG. 18 is a table illustrating exemplary off-line location prediction results according to certain embodiments.

FIG. 21 includes tables of exemplary features in a feature space according to certain embodiments.

FIG. 28 is a table illustrating a request log according to certain embodiments.

DESCRIPTION OF THE EMBODIMENTS

Figure 1:
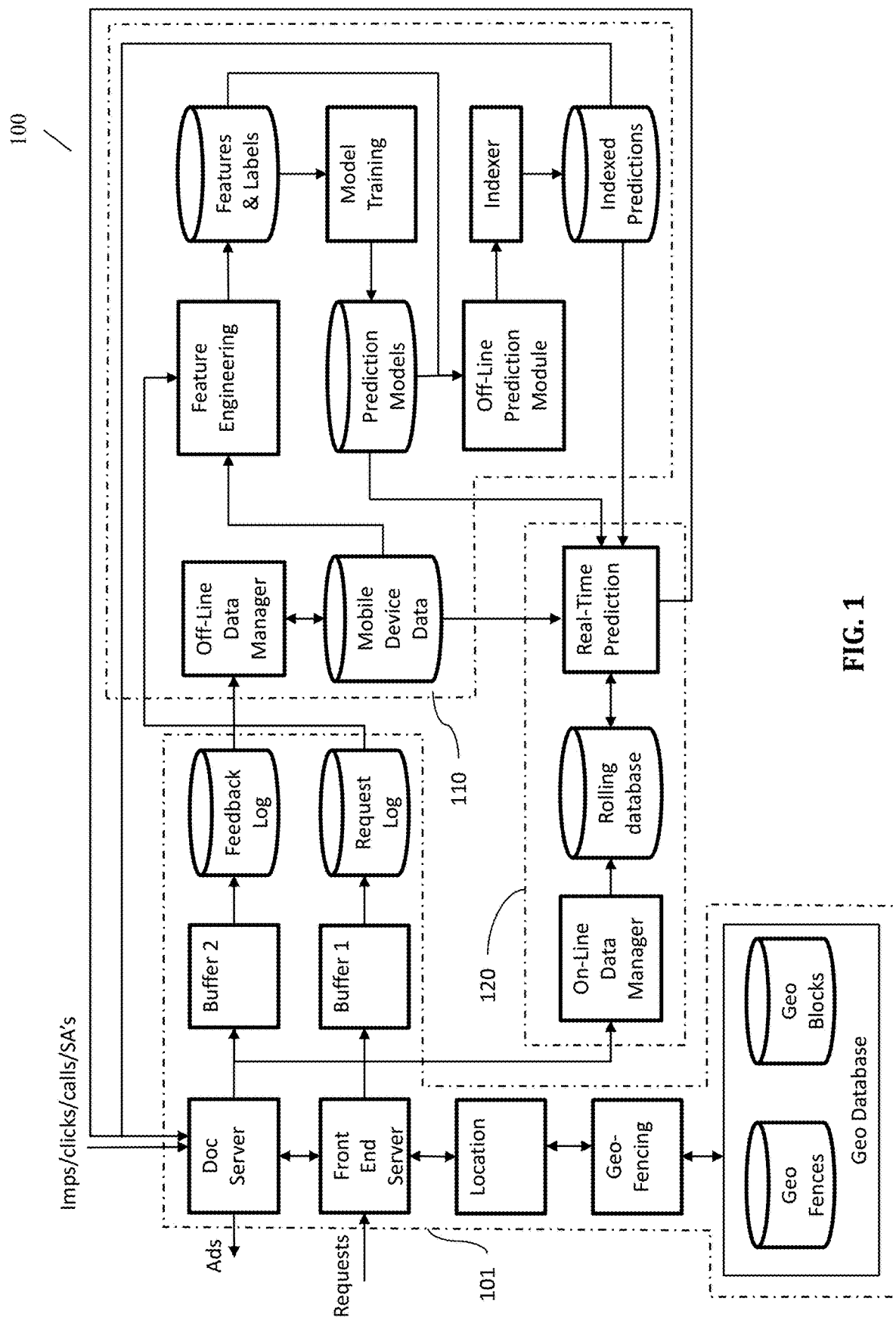
FIG. 1 is a diagrammatic representation of a system for location prediction according to certain embodiments.

As shown in FIG. 1, certain embodiments of the present disclosure provide a location prediction system 100 coupled to a packet-based network for predicting the probabilities of one or more mobile devices communicating with the packet-based network to be at certain locations within certain time frames. The system 100 comprises, among other things, a request processor 101, an offline prediction subsystem 110, and an on-line prediction subsystem 120. In certain embodiments, the system 100 is configured to perform one or more methods for location prediction, as described below.

In certain embodiments, the request processor 101 includes or has access to a geo database storing therein data associated with geo-places. In certain embodiments, the geo-places include geo-blocks and geo-fences. Each of the geo-blocks correspond to a geographical region having at least one border defined by a public road or natural boundary. Each of the geo-fences correspond to a plurality of points of interest. The geo database includes a geo-block database storing therein data associated with the geo-blocks and a geo-fence database storing therein data associated with the geo-fences.

In certain embodiments, the request processor 101 is configured to receive requests associated with mobile devices communicating with the packet-based network and to process the requests with respect to the geo places in the geo database to detect location events associated with mobile devices. Each location event corresponds to a time stamp and identifies a geo-place. In certain embodiments, the location events include geo-block-based location events and geo-fence-based location events. Each geo-block-based location event is related to a geo-block in the geo-block database, and each geo-fence-based location event is related to a name or brand of a point of interest (POI) having a geo-fence in the geo-fence databases.

Figure 12A:
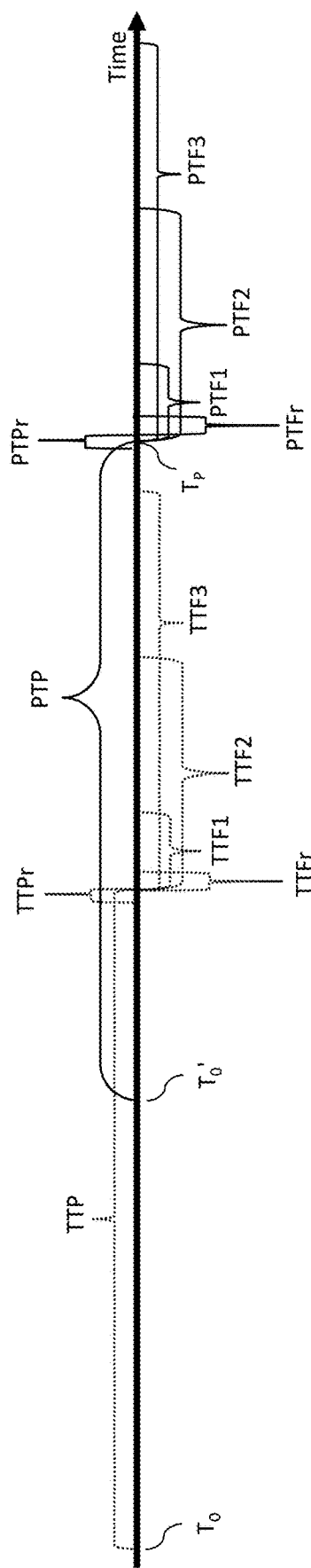
FIGS. 12A-12B are diagrams illustrating time periods and time frames used for training and applying location prediction models according to certain embodiments.
Figure 12B:
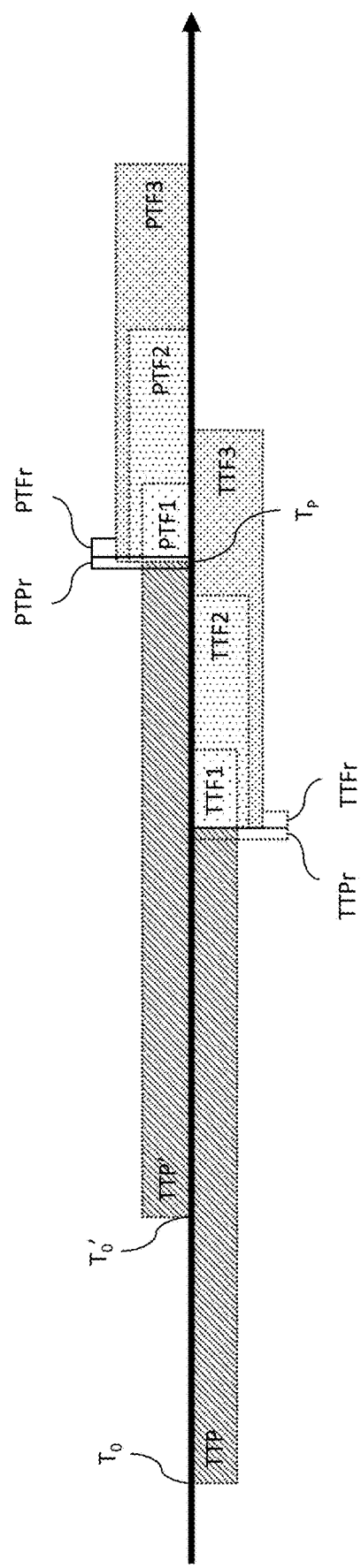

In certain embodiments, the offline prediction subsystem 110 includes a feature generator configured to construct a plurality of feature spaces. The plurality of feature spaces include a first feature space for a first plurality of mobile devices and a second feature space for a second plurality of mobile devices, which can be the same mobile devices as the first plurality of mobile devices or a different group of mobile devices. The first feature space is constructed using location events associated with the first plurality of mobile devices in a first time period (e.g., TTP, as shown in FIGS. 12A and 12B), and the second feature space is constructed using location events associated with the second plurality of mobile devices in a second time period (e.g., PTP). Each of the first feature space and the second feature space includes features related to at least some of the plurality of geo-blocks and features related to the names or brands of at least some of the plurality of points of interest. The feature generator is further configured to extract a first set of labels related to a location group of one or more prediction locations from geo-fence-based location events associated with the first plurality of mobile devices in a first time frame (e.g., TTF1) after the first time period (e.g., TTP).

In certain embodiments, the offline prediction subsystem 110 further includes a machine learning module configured to train a first prediction model for the location group using the first feature space and the first set of labels, and an off-line prediction module configured to apply the first prediction model to the second feature space to obtain first prediction results including probabilities of respective ones of the second plurality of mobile devices to be at any of the one or more prediction locations during a second time frame (e.g., PTF1) after the second time period (e.g., PTP).

In certain embodiments, the feature generator is further configured to extract a plurality of sets of labels related to the one or more prediction locations from geo-fence-based location events associated with the first plurality of mobile devices in a first plurality of time frames (e.g., TTF1, TTF2, TTF3, . . . ) after the first time period (e.g., TTP). The plurality of sets of labels including the first set of labels, and the first plurality of time frames (e.g., TTF1, TTF2, TTF3, . . . ) are of various durations and include the first time frame (e.g., TTF1). The plurality of feature spaces further include a third feature space for training an on-line prediction model. The third feature space is built using at least some of the plurality of sets of labels and location events in a third time period (e.g., TTPr). The third time period is significantly shorter than the first time period (e.g., TTP) and has a start time near an end of the first time period. The feature generator is further configured to generate an additional set of labels for training the on-line prediction model based on location events in a third time frame (e.g., TTFr), the third frame having an end time after an end time of the third time period (e.g., TTPr).

In certain embodiments, the training module is configured to train a plurality of off-line prediction models for the location group using the first feature space and respective sets of labels among a plurality sets of labels, and is further configured to train an on-line prediction model for the location group using the third feature space and the additional set of labels.

In certain embodiments, the off-line prediction module is configured to apply the plurality of off-line prediction models to the second feature space to obtain a plurality of sets of off-line prediction results. Each set of off-line prediction results include probabilities of respective ones of the second group of mobile devices to be located at any location of the location group within a corresponding time frame of a second plurality of time frames (e.g., PTF1, PTF2, PTF3, . . . ). In certain embodiments, each of the second plurality of time frames (e.g., PTF1, PTF2, PTF3, . . . ) has an end time after an end time of the second time period (e.g., PTP) and a duration about the same as a corresponding time frame among the first plurality of time frames (e.g., TTF1, TTF2, TTF3, . . . ). The second plurality of time frames (e.g., PTF1, PTF2, PTF3, . . . ) include the second time frame (e.g., PTF1).

In certain embodiments, the on-line prediction subsystem 120 includes an on-line data manager configured to provide rolling updates to an on-line database, which is configured to store a certain number of mostly recently processed requests and/or their associated location events. The on-line prediction subsystem 120 further includes an on-line prediction module configured to build a set of features for a particular mobile device, in response to receiving a request associated with the particular mobile device, using at least some of the off-line prediction results associated with the particular mobile device and location events associated with the particular mobile device in a fourth time period (e.g., PTPr) in the on-line database. The fourth time period (e.g., PTPr) has a start time near an end time of the second time period and has a duration about the same as the third time period (e.g., TTPr). The on-line prediction module is further configured to apply the on-line prediction model to the set of features to obtain on-line prediction results associated with the particular mobile device. The on-line prediction results include probabilities of the particular mobile device to be located at any location of the location group within a fourth time frame (e.g., PTFr) after the fourth time period (e.g., PTPr). The fourth time frame (e.g., PTFr) has a duration about equal to the duration of the third time frame (e.g., TTFr), and an end time after an end time of the fourth time period and within the shortest of the second plurality of time frames (e.g., PTF1, PFT2, PTF3, . . . ).

In certain embodiments, the off-line prediction subsystem 110 is further configured to determine a relevance measure (or performance measure) for each of the plurality of geo-blocks with respect to the location group (or with respect to an information campaign) and the plurality of geo-blocks are divided into a number of geo-block brackets each corresponding to a distinct range of relevance measures (or performance measures). The off-line prediction subsystem 110 is further configured to construct the first or second feature space by generating features related to each of the number of geo-block brackets, generating a set of features related to each of one or more most frequently visited geo-blocks for each of the first or second plurality of mobile devices, generating features related to each of a plurality of brands, and/or generating features related to each of the one or more retail geo-blocks, in additional to generating other features.

In certain embodiments, the third feature space includes, for each mobile device of the a plurality of mobile devices, features related to a most-recently triggered geo-block associated with a most recent geo-block-based location event in the third time period (e.g., TTPr) for the each mobile device. The features related to the most-recently triggered geo-block may include a distance from the most-recently triggered geo-block to a closest location in the location group. The third feature space may further include, for each mobile device of the plurality of mobile devices, features related to a brand associated with a most recent geo-fence-based location event for the each mobile device. The third feature space may further include features related to a most recently used application on each of the plurality of mobile devices. The third feature space may further include features related to weather conditions, the speed of each of the plurality of mobile devices, the name (or an ID number) of a road near which the mobile device is located, and/or the name (or ID number) of the city in which the mobile device is located during the third time period (e.g., TTPr).

Thus, the system 100 functions to convert raw request data into feature spaces and labels suitable for machine learning to generate off-line and on-line location prediction models. The system further functions to provide on-line (or real-time) prediction of mobile device locations by training a machine-learned on-line prediction model off-line, and applying the machined learned on-line prediction model to a feature space, which is constructed in an on-line prediction subsystem using real-time or near real-time mobile device data in combination with related off-line prediction results, to obtain on-line prediction results. The on-line prediction results is generated in response to receiving a request associated with a mobile device in real-time. The on-line and/or the off-line prediction results can be used to determine whether to deliver certain information to the mobile device in response to the a request in real-time. In certain embodiments, the on-line prediction results and/or the off-line prediction results are used in combination with the mobile device's real-time location with respect to one or more targeting areas. In certain embodiments, the geo-blocks are ranked according to their respective relevance measures (or performance measure) for an information campaign, and the one or more targeting areas include a selection of geo-blocks, which can be dynamically adjusted based on a pacing status of an information campaign and the rankings of the geo-blocks.

Several aspects of the present disclosure directly improve computer functionality. For instance, embodiments of the present disclosure achieve faster location prediction with smaller memory and processing requirements by translating raw location data into location events with respect geo-fences and geo-blocks and by filtering and aggregating the location events across time and space for machine learning processes. In further embodiments, measures of relevance are computed for the geo-blocks using mobile device signals, and the measures of relevance are used to assign geo-blocks to geo-block brackets for proper dimension reduction and data clustering, resulting in efficient use of computer resources and improved location prediction performance.

Figure 2:
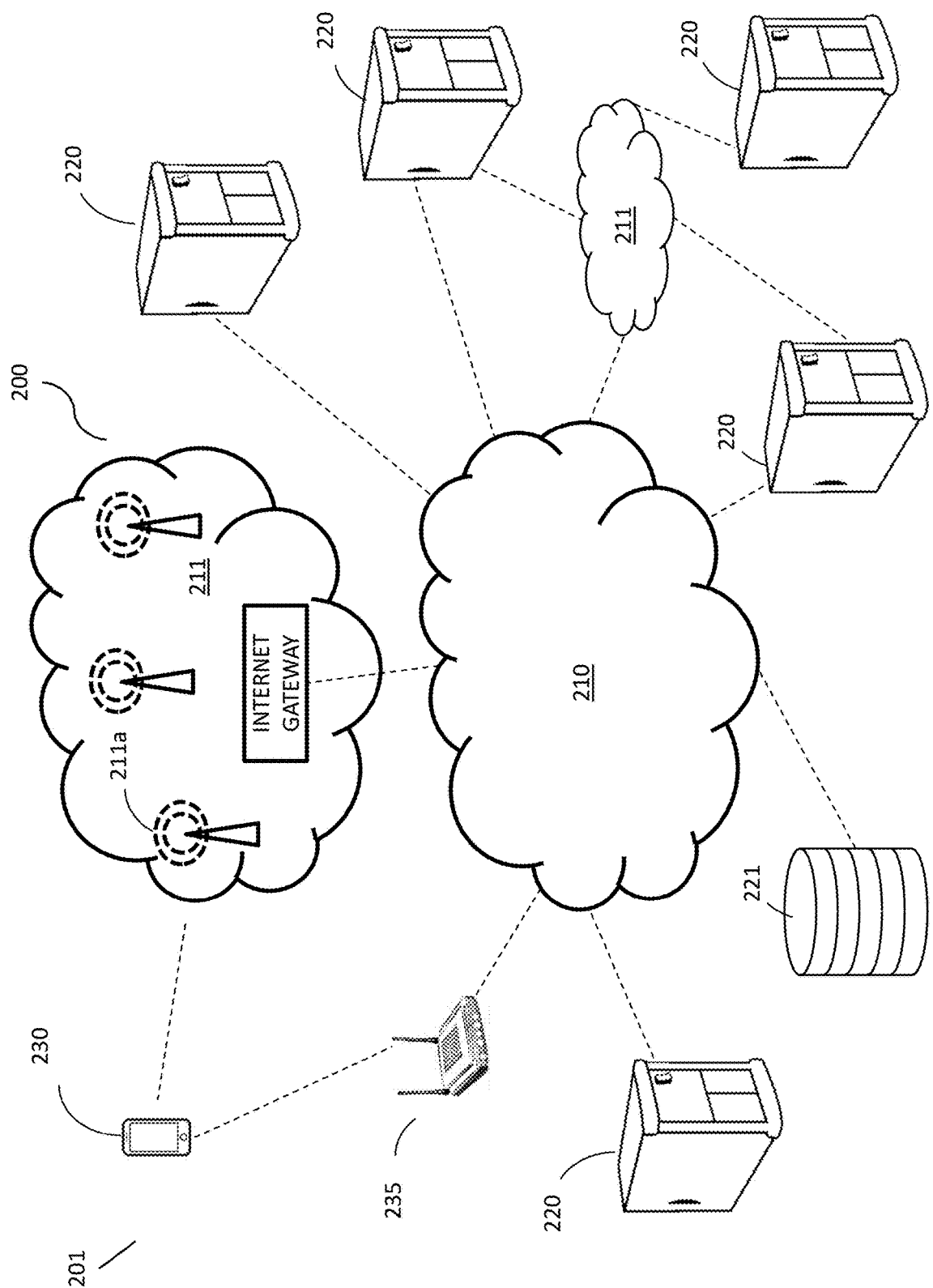
FIG. 2 is a diagrammatic representation of a packet-based network according to embodiments.

FIG. 2 is a schematic diagram illustrating an overview of an environment 201 in which some embodiments of the disclosed technology may operate. Environment 201 can include one or more computer systems 220 coupled to a packet-based network 200. The packet-based network 200 in certain embodiments includes the Internet 210 and part or all of a cellular network 211 coupled to the Internet 210 via an Internet Gateway. The computers/servers 220 can be coupled to the Internet 210 using wired Ethernet and optionally Power over Ethernet (PoE), WiFi, and/or cellular connections via the cellular network 211 including a plurality of cellular towers 211a. The network may also include one or more network attached storage (NAS) systems 221, which are computer data storage servers connected to a computer network to provide data access to a heterogeneous group of clients. As shown in FIG. 2, one or more mobile devices 230 such as smart phones or tablet computers are also coupled to the packet-based network via cellular connections to the cellular network 211. When a WiFi hotspot (such as hotspot 235) is available, a mobile device 230 may connect to the Internet 210 via a WiFi hotspot 235 using its built-in WiFi connection. Thus, the mobile devices 230 may interact with computers/servers 220 coupled to the Internet 210. A mobile device 230, or its user, or anyone or anything associated with it, or any combination thereof, is sometimes referred to herein as a mobile entity.

Figure 3:
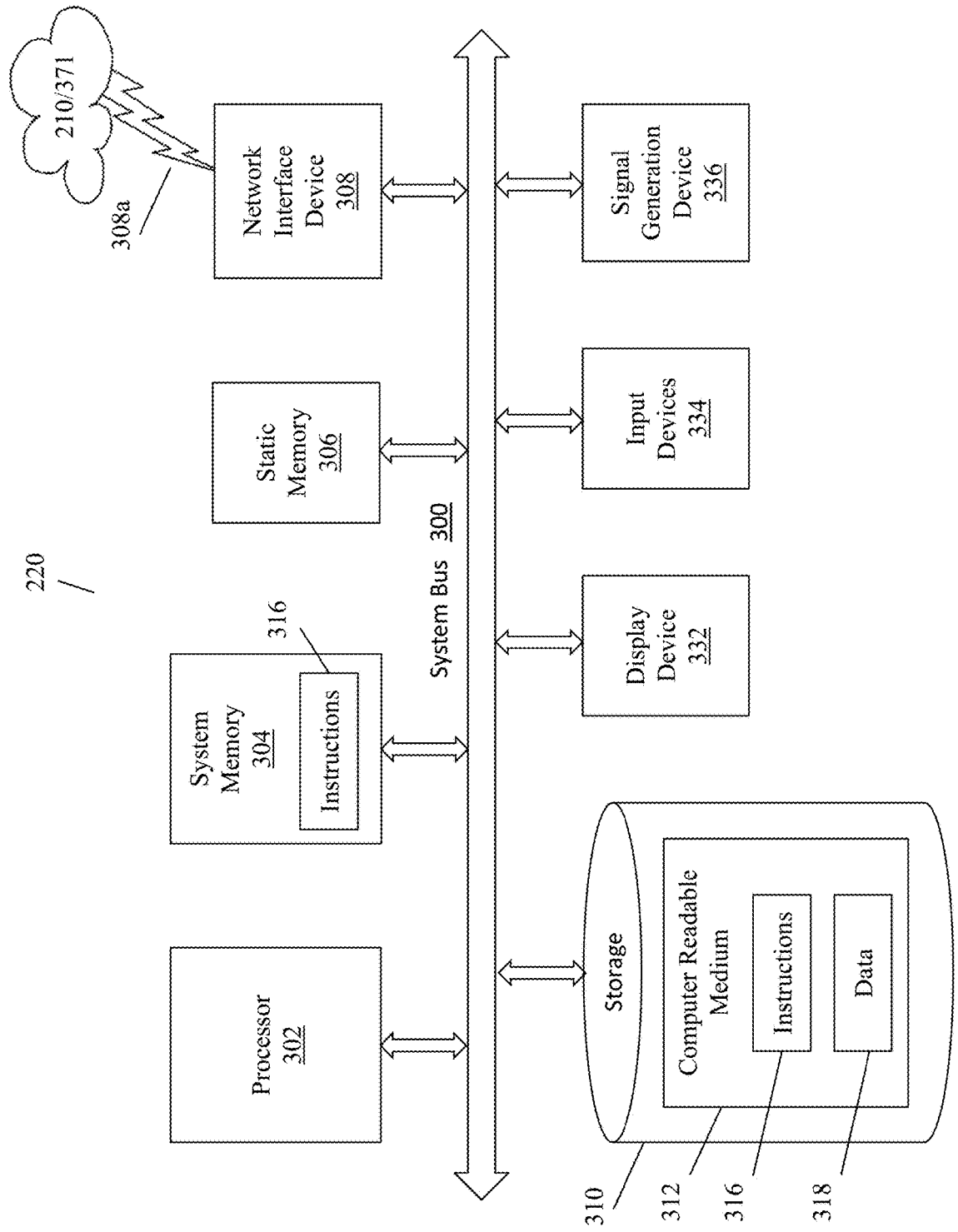
FIG. 3 is a diagrammatic representation of a computer/server coupled to the packet-based network that performs one or more of the methodologies and/or to provide part or all of a system for location prediction according to embodiments.

FIG. 3 illustrates a diagrammatic representation of a computer/server 220 according to certain embodiments. The computer/server 220 may operate as a standalone device or as a peer computing device in a peer-to-peer (or distributed) network computing environment. As shown in FIG. 3, the computer/server 220 includes one or more processors 302 (e.g., a central processing unit (CPU), a graphic processing unit (GPU), and/or a digital signal processor (DSP)) and a system or main memory 304 coupled to each other via a system bus 300. The computer/server 220 may further include static memory 306, a network interface device 308, a storage unit 310, one or more display devices 330, one or more input devices 334, and a signal generation device (e.g., a speaker) 336, with which the processor(s) 302 can communicate via the system bus 300.

In certain embodiments, the display device(s) 330 include one or more graphics display units (e.g., a plasma display panel (PDP), a liquid crystal display (LCD), a projector, or a cathode ray tube (CRT)). The input device(s) 334 may include an alphanumeric input device (e.g., a keyboard), a cursor control device (e.g., a mouse, trackball, joystick, motion sensor, or other pointing instrument). The storage unit 310 includes a machine-readable medium 312 on which is stored instructions 316 (e.g., software) that enable anyone or more of the systems, methodologies or functions described herein. The storage unit 310 may also store data 318 used and/or generated by the systems, methodologies or functions. The instructions 316 (e.g., software) may be loaded, completely or partially, within the main memory 304 or within the processor 302 (e.g., within a processor's cache memory) during execution thereof by the computer/server 220. Thus, the main memory 304 and the processor 302 also constitute machine-readable media.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

The location prediction system 100 according to certain embodiments can be implemented using one or more computers/servers 220 executing programs to carry out the functions and methods disclosed herein. It should be understood that the example embodiments described herein may be implemented in many different ways. In some instances, the various methods and machines described herein may each be implemented by one or more physical, virtual or hybrid general purpose computers each having a central processor, memory, disk or other mass storage, communication interface(s), input/output (I/O) device(s), and other peripherals. The general purpose computers are transformed into the machines that execute the methods described herein, for example, by loading software instructions into one or more data processors, and then causing execution of the instructions to carry out the functions described herein. As shown in FIG. 2, some of the computers/servers 220 are coupled to each other via a local area network (LAN) 210, which in turn is coupled to the Internet 210. Also, each computer/server 220 referred herein can include any collection of computing devices.

According to certain embodiments, as shown in FIG. 1, the system 100 includes a front-end server that receives requests from the packet-based network 200. These requests may be generated by one or more computers/servers 220 in the packet-based network as they provide mobile services to the mobile devices. In certain embodiments, the system 100 further includes a location module coupled to the front-end server and configured to detect the location of a mobile device associated with each of the requests. In certain embodiment, the location module is further configured to examine the location data in each received request to determine whether they include a reliable latitude/longitude (LL) pair, and if the request does not include a reliable LL pair, the location module would proceed to derive the location of the associated mobile device from other information in the location data, as described in more detail in commonly owned U.S. Pat. No. 9,886,703, issued on Feb. 6, 2018, which is incorporated herein by reference in its entirety. The system 100 further includes a geo-fencing module coupled to the location module and configured to determine if the detected mobile device location triggers any geo-place(s) in a geo-database and returns the triggered geo-place(s) to the front-end server. In certain embodiments, the geo-places include geo-fences and geo-blocks, and the geo database is a spatial database optimized for storing and querying data that represent geographical areas or spaces and may include spatial data and meta data associated with each of the geographical areas or spaces.

In certain embodiments, the geo-fences in the geo database include spatial data representing virtual perimeters of defined areas or places that mirror real-world geographical areas associated with various entities and/or brands. A defined area according to certain embodiments can be a static circle around a business location, e.g. a fence obtained using offline index databases such as InfoUSA (www.infousa.com), which provides a list of POIs and their locations, or areas specified by marketers using predefined boundaries, such as neighborhood boundaries, school attendance zones, or parcel boundaries, etc.

Figure 4:
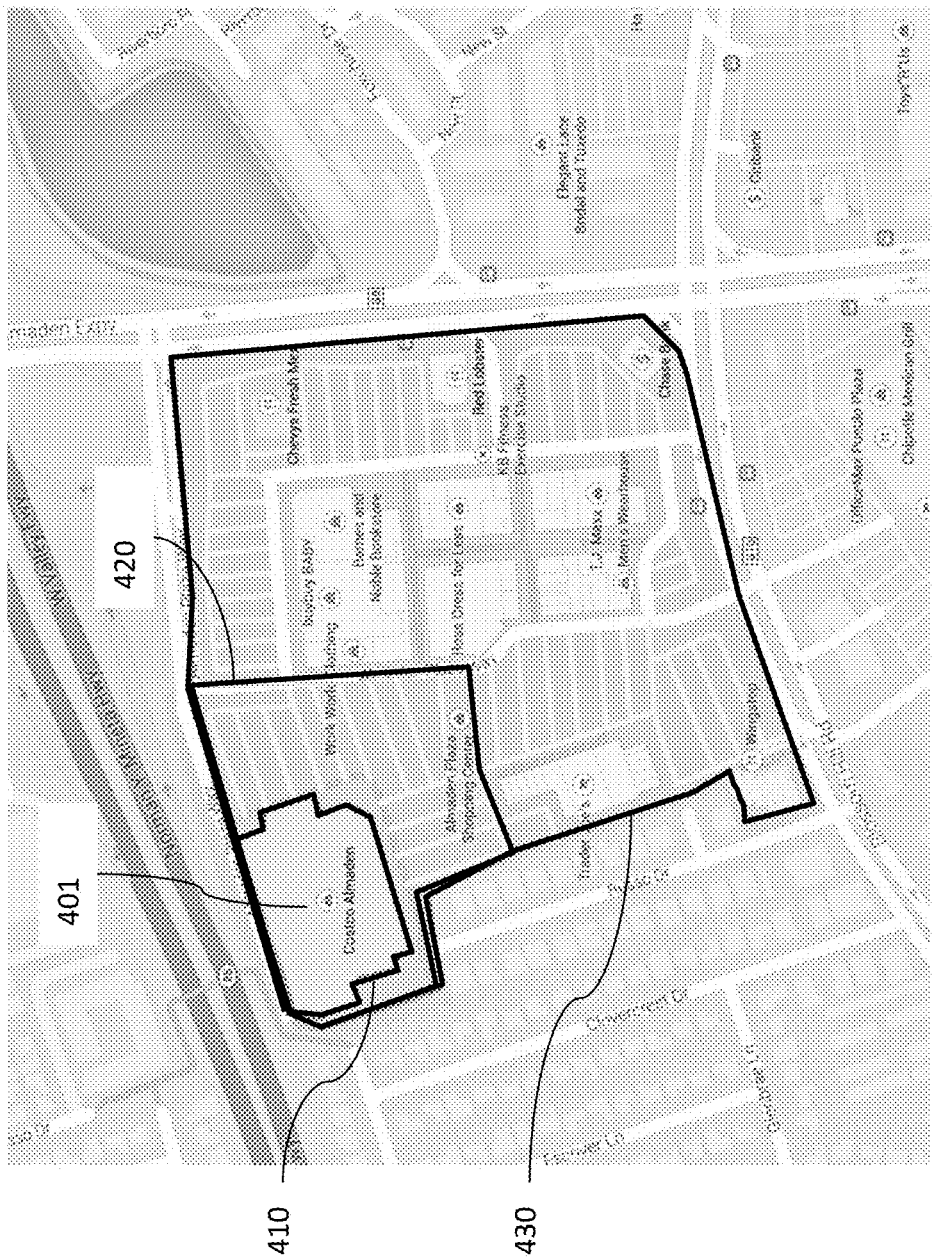
FIG. 4 is a map image illustrating exemplary polygonal geo-fences overlaid on a map of a geographical region according to certain embodiments.

In certain embodiments, the defined areas include one or more geo-fences for each of a plurality of points of interests in consideration of the map data around the POI. For example, as shown in FIG. 4, one or more polygons are defined for the Costco Almaden store 401 to be in conformity with the real-world geographical structure and boundaries of the store and its surroundings, such as a first polygon 410 around the building of the store, a second polygon 420 around the building and its parking lot, and/or a third polygon 430 around a shopping area or business region including the store and other points of interests (POIs). In certain embodiments, these different types of geo-fences are defined for a point of interest (POI) to indicate different levels of intentions, interests, and/or behavior, etc., of a mobile user with respect to the POI, which can be used for location prediction purposes.

Thus, in certain embodiments, different types of geo-fences are associated with a business and may include, for example, (1) a business center (BC) represented by, for example, a polygon corresponding to the perimeter of the building of the business (e.g., the first polygon 410 in FIG. 4); (2) a business premise (BP) represented by a polygon corresponding to the perimeter of the business building and the neighboring parking lots (e.g., the second polygon 420 in FIGS. 4); and (3) a business region (BR) or area represented by a polygon corresponding to the perimeter of a shopping center or business or commercial area in which this business is located (e.g., the third polygon 430 in FIG. 4). If a business center is triggered by a mobile device location, it can be reliably inferred that the user of the mobile device is interested in the business by actually visiting it. Triggering of a business premise provides good indication of an intent to visit the business, but not as strong as triggering the business center. If a user triggers a business region, the intent may be regarded as valid but weaker than that from triggering a business premise.

FIG. 5 illustrates examples of some of the geo-fences in the geo database, according to certain embodiments. As shown, the site Costco in Almaden has three different types of geo-fences associated with it—geo-fence with Fence ID 19-35175 corresponds to a business center (BC), which is defined by a polygon around the store building and represented by spatial index a1, a2, . . . , ai; geo-fence with Fence ID 19-35176 corresponds to a polygon around the site's larger premise including its parking lot and represented by spatial index b1, b2, . . . , bj; and geo-fence with Fence ID 19-35177 corresponds to polygon around the shopping center including the store and other POIs and represented by spatial index c1, c2, . . . , ck. Note that geo-fence with Fence ID 19-35177 is also associated with the names/brands of other POIs in the shopping center, as well as name of the shopping center itself. FIG. 5 also shows that the site T.J. Maxx is associated with Fence ID 19-35177 and also has two other types of fences associated with it, and the site Trader Joe's is also associated with Fence ID 19-35177 and has at least a business center place associated with it. As shown in FIG. 5, each geo-fence entry in the geo database includes the spatial data associated with the respective place together with some meta data about the respective place, such as, for example, one or more names/brands associated with the place, a category of the place, a place identifier identifying a particular locale (e.g., city, district, etc.) for the place, the place type, and/or one or more doc IDs identifying one or more information documents (e.g., one or more html/JavaScript files) associated with the names/brands or the place. In most cases, a POI's name is established as its brand, so they are used interchangeably. For ease of discussion, the brand of a POI is referred to hereafter as either the name or the brand of the POI, whichever is associated with the POI in the geo-fence database.

Figure 6:
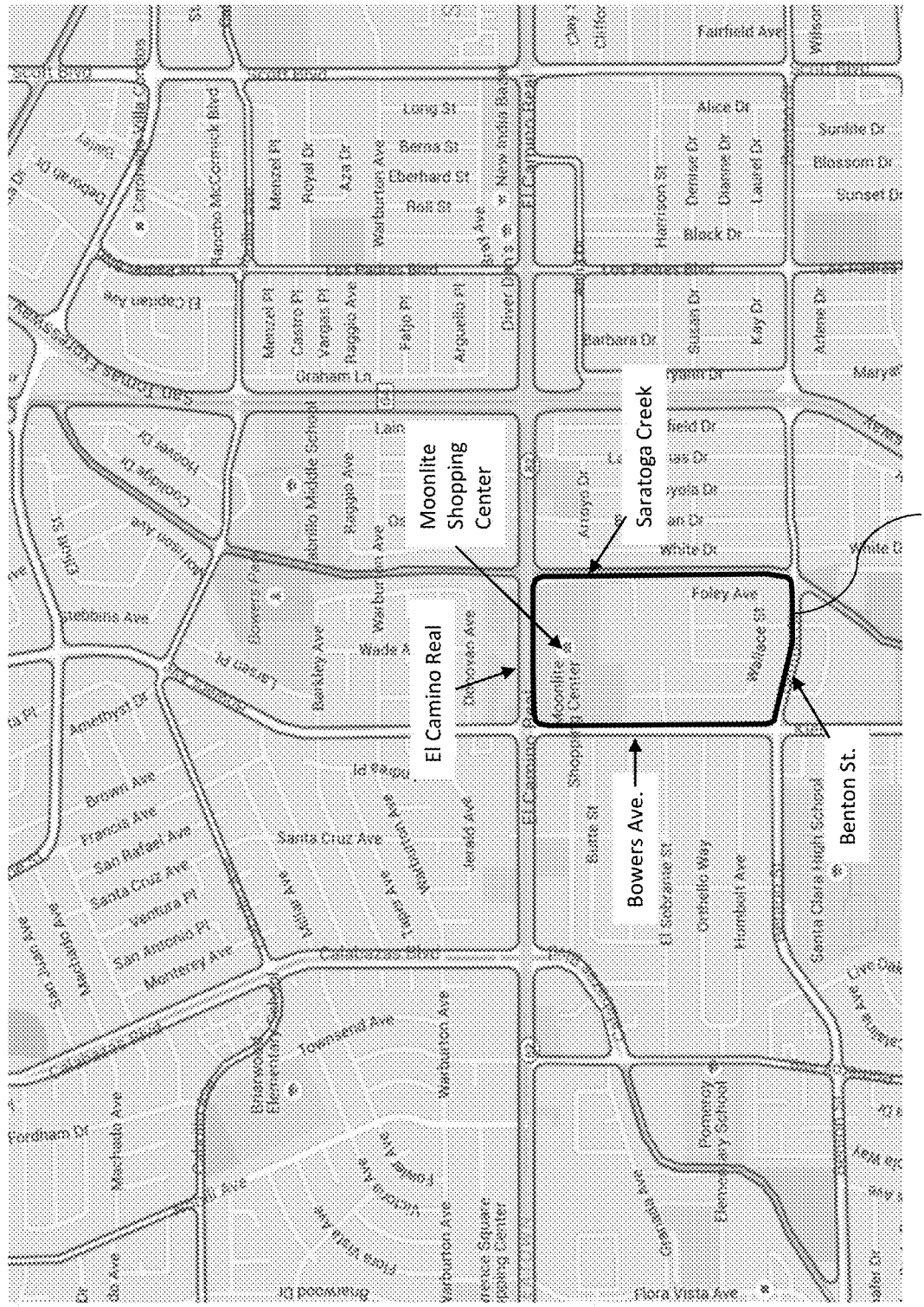
FIG. 6 is map a image illustrating exemplary geo-blocks overlaid on a map of a geographical region according to certain embodiments.

In certain embodiments, the geo-blocks in the geo database represent geographical regions with natural boundaries such as major roads, shorelines, mountain ranges, etc., as described in further detail below. FIG. 6 illustrates graphically exemplary geo-blocks according to certain embodiments. In this example, for an area in the city of Santa Clara, Calif., the geo-blocks are shown as outlined in boundaries overlaid on top of a map for the area, taken from, for example, Google Map, and the boundaries of the geo-blocks are mostly aligned with major roads and natural boundaries, taking into account the road width so as to exclude mobile signals from travelers on the major roads.

For example, geo-block 601 containing the Moonlite Shopping Center is shown to be bordered on three sides by major roads, El Camino Real, Bowers Ave, and Benton St., respectively, and on another side by the Saratoga Creek. Each of the geo-blocks shown in FIG. 6 can be further partitioned into more granular blocks bordered by smaller roads. Real world entities present in these geo-blocks tend to serve common functional purposes (residential, retail etc.), and these blocks form the foundation for the construction of boundaries that are highly indicative of location dependent attributes such as intention and demographics. FIG. 7 illustrates examples of some of the geo-blocks in the geo database, according to certain embodiments. As shown, each geo-block includes spatial data defining the boundary of the geo-block and meta data including, for example, the city/state in which the geo-block is located, the functionality of the geo-block (e.g., residential, retail, recreational, educational, etc.), one or more major POIs in the geo-block, as well as other information such as demographic of the residents or visitors of the geo-block, and inventory of requests with location data in the geo-block, etc., which can be derived from logged request data.

In certain embodiments, as shown in FIG. 8A, the front-end server receives a request 801 from, for example, a server run by a mobile service provider (MSP or MSP server), via the network 200. The request 801 includes a request ID, mobile device data such as mobile device ID, maker/model, operating system, etc., mobile entity data such as user ID (UID), age, gender, income bracket, education level, etc., mobile device location data including a plurality of location components, such as latitude and longitude coordinates (LL), IP addresses (IP), postal or zip codes (ZC), and/or city-state names (CS), etc. The request may further include other information. In certain embodiments, the front-end server validates the location information by checking the validity and consistency of the location components and by weeding out any invalid location component(s). Generally, the LL is usually believed to be the most useful location component. However, when a mobile entity doesn't allow its location information to be known, mobile applications at the MSP server typically provide only coarse location data in the form of, for example, an IP address, a ZC (e.g. entered by the user at the time of registration), or CS. Thus, mobile applications at the MSP server frequently provide LLs obtained from geo-coding software, which translates ZC, CS, and other points of interests into one representative LL. In one embodiment, such representative LLs are categorized as "bad LLs". A bad LL can be, for example, a centroid of a ZC/CS, or any fixed point on a map (e.g. (0,0) or an arbitrary location).

In certain embodiments, the location module is configured to weed out the bad LL's, so that location data with bad LL's are not provided to the next stage processing, by using the techniques disclosed in commonly owned U.S. patent application Ser. No. 14/716,816, entitled "System and Method for Estimating Mobile Device Locations," filed on May 19, 2015, which is incorporated herein by reference in its entirety.

The location module is further configured to estimate the location of the mobile device from the request 801 and generate location data to represent an estimated mobile device location, which may be a geographical point represented by a lat/long pair or one or more probable areas or regions the mobile device is estimated to be in, as shown in processed request 802 with generated location data in FIG. 8B. The geo-fencing module queries the geo database with the lat/long pair or the one or more probable regions to determine whether the location data triggers one or more geo-places in the geo database, and returns the triggered geo-place(s) to the front-end server. In certain embodiments, the front end server annotates the request 801 with the triggered geo-place(s) to generate an annotated request 810, and outputs the annotated request 810 to buffer 1, which buffers and outputs the annotated request 810 to a request log. The triggered geo-place(s) may include a geo-block (if the mobile device is in a place that has been geo-blocked) and may further include one or more geo-fences if the estimated location or probable area or region is in or overlaps with the one or more geo-fences, as shown in FIG. 8C. For ease of description, the triggering of a geo-place (e.g., a geo-block or a geo-fence) is sometimes referred to herein as a location event. So, an annotated request may include one or more location events.

FIG. 9 is a table illustrating exemplary entries in the request log, according to certain embodiments. Each entry in the request log corresponds to a respective processed (or annotated) request and includes at least some of the data in the respective annotated request, such as request (or packet) ID, mobile device information such as mobile device ID, make/model, mobile user information such as UID, age, gender, education, etc., a latitude/longitude pair, data related to location events involving triggered geo-fence(s) and/or a geo-block, mobile application used at the time of the request, and the time stamp of the request, etc.

In certain embodiments, as shown in FIGS. 8A and FIG. 9, the request 801 received from the Internet by the front-end server includes other information as well as the location information, such as an application program running on the mobile device, a time stamp indicating the time of the request (e.g., day, hour, minute, etc.), one or more keywords suggesting types of information for returning to the mobile device, and/or other information associated with the mobile user, the mobile device, and/or the MSP. In some cases, the location data can trigger multiple places. For example, as shown in FIG. 4, a request that triggers the BC place 410 of Costco Almaden also triggers the BR place 430 of any of the POIs in the same business region as well as the geo-fence for the business region (e.g., a retail center or shopping mall). Thus, the request may be annotated with the BR place of one or more other POIs in the same business region, as well as the BC place of Costco Almaden. For the business region itself, the BR place may be the only geo-fenced place associated therewith, so the business region is triggered as long as the associated BR place is triggered.

Each location invent involving a triggered geo-fence or a triggered geo-block is included in the annotated request together with information about the triggered geo-fence or geo-block. If a request triggers multiple places associated with a brand, only the smallest of the places (e.g., the BC or the BP place) is included as a location event. As shown in FIG. 8C, some or all of the meta data 812 of a triggered geo-fence and some or all of the meta data 814 of the triggered geo-block can be included in the annotated request 810.

The system 100 further includes a document (or information) server configured to receive the annotated request 810 output from the front-end server and to evaluate the annotated request 810 to determine whether to serve a document in response to the request and which document to select for transmission to the MSP server (or another server) via the network 200. In certain embodiments, the information server is a computer server, e.g., a web server, backed by a database server that information sponsors use to periodically update the content thereof and may store information documents. Each of the information documents may be stored in the form of, for example, an html/JavaScript file or a link thereto, which, when loaded on a mobile device, displays information in the form of, for examples, a banner (static images/animation) or text. In certain embodiments, the system 100 further includes an off-line prediction subsystem 110 configured to generate off-line location predictions, which are stored in a prediction library for querying by the document server, and an on-line prediction subsystem 120 configured to generate on-line (or real-time) location predictions, which are provided to the document server in real-time, as explained in further detail below. In certain embodiments, the document server evaluates the annotated request 810 based on the off-line location predictions and/or the on-line location predictions, as well as other factors, as explained below.

In certain embodiments, the document selected for transmission to the MSP can be provided in the form of, for example, an html/JavaScript file, or a link to a universal resource location (URL), which can be used by the MSP or a mobile device to fetch the html/JavaScript file. The html/JavaScript file, once displayed or impressed on a mobile device, may also include one or more links that an interested user can click to access a webpage or place a call using the mobile device. The webpage enables the user of the mobile device to take secondary actions such as downloading an app or make an on-line purchase.

In certain embodiments, the html/JavaScript file is designed such that when it is displayed or impressed on a mobile device, a signal is sent by the MSP server or the mobile device automatically to the document server either directly or via another server (e.g., the MSP server so that the document server can keep track of whether the file has really been impressed on the mobile device. In certain embodiments, mechanism are also put in place such that when any of the one or more links are clicked, or when the mobile user download an app or make a purchase from a linked webpage, a signal is also sent from the mobile device to the document server in the background either directly or indirectly so that the document server can keep track of the clicks/calls or secondary actions made in response to the impression. The document server provides data of such feedback events (i.e., impressions, clicks/calls, and secondary actions) to buffer 2, which buffers and outputs the data to a feedback log. FIG. 10 is a table illustrating exemplary entries in the feedback log, according to certain embodiments.

Thus, raw location data in requests are converted into brands and geo-blocks in processed requests. The logged data in the requests log and the feedback log collected over a period of time (e.g., six months) form a large collection of mobile device data (e.g., millions and millions of annotated requests and impression/click/call events). The dimensions of these data are usually too large to be used directly for meaningful location prediction. In certain embodiments, the off-line prediction subsystem 110 is configured to reduce the dimensions of the logged data by extracting features and labels from the location data, to train one or more prediction models using the features and labels, and to apply the prediction models to an appropriate feature space to obtain off-line predictions. As shown in FIG. 1, the off-line prediction subsystem 110 includes an off-line data manager, a mobile device database, a feature generator, a features/labels database, a training module, a prediction models library, an off-line prediction module, an indexer, and an indexed prediction library.

Figure 11:
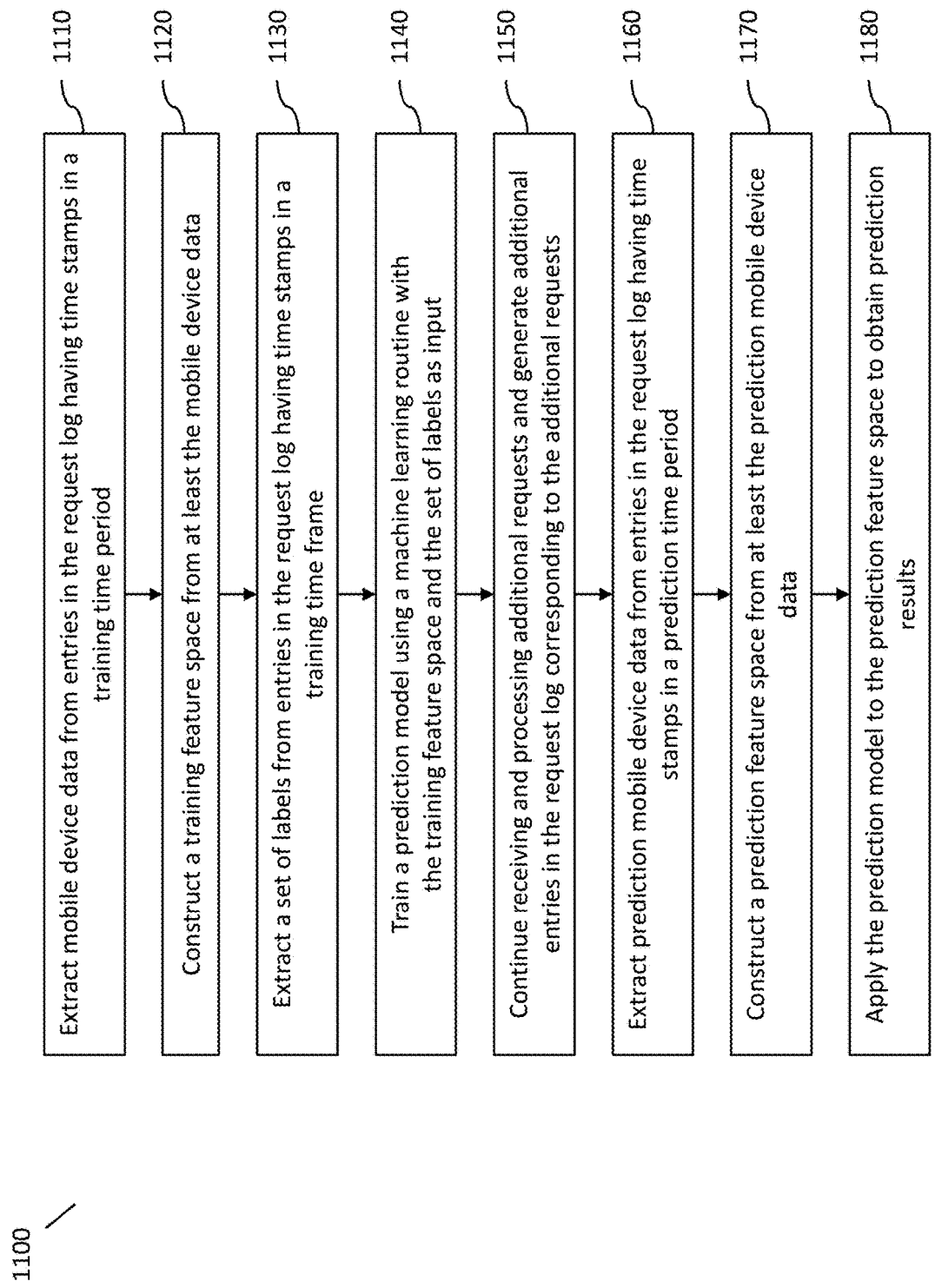
FIG. 11 is a flowchart illustrating a method performed in a system for location prediction according to certain embodiments.

In certain embodiments, the off-line prediction subsystem 110 is configured to perform a method 1100 illustrated in FIG. 11 while the front end server continues to receive and process incoming requests. As recited in block 1110 in FIG. 11, the off-line data manager is configured to extract a set of mobile device data corresponding to location events in each of a plurality of time periods from entries in the request log having time stamps in the corresponding time period. The plurality of time periods are shown in FIGS. 12A and 12B as including a training time period TTP and a prediction time period PTP. The prediction time period has a start time $T_0'$ sometime after a start time $T_0$ of the training time period and an end time at or shortly before a time $T_p$ when prediction is being made. In certain embodiments, both TTP and PTP have about the same duration, which can be for example, 1-3 months to allow sufficient size of the data pool for feature engineering.

Figure 13:
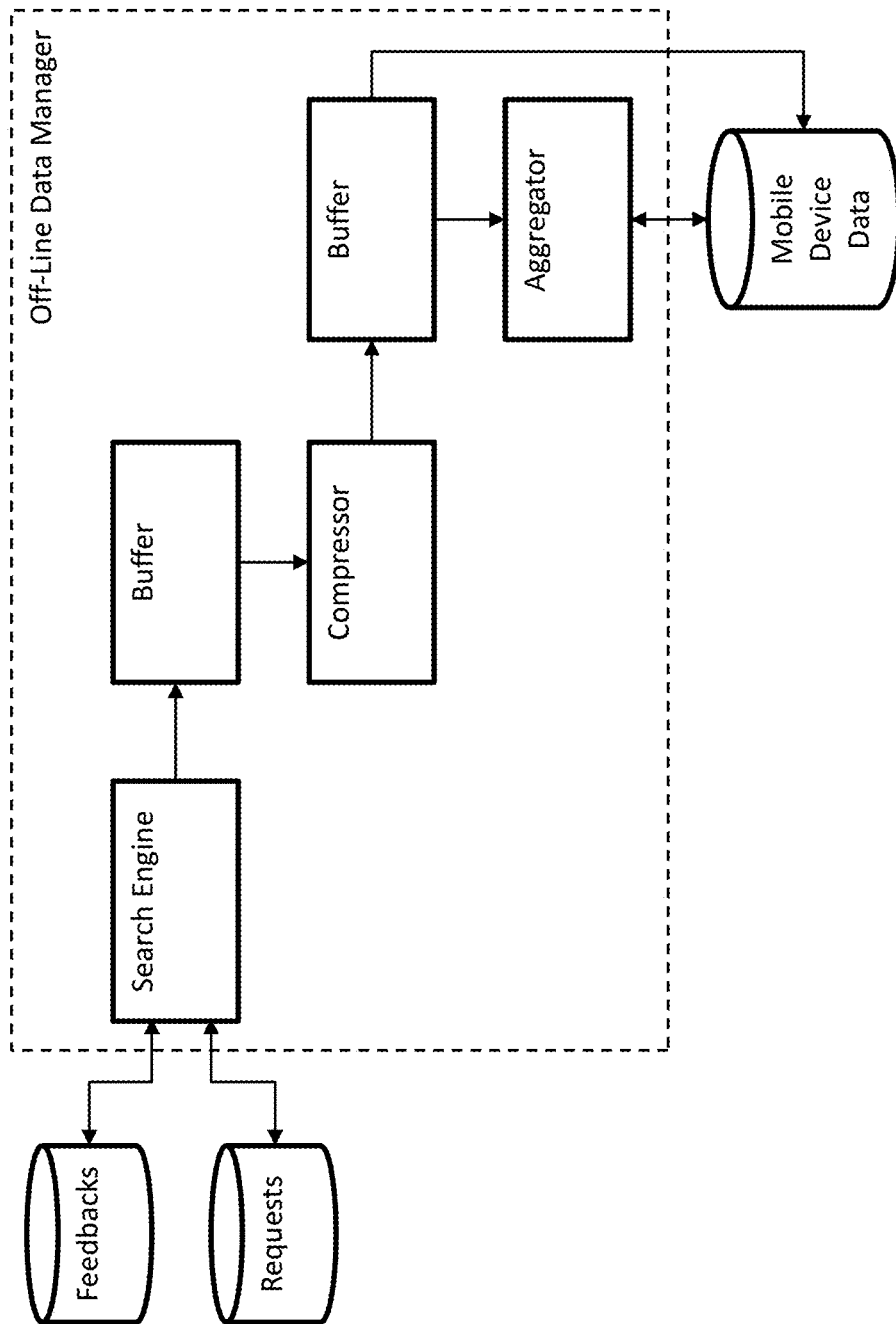
FIG. 13 is a block diagram illustrating a data manager for extracting mobile device data according to certain embodiments.

In certain embodiments, as shown in FIG. 13, the off-line data manager includes a search engine configured to search, for each mobile device of a plurality of mobile devices, processed requests associated with the mobile device and having time stamps in a time period (e.g., TTP), and a buffer configured to buffer the output from the search engine. The off-line data manager further includes a compressor configured to compress the buffered data, such that multiple location events corresponding to consecutive time stamps triggered by the mobile device at the same place within a preset time interval (e.g. 1 hour), are reduced to a single location event. For example, as shown in FIG. 9, mobile device with UID 36***412 triggered the same geo-fence B175 and the same geo-block 396841 at different times that are within one hour of each other. The two events related to the geo-fence or the geo-block are reduced to a single event to indicate a single visit by the mobile devise to the triggered geo-fence or geo-block at one of the time stamps (e.g., the earliest time stamp) with a duration computed using the difference between the earliest time stamp and a latest time stamp within an hour from the earliest time stamp. Another location event by the mobile device at the same place but with a time stamp beyond the preset time interval from the earliest time stamp would be considered another visit to the place by the mobile device, even though the mobile device may have stayed at the same place during the whole time.

In certain embodiments, the search engine can be configured to only search for location events with certain types of geo-fences depending the associated brands. For example, for certain brands, only location events with triggered BC places are considered as visits to these brands/names, for certain other brands, location events with triggered BP places are sufficient to be considered as visits to these brands, and for some brands, such as retail centers or shopping malls, location events with triggered BR places are considered as visits to these brands.

The off-line data manager further includes another buffer that stores the compressed location events for the mobile device, and an aggregator configured to aggregate the location events to form a set of mobile device data corresponding to location events in the time period TTP for the mobile device. As shown in FIG. 14, the mobile device data 1410 for the mobile device with the UID 36***412 may include, for example, device and user meta data such as age, gender, education level, and other information such as maker/model, operating system, etc., aggregated location events associated with each geo-block triggered by the mobile device during the time period TTP, aggregated location events associated with each brand triggered by the mobile device during the time period TTP, aggregated feedback events associated with one or more documents impressed on the mobile device during the time period TTP, and aggregated usage data associated with mobile applications used on the mobile device during the time period TTP. In certain embodiment, a brand is triggered when a location event 812 includes the brand. Or, if the brand uses multiple types of fences, as described above, the brand is triggered when a location event 812 includes the brand and the fence type specified for the prediction model to be trained.

In certain embodiments, aggregated location events associated with each triggered geo-block (e.g., GBx) or brand (e.g., Bx) includes, for example, a number of visits to the geo-block or brand during the time period TTP, time of last visit during TTP, average length of stay per visit, etc. In certain embodiments, the number of visits to the geo-block or brand is divided among a plurality of time blocks (shown as TB1, TB2, TB3) during a day, such as morning (6:00 am to 12:00 pm), afternoon (12:00 pm to 6:00 pm) and evening (6:00 pm to 6:00 am). Likewise, usage data associated with each mobile application used on the mobile device during the time period TTP are aggregated likewise. The aggregated feedback events associated with each of one or more documents (e.g., Docx) impressed on the mobile device during the time period TTP may include, for example, a number of impressions of the document made on the mobile device during TTP, a number of click/calls the mobile device made on the impressed document, and a number of secondary actions taken with the mobile device in response to the impressed document. These numbers can also be divided among the different time blocks.

The off-line data manager is configured to perform the above searching, compression, and aggregation processes for each of the plurality of mobile devices and to store the compressed and aggregated data for the plurality of mobile devices in the mobile device database. In certain embodiment, as shown in FIG. 14, to reduce storage space in the mobile device database, the compressed and aggregated data for each mobile device (e.g., mobile device with UID 36***412) and for each time period (e.g., time period TTP) is stored as a text string 1420 in the mobile device database.

The mobile device data for other time periods (e.g., time period PTP) can be similarly extracted and stored. The mobile devices associated with the aggregated data corresponding to different time periods do not have to be the same. For example, the mobile devices associated with the aggregated data corresponding to time period PTP may be the same plurality of mobile devices associated with the aggregated data corresponding to the time period TTP or a different set of mobile devices.

Since there can be thousands of different geo-blocks and brands, and different mobile devices trigger different geo-blocks and brands, the dimensions of the mobile device data in the mobile device database are often too large, and the related data points are often too sparse to be used directly to train prediction models by machine learning. In certain embodiments, the off-line prediction subsystem 110 further includes a feature engineering module configured to engineer a set of features for a location group corresponding to each of the plurality of time periods according to a feature engineering process 1500 illustrated in FIG. 15. For example, the feature engineering module is configured to construct a training feature space for the location group using at least the mobile device data corresponding to the training time period TTP, as recited in block 1120 in FIG. 11. In certain embodiments, the location group includes one or more locations selected for prediction. The one or more locations may correspond to, for example, one or more geo-fences associated with, for example, one or more brands or one or more categories in the geo database.

Figure 15:
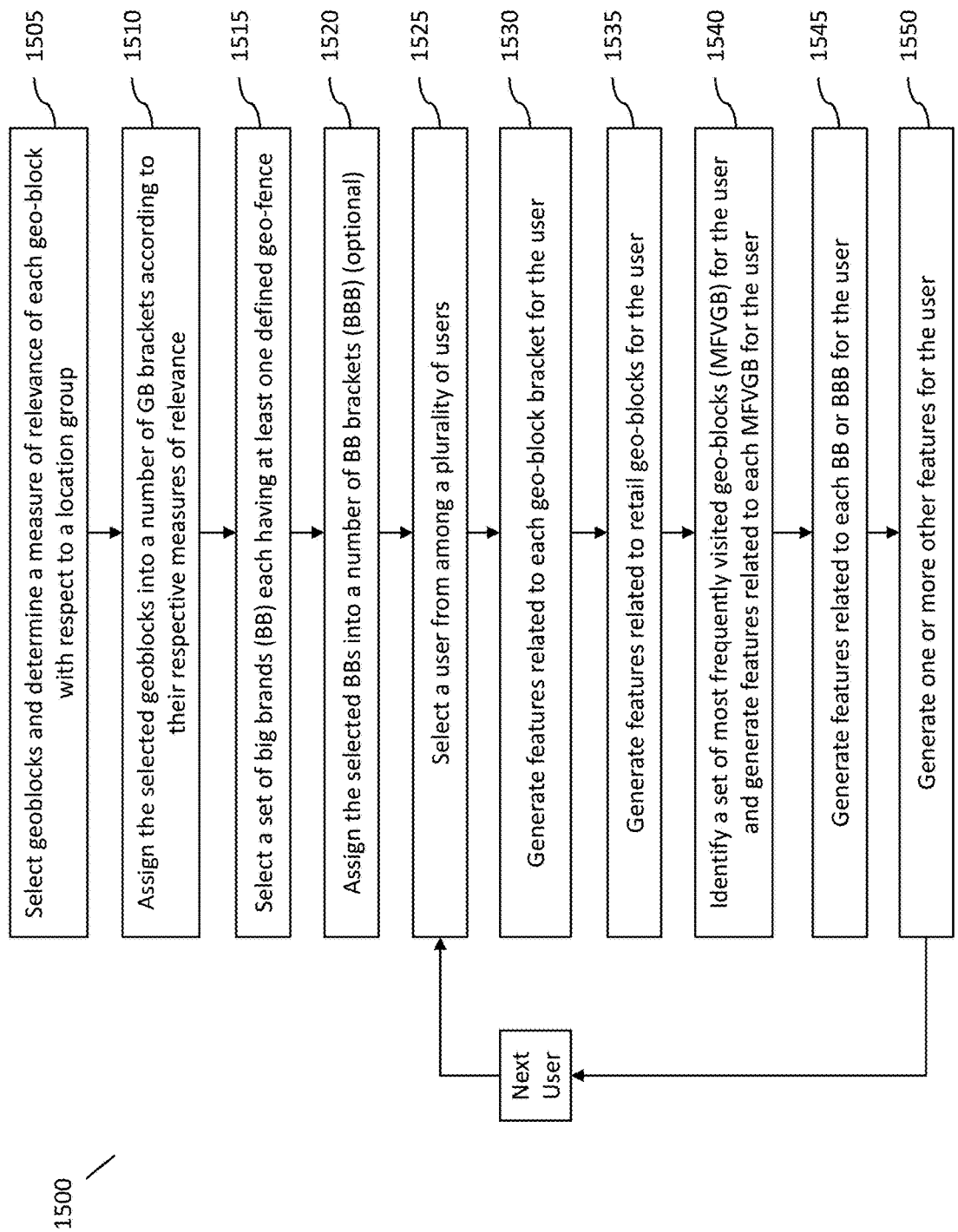
FIG. 15 is a flowchart illustrating a method for building a feature space according to certain embodiments.

As shown in FIG. 15, to construct the training feature space for a location group, the feature engineering module is configured to select a set of geo-blocks and determine a relevance measure for each of the geo-blocks with respect to the location group, as recited in block 1505 in FIG. 15. The relevance measure (or performance measure) for a geo-block can be determined using a variety of relevance or performance metrics, as discussed in further detail below. For example, the relevance measure for the geo-block with respect to a location group can be determined using a first number of distinct mobile devices that triggered the geo-block during a pre-selected time period and a second number of the mobile devices that triggered the geo-block and also triggered the brand or category associated with any of the locations in the location group during the same time period. The relevance measure can simply be a ratio of the second number to the first number or some other combination of the two numbers and/or other factors. The first number and the second number can be determined using logged request data or extracted mobile device data. Other examples of determining the relevance measures (or performance measures) are provided below with reference to FIGS. 27-33.

In certain embodiments, the feature engineering module is further configured to assign the selected geoblocks into a number of geo-block (GB) brackets according to their respective relevance measures (or performance measures), as recited in block 1510 in FIG. 15. In certain embodiments, the selected geo-blocks are divided into a number of geo-block brackets each corresponding to a distinct range of relevance measures (or performance measures). For example, suppose there are 2000 selected geo-blocks, which can be all of the geo-blocks in one or more targeted geo-graphical regions, and there are 20 geo-block brackets (e.g., GBB1, GBB2, . . . , GBB20), the geo-blocks in GBB1 could include 100 geo-blocks with the highest relevance or performance measures, the geo-blocks in GBB2 could include 100 geo-blocks with the next highest relevance or performance measures, and so on. Assigning the geo-blocks into geo-block brackets largely reduces the data dimensions.

In certain embodiments, the feature engineering module is further configured to select a set of brands, which may be, for example a set of relatively big brands (BB) that have sizable visits by mobile users to allow sufficient density of data, as recited in block 1505 in FIG. 15. Depending on how many brands are selected, the feature engineering module may be further configured to assign the selected big brands into a number of big brand (BB) brackets according to their respective measures of relevance, as recited in block 1520 in FIG. 15. The feature engineering module may be configured to determine the relevance measure for each selected brand with respect to the location group. The relevance measure for a brand can be determined using a third number of distinct mobile devices that triggered the brand during a pre-selected time period and a fourth number of the mobile devices that triggered the brand and also triggered a brand associated with any of the locations in the location group during the same time period. The relevance measure can simply be a ratio of the fourth number to the third number or some other combination of the two numbers and/or other factors. The third number and the fourth number can be determined using logged request data or extracted mobile device data.

In certain embodiments, the selected brands are divided into a number of big brand brackets (BBB) each corresponding to a distinct range of relevance measures. For example, suppose there are 1000 selected brands, and there are 20 big brand brackets (e.g., BBB1, BBB2, . . . , BBB20), the brands in BBB1 could include 50 brands with the highest performance measures, the brands in BBB2 could include 50 geo-blocks with the next highest performance measures, and so on. Selecting the big brands and optionally assigning them to the big brand brackets further reduces the data dimensions.

The feature engineering module is further configured to construct a set of features for each of the plurality of mobile devices using the mobile device data associated with the mobile device and corresponding to the training time period TTP. As shown in FIG. 15, the feature engineering module is configured to: select a user from among a plurality of users (block 1525), generate features related to each geo-block bracket for the user (block 1530), generate features related to retail geo-blocks for the user (block 1535), identify a set of most frequently visited geo-blocks (MFVGB-1, . . . , MFVGB-n) for the user and generate features related to each of the MFVGBs for the user (block 1540), generate features related to each BB or BB bracket (BBB) for the user (block 1545), and generate one or more other features for the user (block 1550). In certain embodiments, the set of MFVGBs may include a MFVGB from each of a plurality of geo-block functionalities, such as retail, residential, industrial, etc. Thus, the MFVGBs may include a residential MFVGB, which could be the home of the mobile user, an industrial MFVGB, which could be the workplace of the mobile user, and a retail MFVGB, which may be where the individual does most of the shopping, etc.

FIG. 16 illustrates as examples a set of features for a mobile device with UID 52**256 for the time period TTP. As shown in FIG. 16, the set of features may include device/user meta data. The features related to each GBB of the geo-block brackets ($GBB_1$, $GBB_2$, . . . , $GBB_m$) include a number of visits to any geo-block in the GBB during the time period TTP, time of last visit to any geo-block in the GBB during TTP, an average length of stay per visit to any geo-block in the GBB during TTP, etc. In certain embodiments, the number of visits to the GBB is divided among a plurality of time blocks (shown as TB1, TB2, TB3) during a day, such as morning (6:00 am to 12:00 pm), afternoon (12:00 pm to 6:00 pm) and evening (6:00 pm to 6:00 am).

Likewise, the features related to each BB or BBB of the big brands ($BB_1$, $BB_2$, . . . , $BB_m$) or big brand brackets ($BBB_1$, $BBB_2$, . . . , $BBB_m$) include a number of visits to the BB or any brand in the BBB during the time period TTP, time of last visit to the BB or any brand in the BBB during TTP, an average length of stay per visit to the BB or any brand in the BBB during TTP, etc. In certain embodiments, the number of visits to the BB or any brand in the BBB is divided among a plurality of time blocks (shown as TB1, TB2, TB3) during a day, such as morning (6:00 am to 12:00 pm), afternoon (12:00 pm to 6:00 pm) and evening (6:00 pm to 6:00 am).

A retail geo-block is a geo-block having a retail functionality, as indicated by its associated meta data. In certain embodiments, the features related to the retail geo-blocks among the selected geo-blocks include a number of weighted visits and a number of net visits. The number of net visits is the number of visits made with the mobile device to any of the retail blocks within the time period TTP, as determined using the mobile device data associated with the mobile device and corresponding to the TTP. The number of weighted visits is the weighted sum of a number of visits to each of the retail geo-blocks multiplied by a weight of the retail geo-block. The weight of the retail geo-block can be computed based on a fifth number of distinct mobile devices that triggered the retail geo-block during a pre-selected time period and a sixth number of the mobile devices that triggered the retail geo-block and also triggered a brand associated with any of the locations in the location group during the same time period. The weight can simply be a ratio of the sixth number to the fifth number or some other combination of the two numbers and/or other factors. The sixth number and the fifth number can be determined using logged request data or extracted mobile device data.

In certain embodiments, the most frequently visited geo-block (MFVGB) is the geo-block that has the most number of visits from the mobile device compared to the other selected geo-blocks. The features associated with the MFVGB can include for example, a number of visits to the MFVGB by the mobile device during the time period TTP, and the distance from the MFVGB to a nearest location among the locations in the location group. In certain embodiments, the number of visits to the MFVGB is divided among a plurality of time blocks (shown as TB1, TB2, TB3) during a day, such as morning (6:00 am to 12:00 pm), afternoon (12:00 pm to 6:00 pm) and evening (6:00 pm to 6:00 am).

In certain embodiments, the set of features for the mobile device may include other features, such as mobility features and feedback features. The mobility features may include, for example, a number of distinct brands triggered by the mobile device during the time period TTP, and a GB ratio of a number of distinct geo-blocks triggered by the mobile device to the sum of visits to all of the triggered geo-blocks during the time period TTP. The feedback features may include, for example, pre-exposure feature, which may be a number impressions of one or more documents related to the location group on the mobile device during the time period TTP, a click/call ratio, which may be the ratio of a number of times a click is made on the mobile device in response to the one or more documents to the number of impressions of the one or more documents, and a secondary action ratio, which may be the ratio of a number of times secondary actions are made on the mobile device in response to the one or more documents to the number of impressions of the one or more documents.

The sets of features for all of the plurality of mobile devices together form a feature space. The feature space corresponding to the time period TTP is referred to herein as the training feature space.

Figure 17:
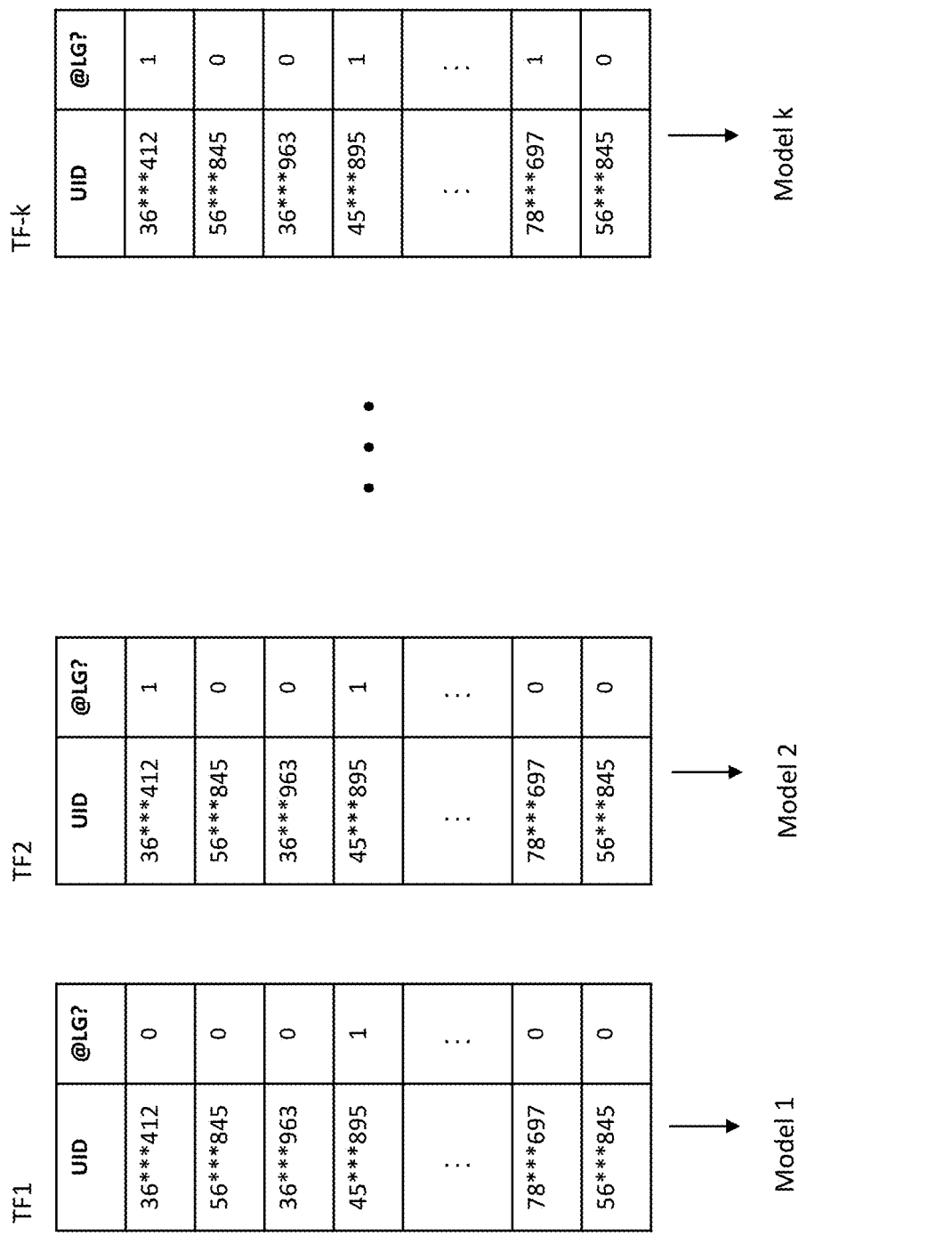
FIG. 17 are tables illustrating a plurality of sets of labels corresponding to respective time frames according to certain embodiments.

In certain embodiments, the feature generator is further configured to extract a set of labels corresponding to a time frame (e.g., TTF1) immediately after the training time period TTP, for the plurality of mobile devices. The set of labels can be extracted from location events in the processed requests having time stamps in the time frame, as recited in block 1130 in FIG. 11. In certain embodiments, the set of labels include one label for each of the plurality of mobile devices and the label is a "1" or "0" depending on whether the mobile device has triggered a brand associated with the location group during the time frame. The feature generator may extract a plurality of sets of labels for a plurality of time frames (e.g., TTF1, TTF2, . . . TTF-$k$), respectively, as shown in FIG. 17. Each set of labels is used to train a corresponding prediction model, as explained in further detail below.

As shown in FIG. 1, the off-line prediction subsystem 110 further includes a training module configured to employ machine learning approaches to train a prediction model using the training feature space and a set of labels, as recited in block 1140 in FIG. 11. In certain embodiment, the training module uses, for example, the Hadoop® Hive machine learning platform. The machine learning approaches used to train the off-line prediction models may include random forest, decision trees, and/or boosting trees. The machine learning approaches used in to train the on-line prediction model may include any one or more of: supervised learning using, for example, logistic regression, back propagation neural networks, etc., unsupervised learning using, for example, an Apriori algorithm, K-means clustering, semi-supervised learning, reinforcement learning using, for example, a Q-learning algorithm, temporal difference learning, and/or any other suitable learning style.

The training module may train a plurality of prediction models for a plurality of time frames (TTF1, TTF2, . . . ), respectively. The plurality of time frames have different durations. For example, TTF1 may span a day from the end of the training period TTP, TTF2 may span a few days or a week from the end of the training period TTP, TTF3 may span two weeks or a month from the end of the training period TTP, and so on. As shown in FIG. 1, the off-line prediction subsystem 110 further includes a storage device storing therein a model library including prediction models trained by the training module, each prediction model in the model library corresponds to a location group and a time frame.

As the front-end server continue to receive and process requests and generate additional entries in the request log corresponding to the processed requests (block 1150 in FIG. 11), off-line data manager is configured to extract mobile device data corresponding to the prediction time period (PTP) (block 1160 in FIG. 11) and the feature generator is further configured to construct a prediction feature space corresponding to the prediction time period PTP for the location group similarly as it constructs the training feature space for the location group (block 1170 in FIG. 11), as discussed above.

As shown in FIG. 1, the off-line prediction subsystem 110 further includes an off-line prediction module configured to apply each prediction model for the location group to the prediction feature space to obtain a plurality of sets of prediction results, each set of prediction result corresponding to a respective one of a plurality of prediction time frames (e.g., PTF1, PTF2, PTF3, as illustrated in FIGS. 12A and 12B). The plurality of prediction time frames (e.g., PTF1, PTF2, PTF3) correspond to respective ones of the plurality of training time frames (e.g., TTF1, TTF2, TTF3)

and have about the same durations as the corresponding training time frames. For example, PTF1 may span a day from the end of the training period PTP, PTF2 may span a few days or a week from the end of the training period PTP, PTF3 may span two weeks or a month from the end of the training period PTP, and so on. As shown in FIG. 1, the off-line prediction subsystem 110 further includes an indexor configured to index the prediction results and a storage device storing therein a library of prediction results. As shown in FIG. 18, each prediction result corresponds to a mobile device, a location group and a time frame, and indicates a predicted probability that the mobile device will visit at least one of the locations in the location group during the time frame.

In certain embodiments, the off-line prediction subsystem 110 is further configured to train one or more real-time prediction models for the location group. As recited in block 1110 in FIG. 11, the off-line data manager is configured to extract a set of mobile device data corresponding to location events in a real-time prediction model training time period TTPr from location events in the time period TTPr. The time period TTPr is shown in FIGS. 12A and 12B to be near an end of TTP and may or may not overlap with TTP. The duration can be, for example, an hour, a few hours, a day, etc. In general, the duration is chosen to be long enough to allow sufficient data for feature engineering and short enough for real-time prediction. For example, TTPr can be the last hour, two hours or a day in the time period TTP. It could also be an hour, two hours or a day starting shortly before the end of the time period TTP, or soon afterwards.

In certain embodiments, as shown in FIG. 13, to extract the mobile device data for training a real-time prediction model, the off-line data manager uses the search engine to search, for each mobile device of a plurality of mobile devices, processed requests associated with the mobile device and having time stamps in a time period TTPr, and the buffer is configured to buffer the output from the search engine. The off-line data manager may use the compressor to compress the buffered data, such that multiple location events triggered by the mobile device at the same place with closely spaced time stamps within a preset time difference (e.g. 1 hour), are reduced to a single location event. The off-line data manager further buffers the compressed location events for the mobile device, and store the compressed location events in the mobile device database. The off-line data manager may skip the aggregator because of the short-term nature of the data involved.

Figure 19:
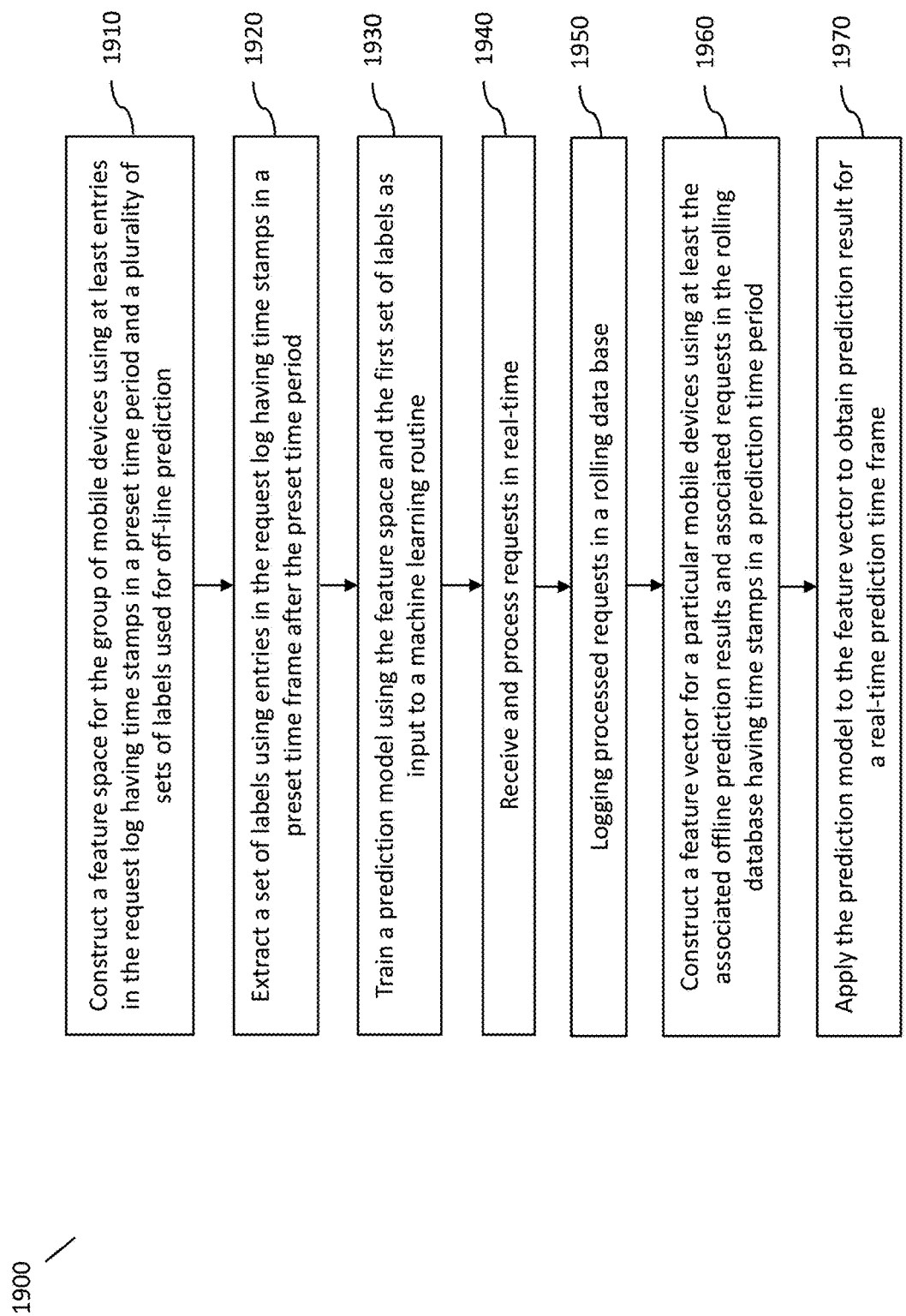
FIG. 19 is a flowchart illustrating a method performed in a system for location prediction according to certain embodiments.

FIG. 19 is a flowchart illustrating a method 1900 performed by the off-line prediction subsystem 110 to construct the real-time prediction training feature space. As recited in block 1910 in FIG. 19, the feature engineering module is configured to construct a feature space for the group of mobile devices using at least location events in a preset time period and a plurality of sets of labels used for off-line prediction (e.g., the plurality of sets of labels corresponding to the plurality of time frames TTF1, TTF2, ... TTF-$k$, respectively, as shown in FIG. 17). The feature space includes a set of features for each of the plurality of mobile devices.

FIG. 21 illustrates an exemplary set of features for one of the plurality of mobile devices. As shown in FIG. 21, the set of features include, in addition to a plurality of labels associated with the mobile device, the UID, some of the meta data associated with the user and/or the device, features related to a most recently visited geo-block during the time period TTPr, features related to a most recently visited brand during the time period TTPr, features related to a most recently used application on the mobile device during the time period TTPr, a total number of distinct brands visited during the time period TTPr, a total number of distinct geo-blocks visited during the time period TTPr, a shortest distance from a closest location in the location group in each of a series of time intervals during the time period TTPr, which would indicate whether the mobile device's movement with respect to the location group (e.g., moving away from or toward the location group), and the hour of day and/or day of week in which the end of the time period TTPr coincide. The set of features may further include the weather condition (e.g., sunny (0), cloudy (1), rainy (3), pouring (4), windy (5), hot (6), warm (7), cold (8), freezing (9), etc.) at or near the end of the time period TTPr, the speed of the mobile device, the name (or an ID number) of a road near which the mobile device is located at or near the end of the time period TTPr, and the name (or ID number) of the city in which the mobile device is located at or near the end of the time period TTPr. The speed of the mobile device can be detected from location data in consecutive requests received near the end of the time period TTPr. The weather condition can be looked up from publicly available weather data, and the road and the city in which the mobile device is located can be derived from the location data and publicly available map data.

In certain embodiment, as shown in FIG. 21, the features related to the most recently visited geo-block or brand include, for example, the functionality of the geo-block or the category of the brand, a time of visit as measured by the amount of time between the visit and the end of the time period TTPr, the length of stay during the visit, and distance from a closest location in the location group, etc. The features related to the most recently used application include, for example, a name of the application (e.g., Google Maps), a version of the application, and a duration of the use, etc.

Figure 20:
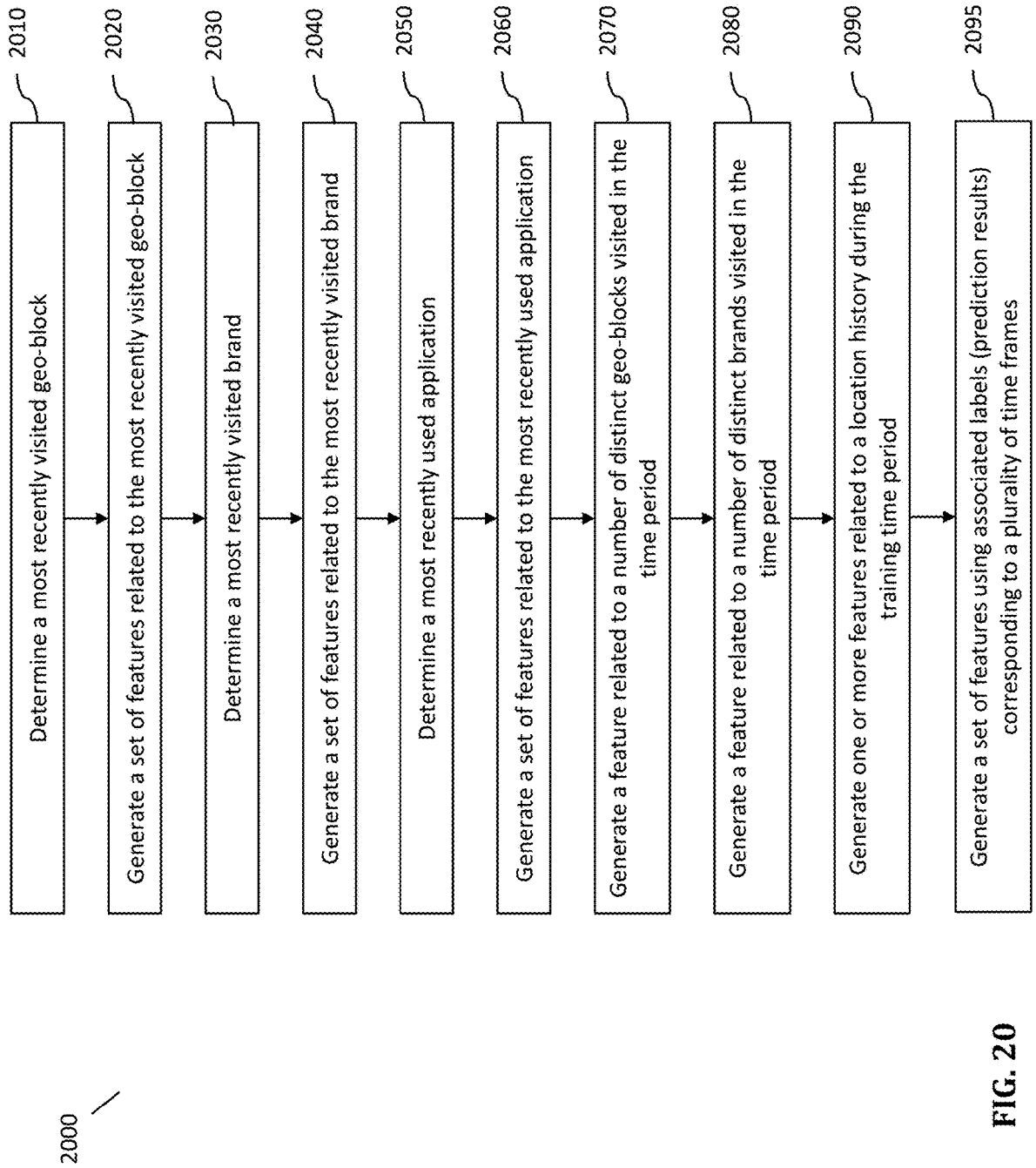
FIG. 20 is a flowchart illustrating a method for building a feature space according to certain embodiments.

FIG. 20 illustrates a method 2000 performed by the feature generator according to certain embodiments. As shown in FIG. 20, to construct the real-time prediction model training feature space, the feature generator is configured to, for each of the plurality of mobile devices, determine a most recently visited geo-block (as recited in block 2010), generate a set of features related to the most recently visited geo-block (as recited in block 2020), determine a most recently visited brand (as recited in block 2030), generate a set of features related to the most recently visited brand (as recited in block 2040), determine a mostly recently used mobile application (as recited in block 2050), generate a set of features related to the most recently used application (as recited in block 2060), generate a feature related to a number of distinct geo-blocks visited during the time period TTPr (as recited in block 2070), generate a feature related to a number of distinct brands visited during the time period TTPr (as recited in block 2080), generate one or more features related to a location history during the time period (as recited in block 2090), and generate a set of features using associated labels corresponding to a plurality of time frames (as recited in block 2095).

In certain embodiments, the feature generator is further configured to extract a set of labels corresponding to a time frame for real-time prediction (e.g., TTFr, as shown in FIGS. 12A and 12B) immediately after the training time period TTPr, for the plurality of mobile devices. The set of labels can be extracted from location events in the logged processed requests having time stamps in the time frame. In certain embodiments, the set of labels include one label for each of the plurality of mobile devices and the label is a "1"

or "0" depending on whether the mobile device has triggered a brand associated with the location group during the time frame. The feature generator may extract a plurality of sets of labels for a plurality of time frames (not shown). Each set of labels is used to train a corresponding real-time prediction model.

In certain embodiments, the training module is further configured to employ machine learning approaches to train a real-time prediction model using the real-time prediction training feature space and the set of real-time prediction labels, as recited in block 1930 in FIG. 19, using the same or different the machine learning approaches as in the training of the off-line prediction models. The trained real-time prediction model is stores in the model library corresponding to the location group and the time frame TTFr.

As shown in FIG. 1, the on-line prediction subsystem 120 includes an on-line data manager, a rolling database and a real-time prediction module according to certain embodiments. The on-line data manager is configured to receive the feedbacks from the document server and the processed requests from the front end server and store the associated data in the rolling database. The rolling database is configured to store short-term rolling data of the feedbacks and the processed requests. The term for the rolling data can be, for example, 1 hour, 2 hours, 1 day, etc. As the front-end server continues to receive and process requests and generate processed requests (block 1940 in FIG. 19), the on-line data manager is configured to buffer the processed requests, and compress and log mobile device data and location events extracted from the processed requests into the rolling database (block 1950 in FIG. 19).

The real-time prediction module is configured to, in response to a processed request output by the front-end server, construct a set of real-time prediction features from relevant data in the rolling database having time stamps in a real-time prediction time period PTPr (as shown in FIGS. 12A and 12B), which has about the same duration as the real-time training time period TTPr and has a start time shortly before the end of the time period TTP, or soon afterwards, and an end time shortly after the time of the particular request. The real-time prediction module is further configured to apply an appropriate real-time prediction model to the real-time features to obtain on-line location predictions corresponding to a real-time prediction time frame PTFr (also shown in FIGS. 12A and 12B), provide the on-line location prediction to the document server in real-time so that the document server can evaluate the processed request and make decisions on whether to serve a document and what document to server to as associated mobile device based at least on the on-line location prediction.

In certain embodiments, the real-time prediction module is configured to use a method similar to method 2000 (block 1960 in FIG. 19) to construct the set of real-time prediction features for a particular mobile device, in response to a particular processed request associated with the particular mobile device received in real-time from the packet-based network. In certain embodiments, the set of real-time prediction features are constructed from data corresponding to location events in the prediction time period PTPr, and from the plurality of off-line prediction results associated with the particular mobile device and corresponding to the off-line prediction time frames PTF1, PTF2, PTF3, . . . , such as those shown in FIG. 18. The resulting feature space is similar to the training feature space shown in FIG. 21, with the real-time training time period TTPr replaced by the real-time prediction time period PTPr, and the off-line labels replaced by the corresponding off-line prediction results.

The real-time prediction time frame PTFr should be within the shortest off-line prediction time frame (e.g., PTF1) if the prediction results corresponding to the shortest off-line prediction time frame are used to construct the set of real-time prediction features.

The on-line prediction module is further configured to retrieve the real-time prediction model for the location group from the model library and apply the real-time prediction model to the set of real-time prediction features to obtain prediction results for the particular mobile device, which include a predicted probability that the particular mobile device will visit one of the locations in the location group during the real-time prediction time frame PTFr.

In certain embodiments, the spatial index and meta data for each of at least some of the geo-blocks in the geo-block database, are generated by a geo-block definition subsystem 2210, as discussed in further detail below. A geo-block scoring subsystem 2220 can be employed to score and rank the geo-blocks produced by the geo-block definition subsystem 2210, according to certain embodiments, as discussed in further detail below. The ranks of the geo-block can then be used to organize the geo-blocks into brackets, as discussed above.

Figure 22:
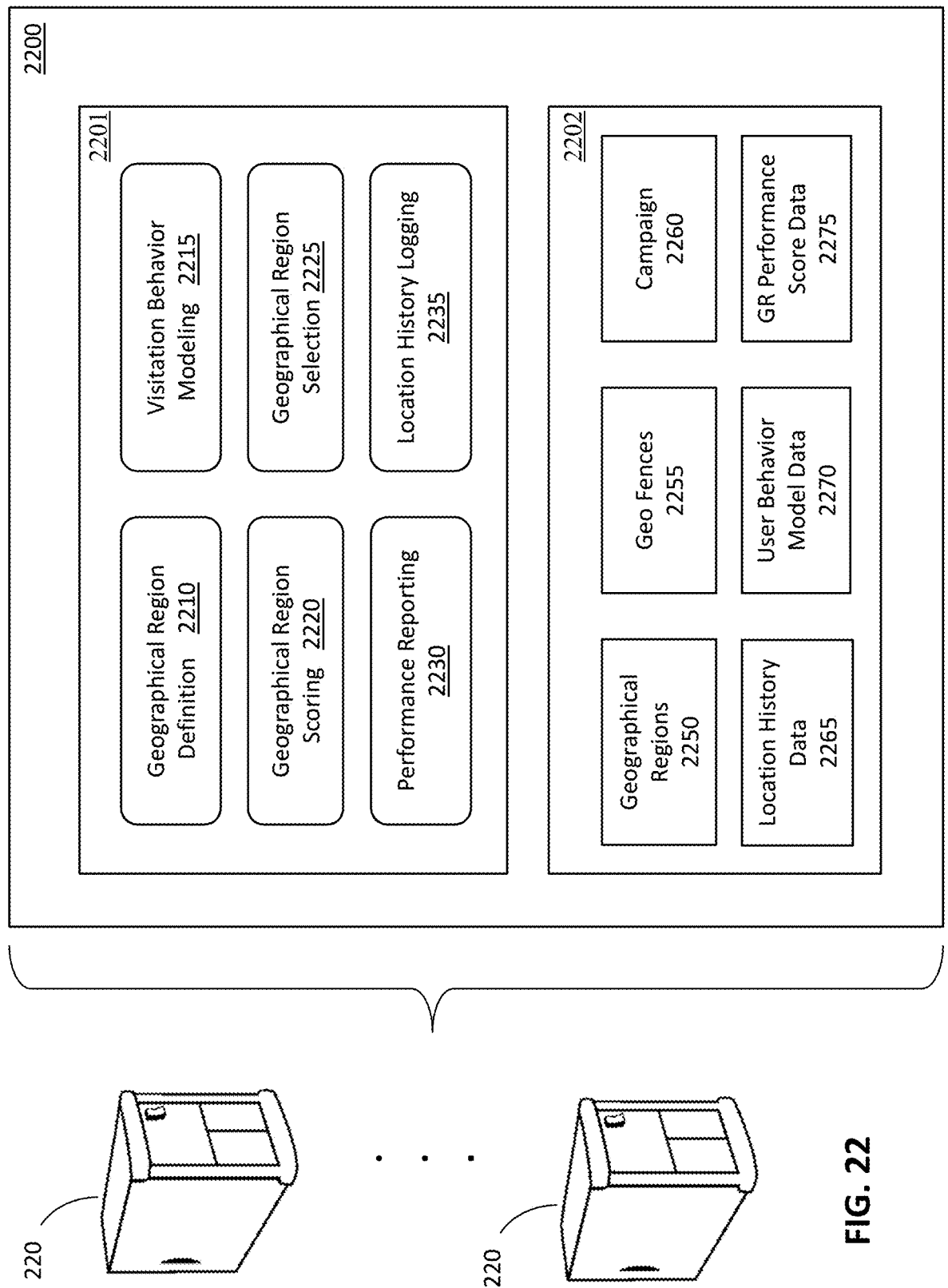
FIG. 22 is diagrammatic representation of an information server system provided using one or more computer/server systems according to certain embodiments.

In certain embodiments, in addition to the on-line and/or off-line prediction results associated with a mobile device, the location data in the request associated with the mobile device is also examined with respect to one or more targeting areas in determining whether to deliver certain information to the mobile device. In certain embodiments, the targeting areas are formed using one or more geo-blocks selected based on their performance measure (or relevance measure) for a particular information campaign. FIG. 22 is a diagrammatic representation of a information server system 2200 provided by one or more computer/server systems 220, which can serve as the location processor 101 in system 100, according to certain embodiments. System 2200 employs dynamically adjusted targeting areas that utilize location visitation patterns to optimize performance metric driven by campaign goals while ensuring that a total volume of users can be reached for mobile advertising. As shown in FIG. 2 and FIG. 22, the processor(s) 202 in the computer/server system(s) 120, when executing one or more software programs loaded in the respective main memory (or memories) 204, provide the information server system 2200 including a geographical region definition subsystem 2210, a visitation behavior modeling subsystem 2215, a geographical region performance scoring subsystem 2220, a geographical region selection subsystem 2225, a real-time performance metric reporting subsystem 2230, and a location history data-logging subsystem 2235. The system 2200 makes use of a plurality databases storing data used and/or generated by the information server system 2200, including a database 2250 for storing the geometry and meta information of generated geographical regions (or geo-blocks), a database 2255 for storing spatial indices and meta data of geo-places, a database 2260 for storing campaign information, a database 2265 for storing logged mobile supply data, and one or more other databases (e.g., database 2270 for storing computed meta data such as mobile device user behavior model data and database 2275 for storing geographical regions' performance score data, etc.). Any or all of these databases can be located in the storage(s) 210 of the one or more computer systems 120, or in one or more other server/computer system(s) 120 and/or NAS 121 in the network 200, which the process(s) 202 can access via the network interface device 208.

Figure 23:
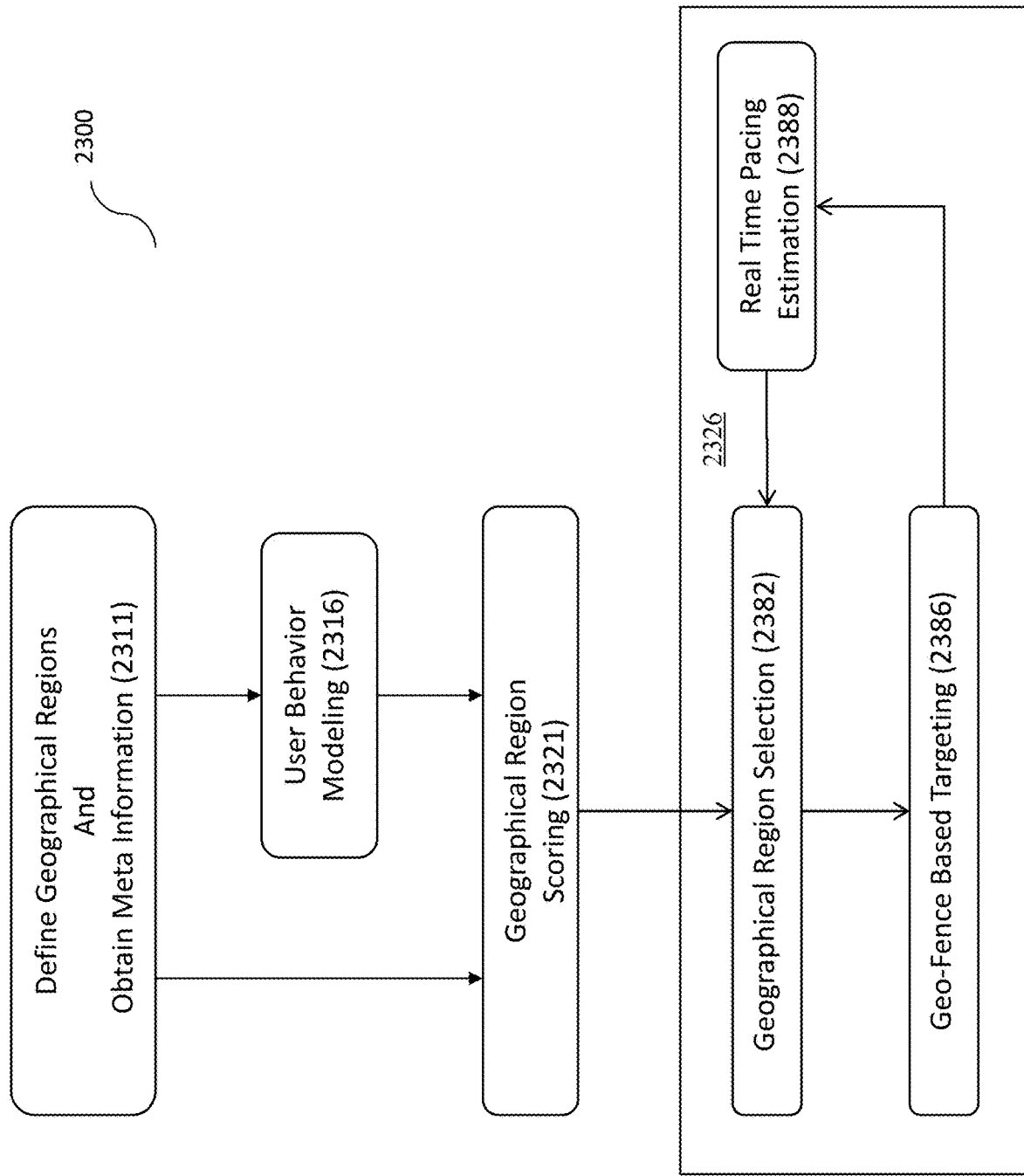
FIG. 23 is a flowchart illustrating an information process performed by the information server system according to certain embodiments.

FIG. 23 is a flowchart illustrating a method 2300 performed by the information server system 2200 according to certain embodiments. As shown in FIG. 23, the method 2300 includes a process 2311 performed by the geographical region definition subsystem 2210, in which geographical regions are defined and associated meta information is obtained, as discussed in further detail below. In certain embodiments, various meta information can be mapped to a defined geographical region, such as its functionality (residential, work, retail, etc.), its average mobile user volume and its KPI performance index. The meta information can be made available to the other subsystems in the system 2200 and can be incorporated into the construction of the targeting areas.

The method 2300 further includes visitation behavior modeling process 2316, which models the visitation behavior of intended mobile device users, for example, customers of a particular brand or a particular business entity. In certain embodiment, the visitation behavior modeling subsystem estimates the probability for customers of a particular business entity to visit different geographical regions by first obtaining a sample set of customers of the business entity, then extracting from data provided by subsystem 2235 the visitation history of these sample customers to the geographical regions stored in database 2270.

The method 2300 further includes a performance scoring process 2321, in which a quality or performance score or measure is assigned for each of the geographical regions. In certain embodiment, the score is dependent on specific campaign performance goal(s). For example, in some cases, an ad campaign's goal is to drive more people to visit their branded stores. Then, the performance score of a geographical region can be defined as the likelihood of a user to visit a branded store after the user has visited this particular geographical region. In cases that brand sales revenue is of interest, the performance score can be derived from brand customer visitation behavior and purchase behavior.

In certain embodiments, processes 2311, 2316, and 2321 are performed offline. The method 2300 further includes a real-time or on-line adjustment process 2326 performed by the geographical region selection subsystem 2225. In certain embodiments, the real-time adjustment process 2326 includes several sub-processes, part or all of which can be performed on-line or in real time. As shown in FIG. 23, the real-time adjustment process 2326 includes a geographical region selection process 2382, a geo-fence-based targeting process 2386 and a real-time pacing estimation process 2388. At the start of a campaign, the geographical region scoring subsystem 2220 provides initial targeting areas by selecting certain number of top scoring geographical regions. This number can be determined based on consideration of estimated average performance or average total reachable user volume. These regions are processed to produce a spatial index file, which is then used to detect users whose real time locations fall within an active geo-fence. These users become potential candidates for receiving information service. Concurrently, subsystem 2225 tracks the rate at which information related to the campaign is being served to users (i.e., pacing status) and adjusts the geo-fence accordingly in process 2326. Thus, a balance between performance and pacing can be reached using the method 2300.

Figure 24:
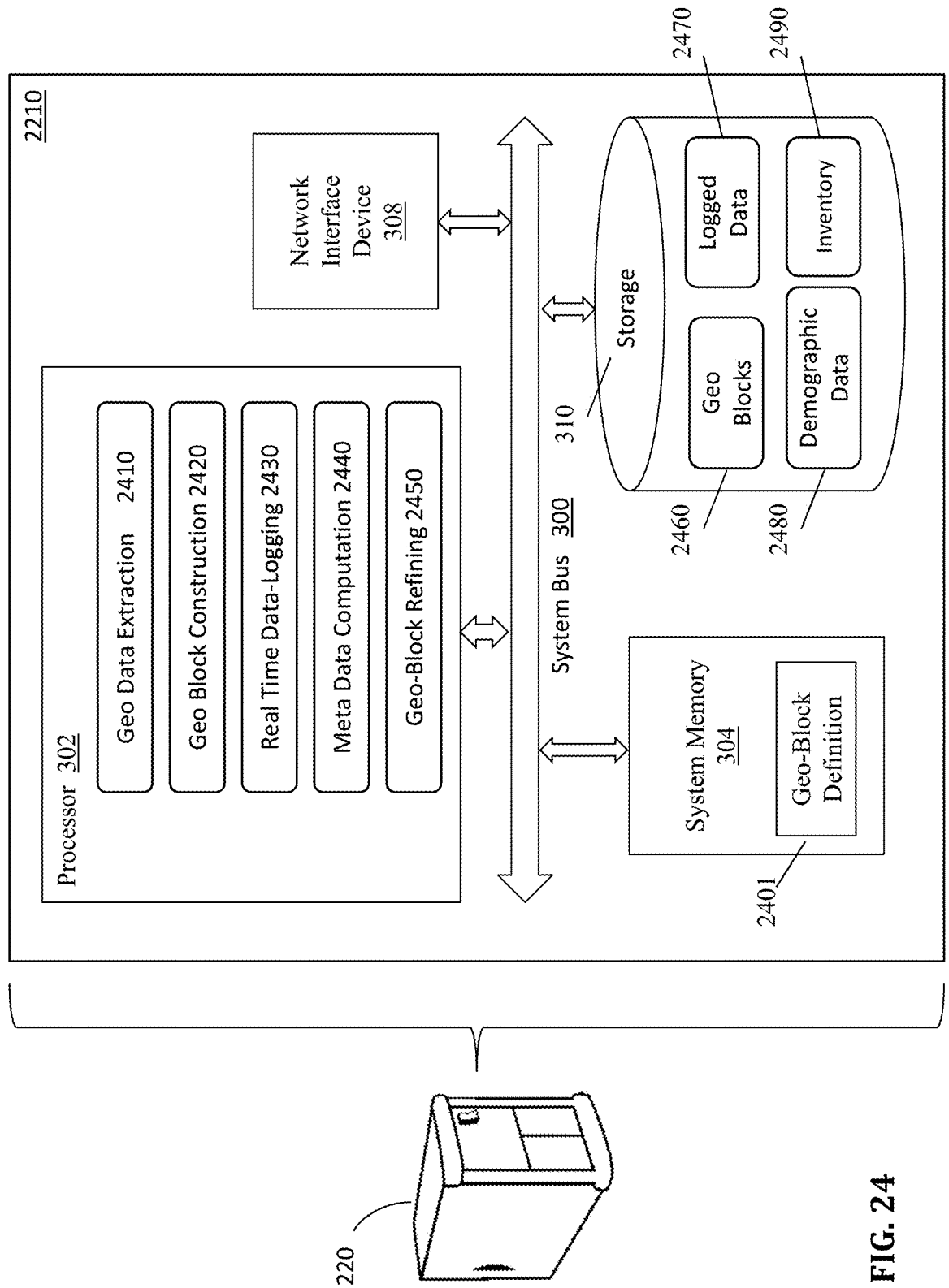
FIG. 24 is a diagrammatic representation of a geo-block definition subsystem provided by one or more computers/servers according to certain embodiments.

FIG. 24 is a diagrammatic representation of the geo-block definition subsystem 2210 provided by one or more computer/server systems 220 according to certain embodiments. As shown in FIG. 24, the processor(s) 202 in the computer/server system(s) 120, when executing a geo-block definition software program 2401 loaded in the main memory 204, provides the geo-block definition subsystem 2210, which includes a geo data extraction module 2410, a geo-block construction module 2420, a real-time data-logging module 2430, a meta data computation module 2440, and a geo-block refining module 2450. The geo-block definition subsystem 2210 makes use of a plurality databases storing data used and/or generated by the geo-block definition subsystem 2210, including a database 2460 for storing the geo-blocks generated by the geo-block construction module 2420 and/or the geo-block refining module 2450, a database 2470 for storing logged mobile supply data, and one or more databases (e.g., database 2480 and 2490) for storing computed meta data such as demographic data and inventory data. Any or all of these databases can be located in the storage 210, or in another server/computer 120 and/or NAS 121 in the network 200, which the process 202 can access via the network interface device 208.

Examples of the geo-blocks created by the subsystem 2210 are illustrated in FIG. 7, according to certain embodiments. In general, the definition of geographical regions is not limited to that described above. A different set of geographical regions with or without its own meta information can also be used for the subsequent processes.

Figure 25:
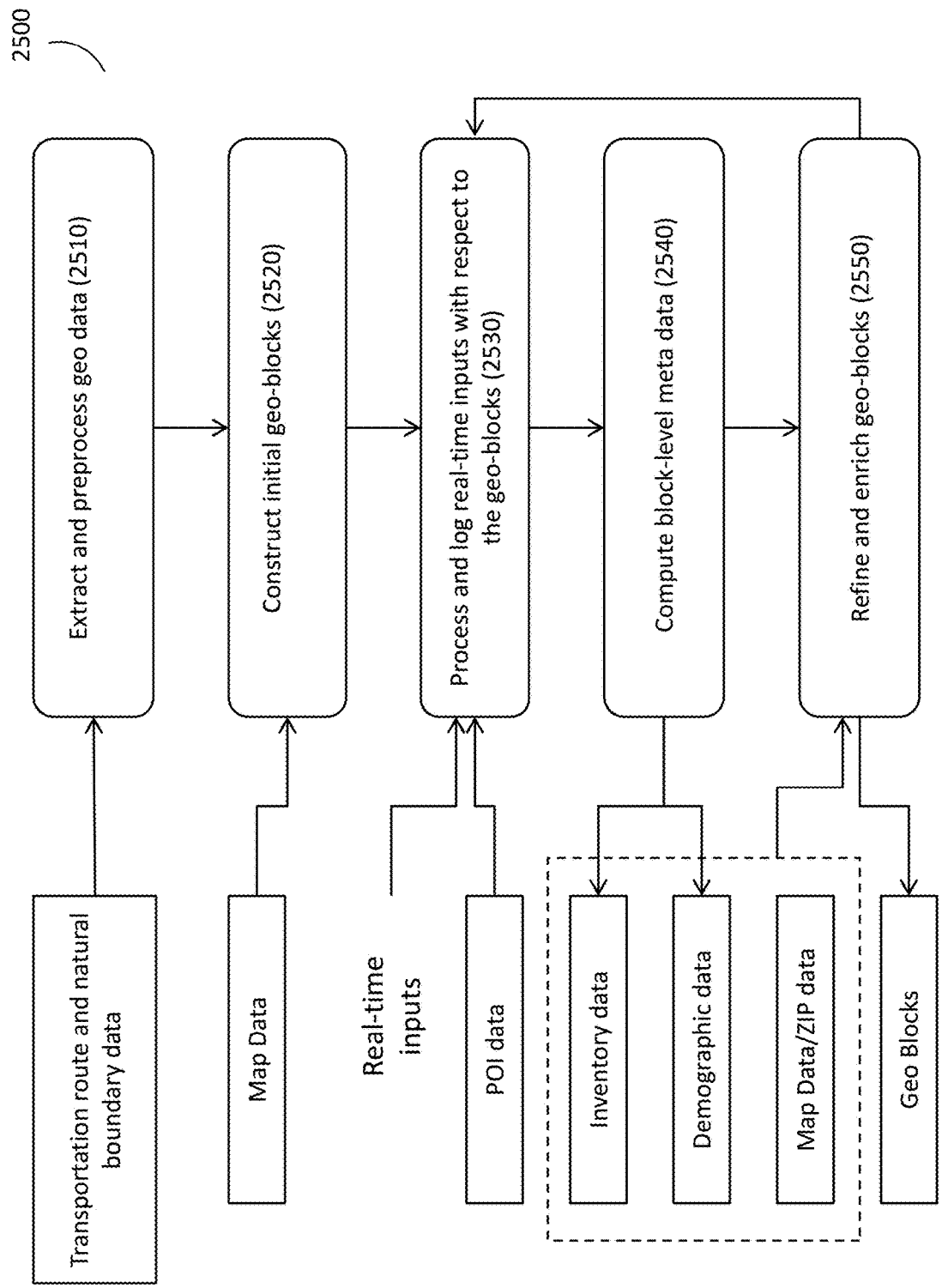
FIG. 25 is a flowchart illustrating a method performed by the geo-block definition system according to certain embodiments.

FIG. 25 illustrates a method 2500 performed by the geo-block definition system 2200 according to certain embodiments. As shown in FIG. 25, the geo data extraction module 2410 obtains publicly available transportation route and natural boundary data from a server in the network 200 that provides the data, and extracts and pre-processes (2510) geographical information of transportation routes and natural boundaries (geo-data) based on the transportation route and natural boundary data. The geo block construction module 2420 creates (2520) geo-blocks using the extracted geo data and publicly available map data. The real-time data-logging module 2430 processes and logs (2530) real-time mobile supplies (e.g., requests for advertisement from mobile publishers) with respect to the created geo-blocks. The meta data computation module 2440 obtains (2540) meta data such as location specific attributes from the logged mobile supply data and various data sources. The geo-block refining module 2450 refines (2550) the geo-blocks to improve boundary cases and to incorporate geographical information of real world objects not considered by the geo-block construction module 2420, and to enrich the geo-blocks with relevant meta data.

In process 2510, geographical information of transportation routes (highways, railways, waterways etc.), as well as natural boundaries (coastlines, lake boundaries etc.) are collected. One example data source for this purpose is OpenStreetMap (www.openstreetmap.org/). Geometrically, these objects are described as collections of line segments, together with meta data information such as their type, width and traffic speed. In certain embodiments, these line segments are collected and scored based on their significance, e.g., residential area roads in residential area score lower than highways do. Line segments scored above a threshold are collected to form a line set, which is used in process 2520 to define initial geo-blocks.

Figure 26:
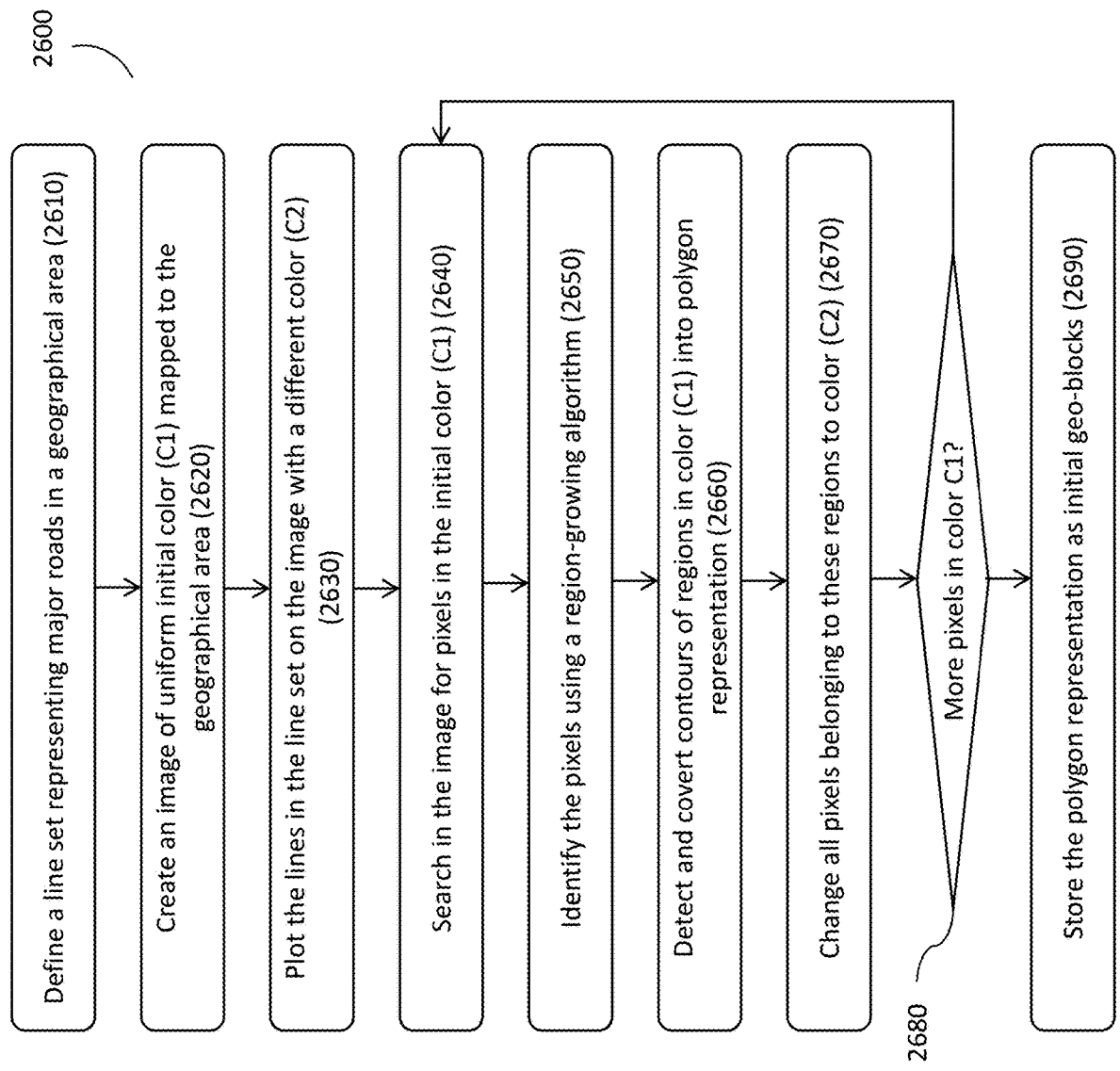
FIG. 26 is a flowchart illustrating a method for forming polygons outlining initial geo-blocks according to certain embodiments.

In process 2520, the line set defined in process 2510 is used to form polygons with boundaries aligned with the lines in the line set. FIG. 26 illustrates a method 2600 for forming such polygons according to certain embodiments. As shown in FIG. 26, the method 2600 comprises:

(2610) defining a line set (2620) creating an image of uniform initial color (C1), the size of the image being mapped to geographical area based on some predefined scaling ratio;

(2630) plotting the lines in the line set on the image with a different color (C2), taking into account road widths by plotting the lines with different thicknesses based on their width and scale information;

(2640) searching in the image for pixels in the initial color (C1) as uncovered regions;

(2650) for each uncovered region, identifying the pixels belong to this region using a region-growing algorithm;

(2660) detecting and converting the contours of this region into a polygon representation;

(2670) changing all of the pixels belonging to this region to the color (C2) to indicate that the region is covered;

(2680) determining whether there are still more pixels in color (C1) and repeating processes (2640) through (2670) until no more pixel in color C1 is found; and (2690) storing the polygon representation as initial geo-blocks.

The polygons thus formed are initial geo-blocks. In certain embodiments, to define geo-blocks on a national or global scale while maintaining sub-meter accuracy, the image processing method 2600 is used on each of multiple small areas and the polygons from the multiple small areas are merged to form initial geo-blocks for a larger area. By using different thresholds, geo-blocks of different granularities can be constructed to form hierarchical layers of geo-blocks. The geo-blocks formed in process 2520 are indexed and stored in the geo-block database 2460.

Figure 27:
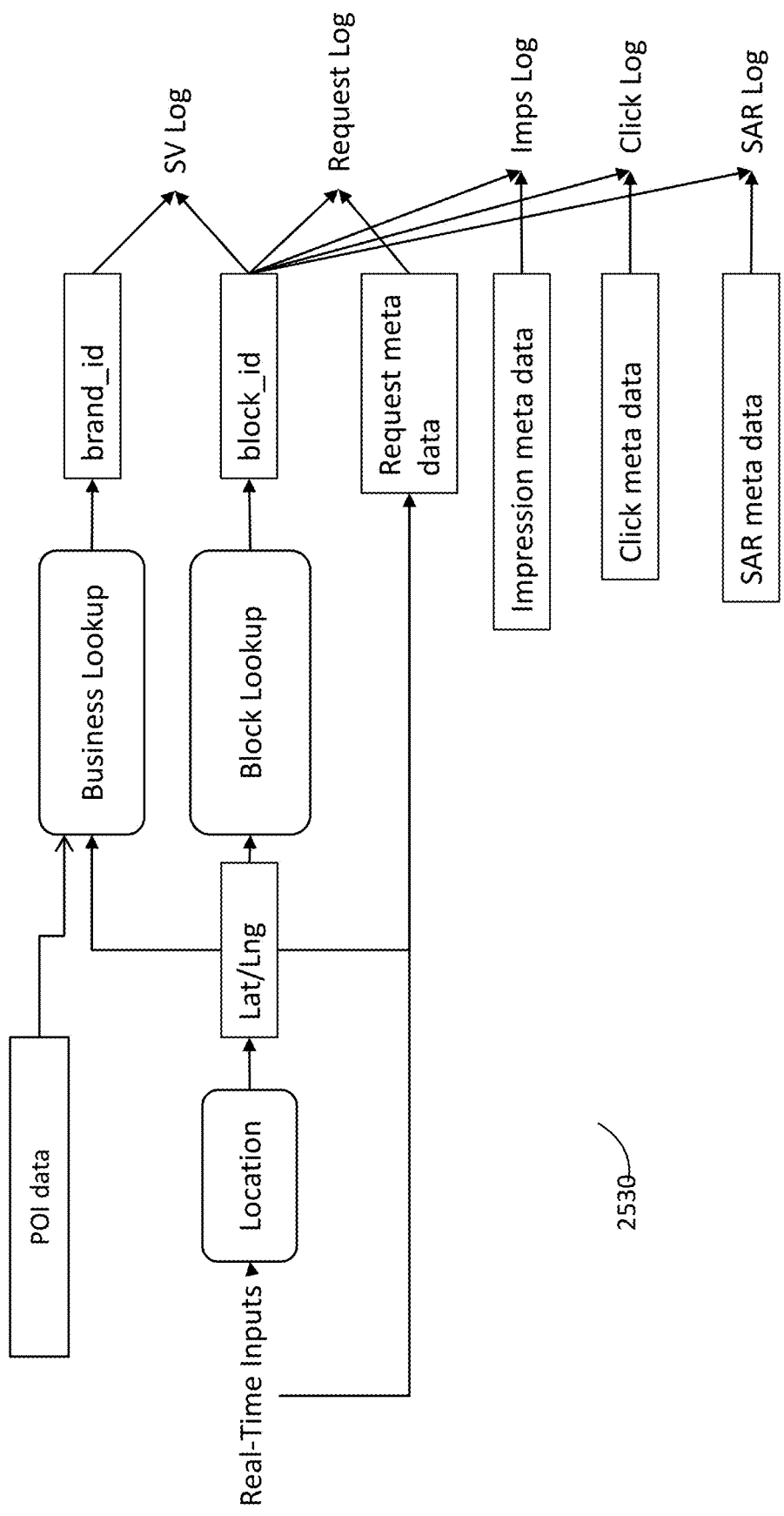
FIG. 27 is a flowchart illustrating a method for processing and logging real-time inputs (e.g., ad requests) with respect to initial geo-blocks according to certain embodiments.

In certain embodiments, real-time inputs (e.g., ad requests) are processed and logged with respect to the initial geo-blocks in process 2530, as illustrated in FIG. 27. For example, given an incoming ad request or any other signal carrying location information of a mobile device, the location information is processed by a location module, such as the one disclosed in U.S. patent application Ser. No. 14/716,811, filed May 19, 2015, entitled "System and Method for Marketing Mobile Advertising Supplies," which is incorporated herein by reference in its entirety. The location module outputs verified or derived mobile device location in the form of, for example, latitude/longitude (lat/long), which is then processed by a block Lookup module. The block lookup module carries out a spatial search against the block index in the geo-block database 2460 to determine which geo-block the mobile device is located in, and returns a block_id identifying the geo-block in which the mobile device is located.

Similarly, the mobile device location is processed by a point of interest (POI) lookup module to determine if the location is associated with any POI (indicating that the user might be visiting the POI). In some implementation, this lookup is implemented as a spatial index search over a POI list, a device is associated with a POI whenever its location triggers an existing POI geo-fence (e.g., a circular fence surrounding a business location of a brand). In some other implementation, a POI is represented as a polygon geo-fence corresponding to the building, area, or the parking lot of the POI. A POI association is identified whenever the device location triggers the POI geo-fence, as described in U.S. patent application Ser. No. 14/716,811 cited above.

As illustrated in FIG. 27, process 2530 creates five log files for each real-time input triggering a POI: the POI visitation log (SV log), a request log, an impression log (imps log), a click log and a secondary action log (SAR log). The essential components of each log are described as follows:

SV Log: (UID, BRAND_ID, TIMESTAMP, BLOCK_ID)

Request Log: (UID, REQUEST_ID, BLOCK_ID, other typical request meta data)

Imps Log: (UID, REQUEST_ID, BLOCK_ID, other typical imps meta data)

Click Log: (UID, REQUEST_ID, BLOCK_ID, other typical click meta data)

SAR Log: (UID, REQUEST_ID, BLOCK_ID, other typical SAR meta data)

Here UID is the unique device id in the forms of UUID, IDFA, GIDFA or ANDROID_ID; REQUEST_ID is the unique id identifying a particular real-time input (e.g., ad request), BLOCK_ID represents a unique geo-block in which the mobile device associated with the real-time input is located. As an example, FIG. 28 is a table illustrating a request log according to certain embodiments.

In certain embodiments, one or more of the above logs can be used in process 2540 to compute meta data for the geo-blocks, which can be used to determine neighborhood attributes associated with the geo blocks. For example, human activity levels can be studied by counting ad request frequency, and geo-block associations can be determined by finding subsets of geo-blocks that share the presence of the same mobile devices. Furthermore, residential geo-blocks with home zip code data (Infousa is one of such data provider) and map demographical data can be identified. Retail, school or office geo-blocks can be recognized with POI data (Infousa, Tomtom, OpenStreetMap are examples of data providers).

In process 2550, the geo-blocks are refined and enriched by applying merge and/or split of existing geo-blocks and by adding meta data to the geo-blocks. In one embodiment, meta data such as zip data, POI data, and demographic data, and logged real-time input data are overlaid to the existing geo-blocks and each block is evaluated by a merge step and a split step. In the merge step, the block geometry and meta data are used to determine the level of similarity between blocks. For example, two adjacent blocks may be merged if they both are residential areas and showing similar mobile device user behaviors. Another example is that a group of nearby geo-blocks that each have insufficient ad request data may be merged together for statistically more reliable analysis.

In the split step, the meta data is used to determine the neighborhood attributes represented by certain geo-blocks to determine whether and how each of these geo-blocks should be split into multiple smaller geo-blocks each with a more distinct neighborhood attribute. In certain embodiments, further refinement can be made with information of real world objects other than the boundary information used to create the initial geo-blocks. If any inconsistency is identified within a block, a split is carried out to divide a block into a number of smaller blocks each capturing more consistent neighborhoods.

Figure 29:
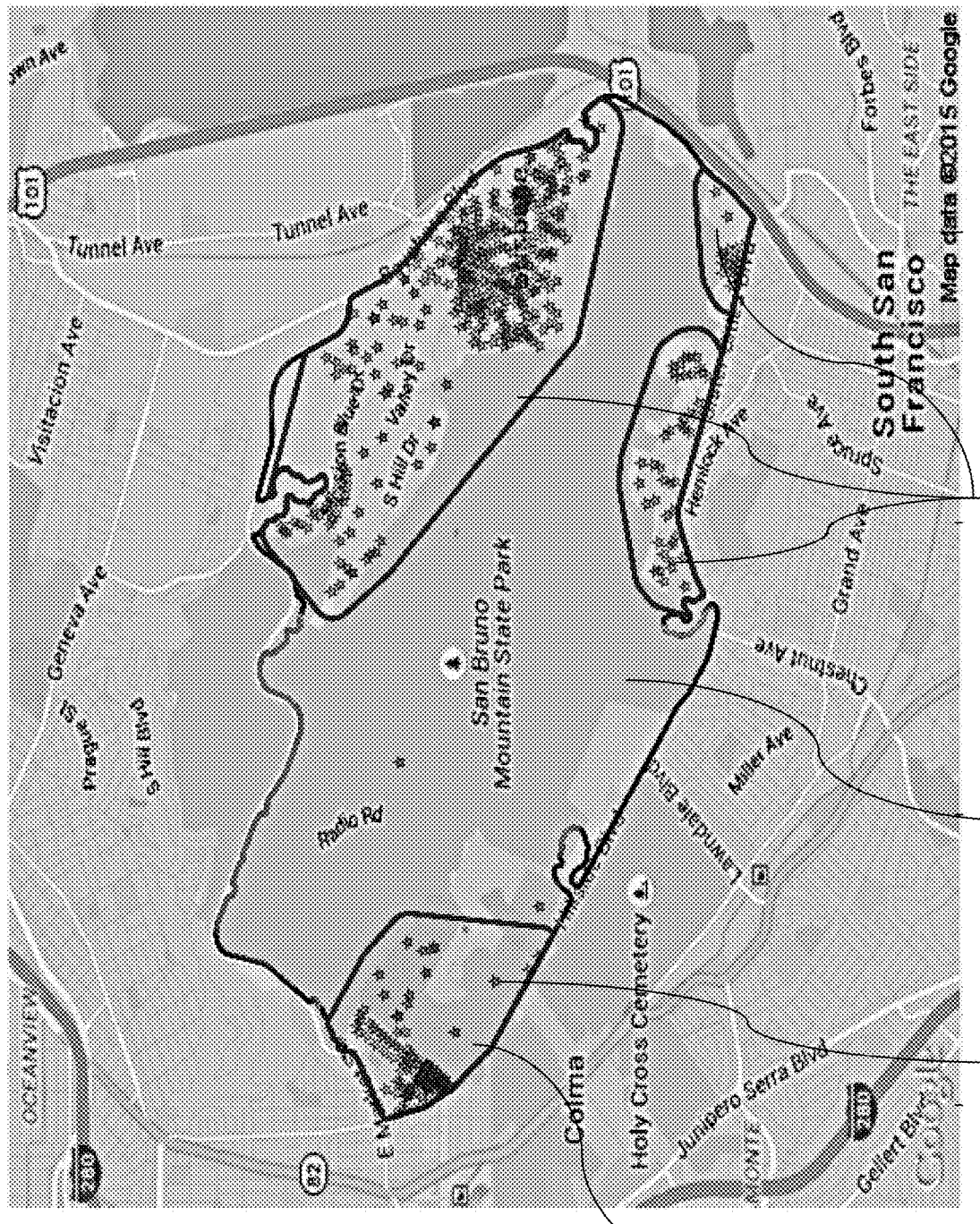
FIG. 29 is a map overlay diagram of geo-blocks illustrating separation of residential areas (enclosed by blue polygons) and a forest area by investigating spatial distribution of 9-digit zip codes.
Figure 30:
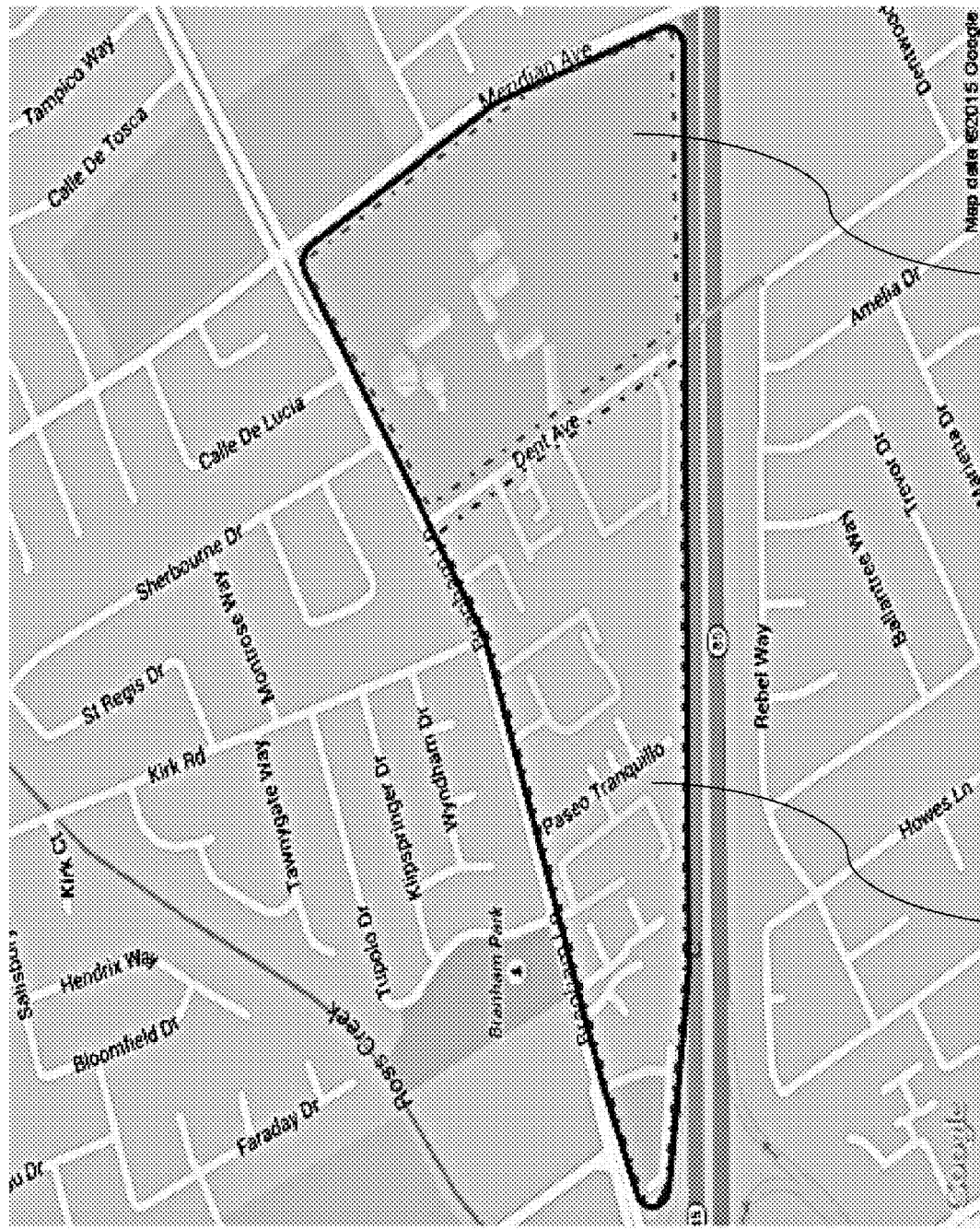
FIG. 30 is a map overlay diagram of geo-blocks illustrating separation of an elementary school from residential area.

FIG. 29 illustrates the separation of residential areas 2901 (enclosed by blue polygons) and a forest area 2902 by investigating the spatial distribution of 9-digit zip codes (Infousa) or by analyzing logged real-time inputs (e.g., ad requests) with detected locations 2903 represented by the red stars. FIG. 30 demonstrates the separation of an elementary school 3001 from a residential area 3002, where the school boundary data is derived from OpenStreetMap.

In certain embodiments meta data information can be added in process 2550 to the geo-blocks by making use of the meta data computed in process 2540. In one embodiment, a geo block can be tagged by their main functionalities as residential, retail, office, commercial block, and industrial, etc. In some other embodiment, a geo-block can be alternatively or additionally tagged by its major POIs, such as school, hospital, airport, stadium, etc. Exemplary data structures of meta data enriched geo-blocks according to certain embodiments are illustrated in FIG. 8. The added meta data can be used in location-based information services, such as ad targeting, ad performance optimization, location-based social networking, etc.

Thus, the present disclosure provides a system and method that produces geo-blocks by partitioning urban areas using geographical information of transportation routes, natural boundaries and other real world objects that are highly relevant to specific types of human activities. Each geo-block has at least one border defined by a real-world object such as a transportation route, a lake, a river, a hill or mountain range, a recreational area, a boundary of a large developed area, such as a school, an airport, etc., and can possess meta data indicating certain attributes such as neighborhood, office, school, airport etc. Actually, most of the geo-blocks are each bordered on all sides or multiple sides by such real world objects. The geo-blocks thus generate features with high level of relevance to real world location partitions, naturally avoid passing by road traffic, and offer flexible level of granularity for location-based information services and location targeting purposes.

Figure 31:
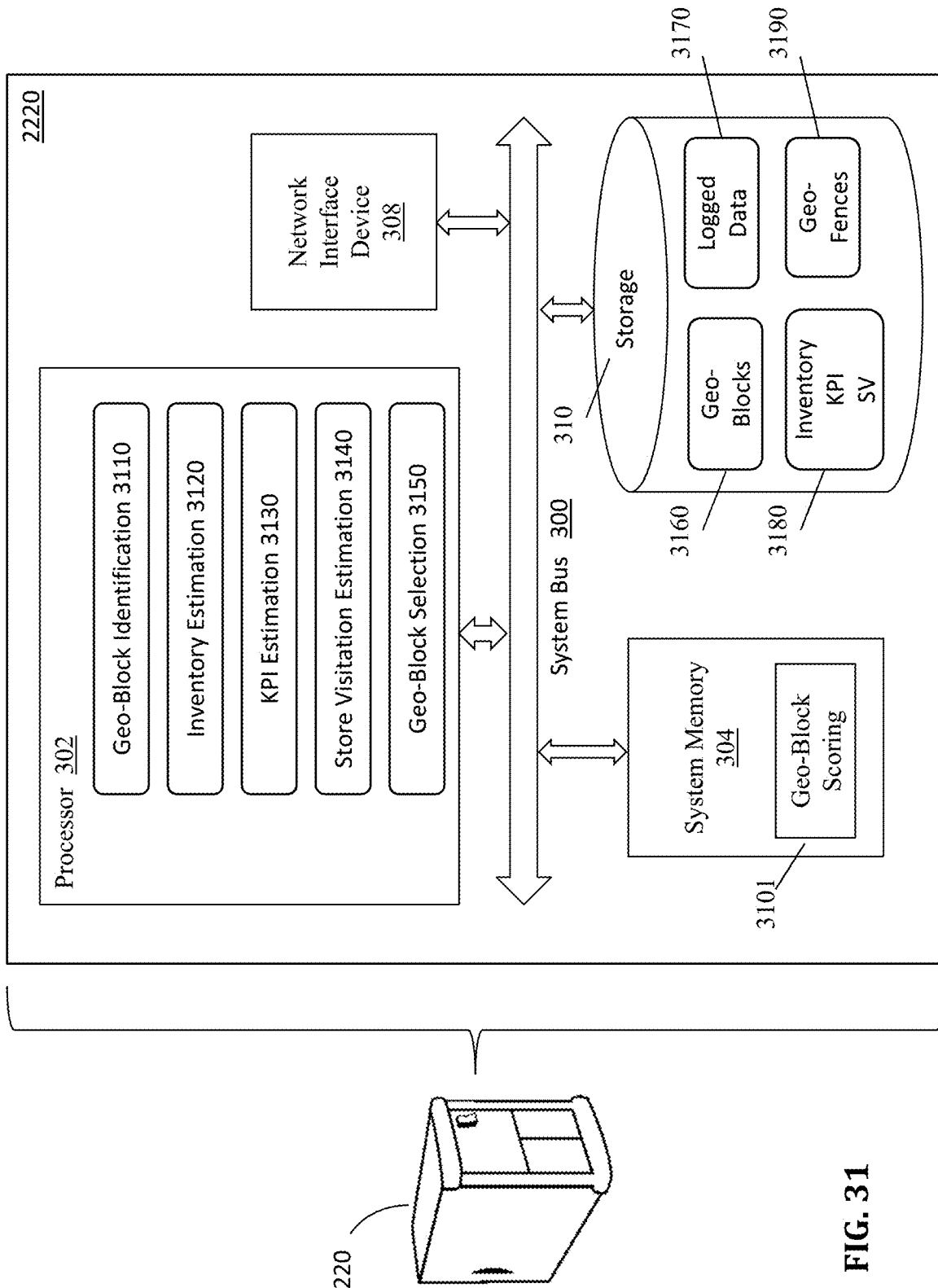
FIG. 31 is a diagrammatic representation of a geo-block scoring subsystem that scores and ranks the geo-blocks produced by the geo-block definition subsystem according to certain embodiments.

For example, FIG. 31 is a diagrammatic representation of a geo-block scoring subsystem 2220 that scores and ranks the geo-blocks produced by the geo-block definition subsystem 2210 according to certain embodiments. In certain embodiments, the system 2220 is provided by a computer/server system 220, which can be the same computer/server system 220 that also provides the subsystem 2210 or a different computer/server system. As shown in FIG. 31, the processor 202 in a computer/server system 220, when executing a geo-block scoring software program 3101 loaded in the main memory 204, provides the geo-block scoring subsystem 2220, including a geo-block identification module 3110, an inventory estimation module 3120, a key performance index (KPI) estimation module 3130, and a store visitation estimation module 3140. Subsystem 2220 may further include a geo-block selection module 3150. Subsystem 2220 makes use of a plurality of databases storing data used and/or generated by the subsystem 2220, including a database 3160 for storing the geo-blocks generated by the subsystem 2210, a database 3170 for storing logged mobile supply data, one or more databases (e.g., database 3180) for storing block level estimation results, including block-level inventory estimation results, KPI estimation results, and store visitation estimation results, and database 3190 for geo-block selections. Any or all of these databases can be located in the storage 210, or in another server/computer 120 and/or NAS 121 in the network 200, which the process 202 can access via the network interface device 208.

Figure 32:
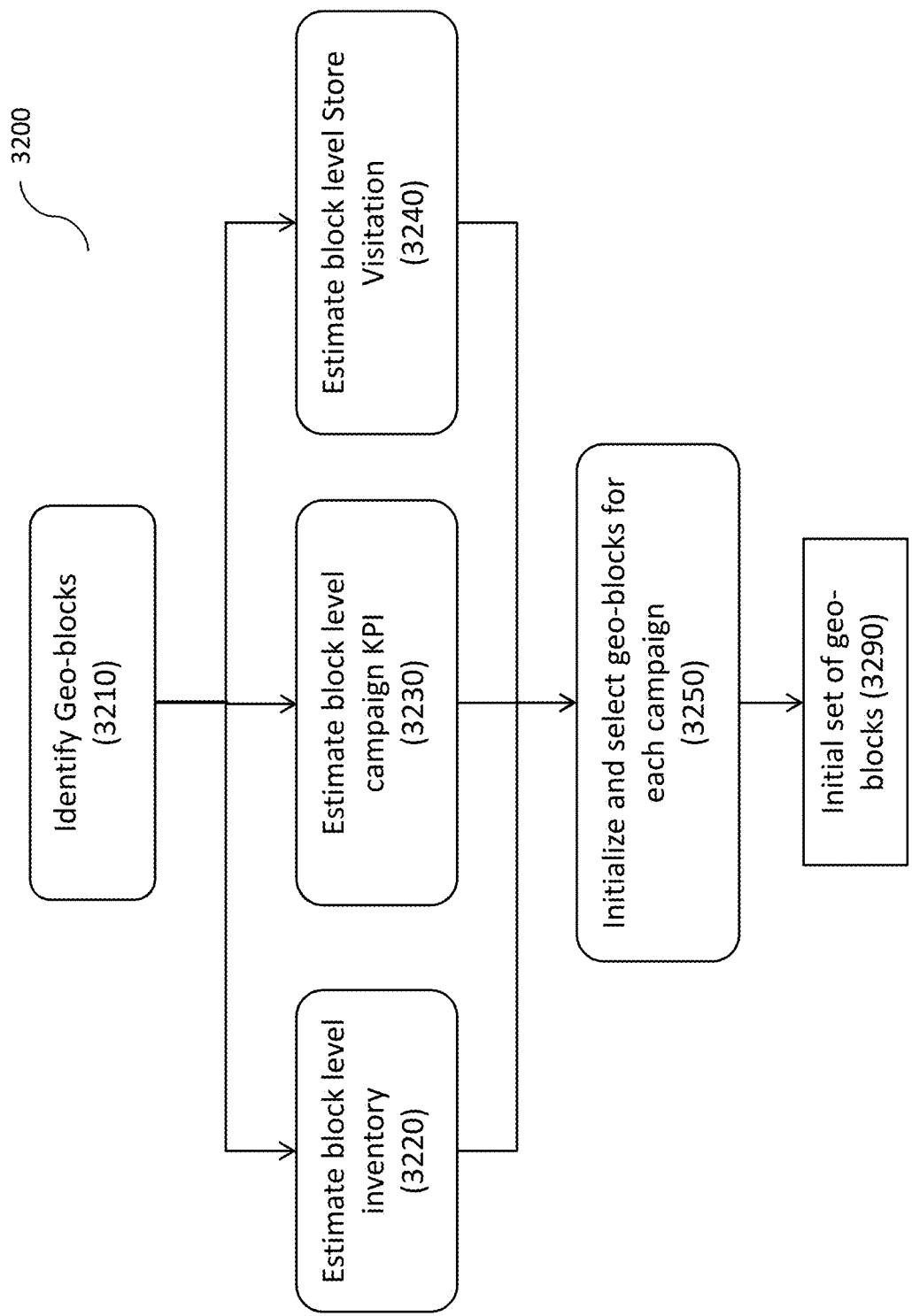
FIG. 32 is a flowchart illustrating a geo-block scoring method performed by the geo-block scoring subsystem according to certain embodiments.
Figure 35:
FIG. 35 is a map overlay diagram illustrating of an exemplary geo-fence including higher-scoring geo-blocks selected from geo-blocks in a targeted geographical area around a point of interest (POI) according to certain embodiments.

FIG. 32 is a flowchart illustrating a geo-block scoring method 3200 performed by the geo-block scoring subsystem 2220 according to certain embodiments. As shown in FIG. 32, the geo-block scoring method 3200 includes identifying 3210 geo-blocks in a targeted region associated with a point of interest (POI), such as a store associated with a brand or a business entity. As shown in FIG. 35, the targeted region can be a circle 3500 drawn around the POI 1501, or an area of arbitrary shape or scale set up by an advertisement campaign for the brand or business. In certain embodiments, the geo-block identification module 3110 identifies the geo-blocks by searching in the geo-block database 3160 for geo-blocks that substantially overlap with the targeted region 3500 associated with the POI 3501 (e.g., at least 50% of the area of each identified geo-block is inside the targeted region associated with the POI).

The method 3200 further includes estimating block-level inventory (3220), in which the inventory estimation module 3120 estimates inventory in each identified geo-block by aggregating request logs along different time frames and along different meta data dimensions. For example, to estimate daily inventory for male users in the 30-40 age group for block_id 1234568, a straight forward method can be to take a daily average of the total number of requests and the total number of unique UIDs seen in the request log that qualifies the meta data requirements and the block_id requirement in the past one week (or month, etc). In some other embodiment, a linear regression model or time series model is used to predict future inventory based on historical log aggregation data applied on different time frames.

The method 3200 further includes estimating block-level campaign KPI (3230), in which KPI estimation module 3130 makes use of the impression (imp) log, click log and SAR log to estimate key performance indices such as click-through rate (CTR), secondary action rate (SAR), etc. for each identified geo-block. The estimation is represented as (BLOCK_ID, CMP_ID, CTR, TF), and (BLOCK_ID, CMP_ID, SAR, TF), where CMP_ID is the campaign_id and TF is the timeframe used to calculate the KPI. In some implementation, because the size of a geo-block is relatively small, and a typical campaign runs only for one or two months, it is difficult to collect enough impression and click data at the block level to reliably calculate KPI. For example, it may sometimes require at least 2000 to 5000 impressions to reliably estimate CTR given that the average CTR stands at about 0.5%, and at least 100 or 200 clicks in order to reliably estimate SAR, with average SAR stands at 5%-7%.

To address this issue, in some embodiment, the KPI estimation is rolled up from campaign to vertical level, and the estimation of CTR and SAR are therefore represented as tuples of (BLOCK_ID, VERTICAL_ID, CTR, TF), and (BLOCK_ID, VERTICAL_ID, SAR, TF). Since vertical is not limited by the life cycle of individual campaigns, the time frame of aggregation could also be extended to up to 6 months to get better numbers for KPI estimation.

In some implementation, the rollup in the time frame dimension is also needed to support better KPI estimation. For a particular block, the KPI can be first estimated using data in the past 3 months. If insufficient amount of data is collected, data in the past 6 months is used. In some embodiments, the time frame could be rolled up to 1 year or beyond. In some embodiments, the rollup in the time frame dimension could be weighted such that more recent data points get higher weight than older data points. If rolling up in the time frame dimension cannot produce enough data to calculate KPI for some geo-blocks, averaging across the global campaign level or the global vertical level can be used to estimate KPI for these geo-blocks.

The method 3200 further includes estimating block-level store visitation (SV) (3240) score, in which the store visitation estimation module 3140 calculates a brand visitation likelihood score (SV score) for each identified geo-block. In cases that brand sales revenue is of interest, this likelihood score can be derived from brand customer visitation behavior and purchase behavior. In one embodiment, this likelihood score is measured by store visitation rate (SVR), which is defined as the percentage of unique UIDs seen in a geo-block (BLOCK_ID) that have visited a brand (BRAND_ID) during a given timeframe (TF). This is calculated by using the SV log in the user behavior model database 2270 and Request log in the location history database 2265 as follows:

(a) find all the UIDs from the Request log whose location is covered by the given block (BLOCK_ID) at least once during the timeframe (TF), count the total unique number of UIDs, which defines the block_unique variable;

(b) find the UIDs from the (a) set who have made at least one (or n, where n>0) store visitation (SV) to the interested brand (BRAND_ID) from the SV log during the timeframe TF, and count the total unique number of UIDs, which defines the block_sv variable;

(c) compute the SVR using the two unique UIDs variables:

$$block\_svr = block\_sv/block\_unique$$

Alternatively, block_sv instead of block_svr is used directly as the SV score on the assumption that the average block size is similar and a higher block_sv directly indicates higher SV likelihood.

In certain embodiments, the SV score is computed as in step (b), but considering only users who visited a brand with some repeated pattern. For example, SV score could be defined as the number of users who visited a brand at least once per week in the given time frame TF.

The method 3200 further includes initializing and/or updating a selection of geo-blocks for each campaign (3250), in which the geo-block selection module 3150 determines an optimized set of initial geo-blocks 3190 for a particular campaign based on the inventory estimation, KPI estimation and store visitation estimation feeds from modules 3120, 3130, and 3140.

Figure 33:
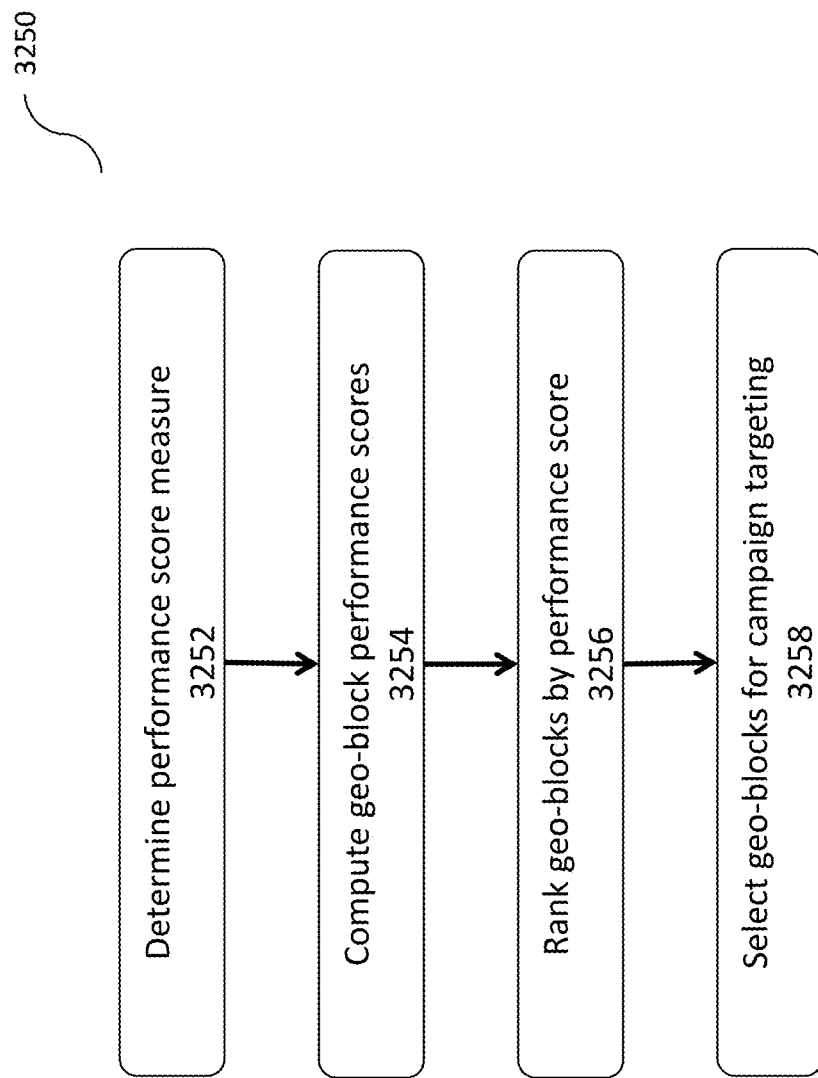
FIG. 33 is a flowchart illustrating an initializing and/or updating process performed by the geo-fence definition module according to certain embodiments

FIG. 33 is a flowchart illustrating an initializing and/or updating process 3250 performed by the geo-block selection module 3150 according to certain embodiments. As shown in FIG. 33, the process 3250 includes determining a performance score measure based on the goal of a campaign (3252). For example, if the goal of a campaign is to maximize user clicking engagement, CTR is used as the performance score. Or, if the focus of the campaign is post-click secondary action, then the product of CTR and SAR, which is typically referred to as yield $$YIELD = CTR*SAR,$$

could be used as the score. Or, if the campaign goal is to reach brand loyalists, SVR (block_svr) and/or SV (block_sv) could be used. In a more general case, the score measure could be represented as a weighted sum of these different parameters:

$$Score = w1*CTR + w2*YIELD + w3*SVR + w4*SV$$

where w1, w2, w3, w4 are tune-able weight factors based on the specific campaign goal. CTR and SAR*CTR are two possible KPI goals for a campaign; and SVR and SV are two possible SV score estimations as described.

In certain embodiments, the block quality score is defined using normalized variables as $$Score = w1*N(CTR) + w2*N(YIELD) + w3*N(SVR) + w4*N(SV)$$

where the normalization function NO can be a Gaussian normalization function, such as $$N(x) = (x-m)/STD$$

with m being the average of x and STD being the standard deviation of the x variable for the targetable geo-blocks (i.e., geo-blocks in the targeted region for the given campaign). In certain embodiments, process 3250 further includes computing geo-block performance score for each identified geo-block in the targeted region for the campaign based on the campaign performance score measure (3254). Note that the targeted region is a variable set by the campaign. The region could be a circular radius around the brand's business location, a number of zip codes, a city, a state or even a nation.

In certain embodiment, the performance score for a geographical region (or geo-block) is dependent on the specific campaign performance goal(s). For example, in some cases, an ad campaign's goal is to drive more people to visit their branded stores. Then the performance score of a geographical region can be defined as the likelihood of a user to visit a branded store after the user has visited this geographical region. In certain embodiment the following procedure can be used to estimate the likelihood and derive a performance score for each geographical region:

(a) estimate the probability or rate, Pa, for brand customers to visit a geographical region, as discussed above and in U.S. patent application Ser. No. 15/289,104, filed Oct. 7, 2016, entitled "Method and Apparatus for Measuring Effect of Information Delivered to Mobile Devices," which is incorporated herein by reference in its entirety;

(b) estimate the probability, Pb, for the general public in a local area (e.g., within 20 miles of a POI) to visit a geographical region; and (c) use the ratio Pa/Pb for each geographical region as an estimation of the likelihood for a person visiting a geographical region to also visit the brand of interest. This estimation can be used by itself or combined with other factors such as KPI scores, for example, using, for example, weighted averages, to obtain the performance score for a geo-block.

Figure 34B:
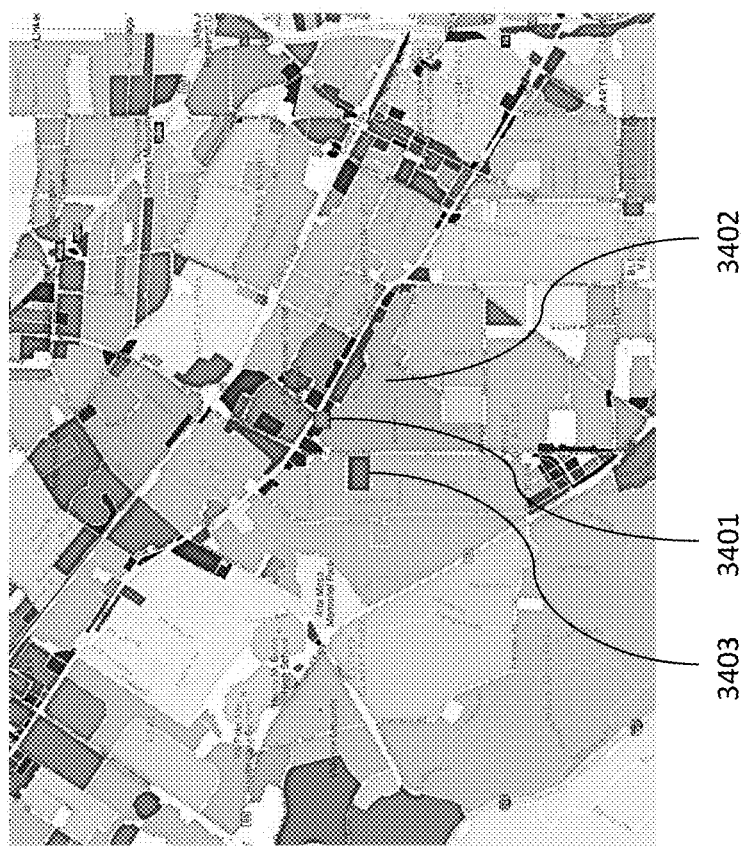
FIGS. 34A and 34B are map overlay diagrams illustrating exemplary geo-blocks with their associated scores derived based on different campaign parameters or performance goals according to certain embodiment.
Figure 34A:
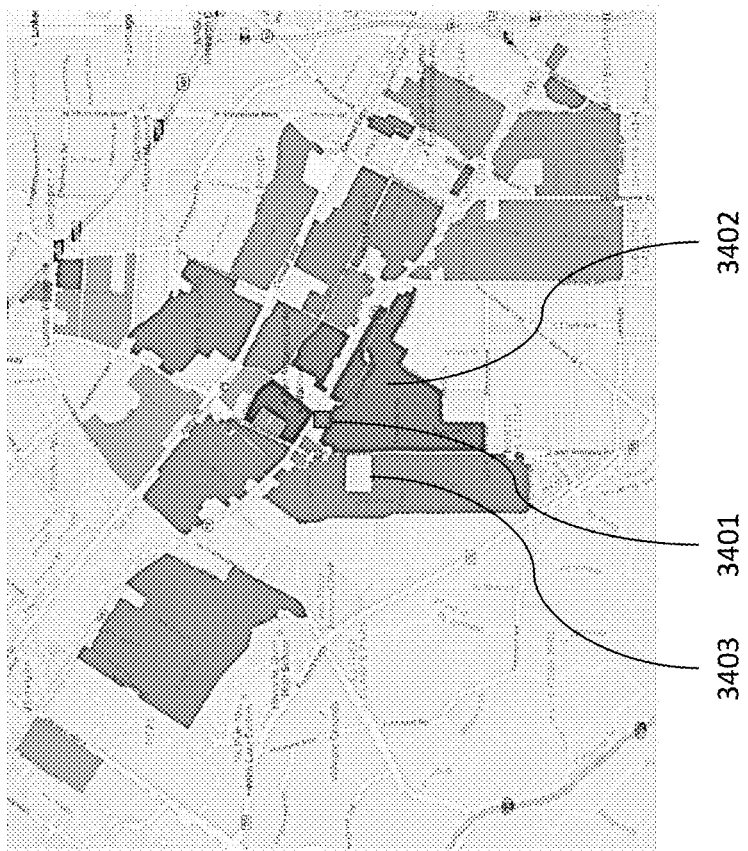

Thus, the geo-blocks can be scored differently for information campaigns with different interests or parameters. For example, FIG. 34A illustrate scores of geo-blocks around a POI 3401 represented by the small square 3401 near the center of the plot for an information campaign, where the darker colored geo-blocks represent geo-blocks with higher performance scores. FIG. 34B illustrate scores of the same geo-blocks around the POI 3401 for a different information campaign, where the darker colored geo-blocks represent geo-blocks with higher performance scores. As shown in these figures, the relative scores of the same geo-blocks around a same POI can be very different for different campaign parameters or goals. For example, geo-block(s) 3402 has a relatively higher score than geo-block 3403 in FIG. 34A but a relatively lower score than geo-block 3403 in FIG. 34B.

In certain embodiments, process 3250 further includes ranking the identified geo-blocks in the targeted region based on their performance scores (3256), and selecting the geo-blocks with the best performance scores to form the targeting areas for the campaign (3258). In certain embodiments, geo-blocks with performance scores above a certain threshold are selected. In certain embodiments, block level inventory estimation can be used to guide the selection process to make sure that enough blocks are included in the targeting areas such that the total inventory is sufficient for the campaign budget purpose. For example, if a Walmart campaign has a daily budget of $5000, then the selected geo-blocks should have a total daily inventory of at least $5000. In many cases, the daily inventory provision should be well above the budget in order to guarantee smooth delivery.

FIG. 35 illustrates an example of geo-blocks selected to form targeting areas for a hyperlocal campaign for a Walmart store in Mountain View, Calif. (POI). The circle 3500 is the targeted region of the campaign, the geo-block 3502 shown in pink near the center of the circle is the block containing the POI 3501 (i.e., the Walmart store), and the geo-blocks in dark gray (i.e., geo-blocks 3503, 3504, 3506, and 3507) are the top performing geo-blocks selected for campaign delivery. The gray geo-blocks 3503, 3504, 3506, and 3507 are selected from among geo-blocks that substantially overlap (e.g., by more than half of their respective area) with the targeted region 3500, and together define a dynamic geo-fence or targeting areas for the POI. Note that geo-block 3503 is selected over other geo-blocks (e.g., geo-blocks 3507, 3508, and 3509) that are actually closer to the POI 3501 than the geo-block 3503 and is thus separated from the POI and one or more other selected geo-blocks by one or more non-selected geo-block. In this example, except geo-block 3505, the other selected geo-blocks are not adjacent to the geo-block 3502 containing the POI. Also, the selected geo-blocks may not even include the geo-block 3502 containing the POI, as illustrated in this example. Thus, the targeting areas formed using the methods in the present disclosure are more attune to optimizing the performance of specific campaigns by selecting targeted regions based on likelihood of success, rather than just proximity to the POI.

In some further implementation, the KPI scores and the SVR and SV scores may be estimated at different times of the day, which means the quality score of each block also evolves by time. This leads to a time-varying dynamic fence design, which may define different fences for the morning hours and for the evening hours.

Figure 36:
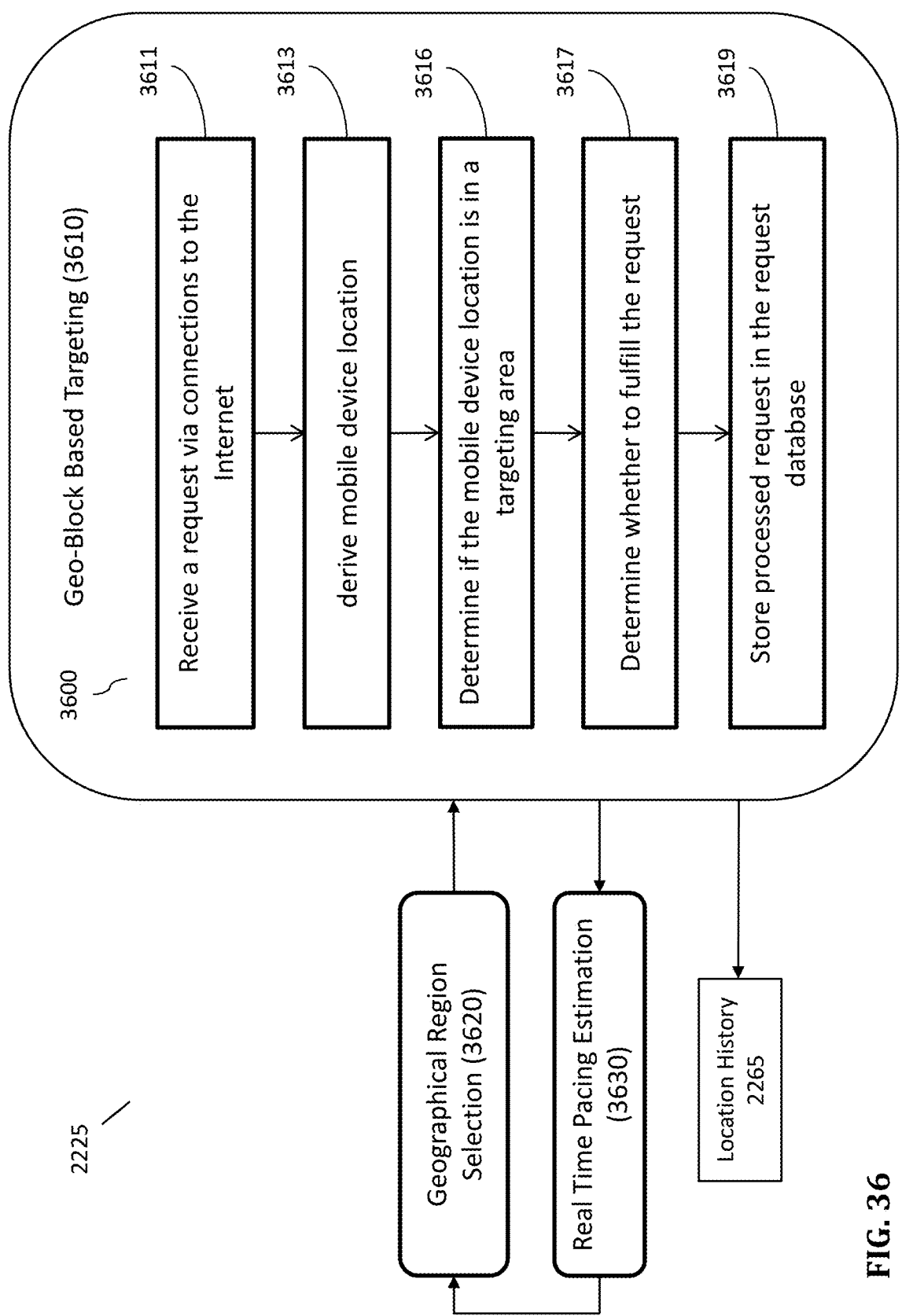
FIG. 36 is a flowchart of a process for geo-block-based targeting according to certain embodiments.

Referring to FIG. 36, according to certain embodiments, the geographical region selection subsystem 2225 includes a geo-block-based targeting module 3610, a real-time pacing estimation module 3630, a geographical region selection module 3640 and a spatial index building module 3650, which are provided by one or more computer/server systems 220 executing one or more software programs. The geo-block-based targeting module 3610 receives and processes information requests presented by an information server, e.g., mobile publishers, ad middleman, and/or ad exchanges, etc. via the network 110. Each information request is related to a mobile device and arrives at the geo-block-based targeting module 3610 in the form of, for example, a data packet including data unites carrying respective information, such as identification of the mobile device (or its user) (UID), maker/model of the mobile device (e.g., iPhone 6S), an operating system running on the mobile device (e.g., iOS 10.0.1), attributes of a user of the mobile device (e.g., age, gender, education, income level, etc.), location of the mobile device (e.g., city, state, zip code, IP address, latitude/longitude or LL, etc.). The request data packet may also include a request time stamp, a request ID, and other data/information.

The geo-block-based targeting module 3610 in certain embodiments performs a method 3600 for processing the request data packet, as illustrated in FIG. 36. The method 3600 comprises receiving an information request via connections to a network such as the Internet (3611), deriving a mobile device location based on the location data in the information request (3613), determining if the mobile device location triggers one or more predefined places or geo-fences (3615), taking steps to fulfill the request if the mobile device location triggers one or more predefined places or geo-fences (3617), and storing information in the processed request in the location history database 2265 for analysis (3619).

In certain embodiments, deriving the mobile device location (3613) comprises processing the location information in the requests using the smart location system and method described in U.S. patent application Ser. No. 14/716,816, filed May 19, 2015, entitled "System and Method for Estimating Mobile Device Locations," which is incorporated herein by reference in its entirety. The derived mobile device location is used to search in the spatial index database 2255 for a geo-fence in which the mobile device related to the request may be located. If the ad request is found to have triggered a geo-fence in the spatial index database 2255, the request is annotated with tags corresponding to the geo-fence. The tags may identify business/brand names, categories of the products or services associated with the business/brand names, and the geo-fence, etc., resulting in an annotated request. The processed requests are stored in a request log in the database 2265.

In certain embodiments, fulfilling the request may include comparing the annotated request with matching criteria of a number of information campaigns stored in the campaign database 2260, taking into consideration other factors such as budget, pacing, etc. In certain embodiment, fulfilling the request may include providing the annotated request to an information server system, which uses real-time bidding (RTB). In typical ad serving systems based on Real Time Bidding (RTB), a qualifying request does not always get fulfilled and thus results in an impression event. For example, an ad campaign may run out of a pacing budget, or the same request qualifies for more than one campaigns, or the geo-block-based targeting module 3610 does not win the bidding, etc.

Pacing is a control logic that determines how an advertiser's budget should be spent relative to time so as to optimize return on investment (ROI) for the advertisers. Without pacing, the information server system would try to fulfill as many matching requests as possible, exhausting the campaign budget in the early stage of the campaign. With pacing, one or more periodic (e.g., hourly, daily, or weekly) delivery goals (budgets) are set, and the information server system 2200 uses a step-by-step methodology to create a plan to pace the fulfillment of matching requests for an information campaign so as to meet its daily and/or hourly delivery goals. Thus, an ad request matching a campaign is only fulfilled when a certain periodic goal has not been reached or a related budget has not been exhausted.

Thus, upon determining that the data units and tags in the annotated requests matches one or more information campaigns, the geo-block-based targeting module 3610 or another information server system decides whether to fulfil the request and which matching ad campaign to select to fulfill the request based on factors such as pacing, historical data about the behavior of the related mobile device (user) stored in the historical data database 2265 etc. The request is fulfilled by attaching a link to a document associated with the selected information campaign to the annotated request, and transmitting the annotated request to the mobile service provider interacting with the mobile device, e.g., mobile publishers, ad middleman, and/or ad exchanges, etc. via the network 110. The geo-block-based targeting module 3610 also monitors feedbacks indicating whether the document associated with the one or more information campaigns has been delivered to (or impressed upon) the related mobile device and provides the feedback to the real-time pacing estimation module 3630. The feedback may also be stored in the impression log in the database 2470.

At the start of an information campaign, an initial set of geographical regions or geo-blocks are provided by the geographical region scoring subsystem 2220. As the campaign proceeds in real-time, the real-time pacing estimation module 3630 periodically estimates a pacing status of the campaign based on the feedback provided by the geo-block-based targeting module 3610. The geographical region selection module 3640 compares the pacing status provided by the real-time pacing estimation module 3630 with a predetermined pacing goal for the campaign, and increases/decreases the number of geographical regions included in the targeting areas accordingly. The real-time pacing estimation module 3630 controls the dynamics of the targeting areas through, for example, the rate at which the geo-fence is updated and the minimum/maximum number of geographical regions that can be included in the geo-fence. Thus, the real-time pacing estimation module 3630 controls the balance between performance and pacing, as well as their minimum/maximum attainable values.

Thus, the information server system 2200 receives and processes information requests related to mobile users and determines whether the mobile users are potential candidates for receiving certain information services. Concurrently, the geographical region selection subsystem 2225 tracks the rate at which information related to a certain information campaign is being served to mobile users (i.e., pacing status) and adjusts the number of geo-blocks included in the targeting areas associated with the information campaign accordingly, so as to reach a balance between performance and pacing.

Figure 37C:
FIGS. 37A-37C are map overlay diagrams of geo-blocks around a point of interest illustrating dynamic inclusion or exclusion of certain geo-blocks based on a pacing status of an information campaign according to certain embodiments.
Figure 37B:
Figure 37A:

FIGS. 37A-37C illustrates this dynamic adjustment process according to certain embodiments. FIGS. 37A-37C are plots of geo-blocks around a point of interest 3701 represented by the small square 3701 near the center of the plots. The darker shaded geo-blocks are those included in the targeting areas associated with an information campaign at a particular time instance. Mobile device users located within these darker shaded areas at that time instance are potential candidates for receiving information service. At an earlier time instance within a first time period, as shown in FIG. 37A, only geo-blocks with performance scores above a first threshold are included in the targeting areas. From FIG. 37A to FIG. 37C, in response to the pacing status indicating that the pacing goal is not being reached, gradually more geo-blocks are included as part of the targeting areas to meet the pacing goal for the information campaign. For example, geo-block 3702 originally not included in the targeting areas as shown in FIG. 37A is now added to the targeting areas. In FIG. 37B, geo-blocks with performance scores above a second threshold lower than the first threshold are included in the targeting areas, and then later in FIG. 37C, when it is determined that more requests are needed to meet the pacing goal, geo-blocks with performance scores above a third threshold lower than the second threshold are included in the targeting areas. For example, geo-block 3703 originally not included in the targeting areas as shown in FIG. 37A or FIG. 37B is now included. Thus, by increasing the number of geo-blocks for an information campaign that is lagging behind its pacing goal(s) or by decreasing the number of geo-blocks for an information campaign that is ahead of its pacing goal(s), the campaign can be optimized to reach a balance between performance and pacing.

The invention claimed is:

1. A method performed by one or more computer systems coupled to a packet-based network, each of the one or more computer systems including at least one processor, the method comprising:
   obtaining, by a processor of the one or more computer systems, geo data related to real-world objects including transportation routes and natural boundaries in a geographical area;
   partitioning, by a processor of the one or more computer systems, the geographical area into geo-blocks using the geo data, each of the geo-blocks bordering one or more real-world objects within the geographical area, at least some of the geo-blocks each bordering on all sides or multiple sides by real-world objects;
   receiving, by a processor of the one or more computer systems, a first plurality of requests from the packet-based network, the first plurality of requests being associated with a first plurality of mobile devices communicating with the packet-based network, a respective request of the first plurality of requests including respective request data identifying an associated mobile device and indicating a location of the associated mobile device, the first plurality of requests including at least a first request and a second request;
   processing, by a processor of the one or more computer systems, the first plurality of requests with respect to at least some of the geo-blocks and with respect to a plurality of geo-fences associated with a plurality of points of interests (POIs) to generate entries in one or more databases, the entries including a first plurality of entries corresponding, respectively, to the first plurality of requests, the first plurality of entries including at least a first entry corresponding to the first request and a second entry corresponding to the second request, the first entry identifying one of the geo-blocks that is triggered by a first location indicated by the first request, the second entry identifying at least one POI of the plurality of POIs, the at least one POI having at least one geo-fence triggered by second location indicated by the second request;
   for each respective geo-block of at least some of the geo-blocks, enriching, by a processor of the one or more computer systems, the respective geo-block with respective block-level meta data, the respective block-level meta data including data extracted from related entries in the one or more databases, the related entries including entries identifying the respective geo-block; and
   storing the geo-blocks with their respective block-level meta data in a geo-block database.

2. The method of claim 1, wherein partitioning the geographical area into geo-blocks using the geo data comprises:
   defining one or more boundaries of a particular geo-block to align with one or more major roads taking into account road widths of the one or more major roads so as to exclude requests associated with mobile users traveling on the one or more major roads from triggering the particular geo-block.

3. The method of claim 2, wherein the data extracted from the related entries in the one or more databases include aggregated request data along one or more time frames.

4. The method of claim 2, wherein the data extracted from the related entries include aggregated request data along one or more meta data dimensions, including one or more of:
   an inventory of mobile supplies in the respective geo-block; and demographic data associated with the respective geo-block.

5. The method of claim 4, wherein the respective block-level meta data further includes:
one or more neighborhood attributes, including a main functionality of a neighborhood associated with the respective geo-block; and
POI data related to one or more POIs in the respective geo-block.

6. The method of claim 4, further comprising merging two or more of the geo-blocks based on their respective block-level meta data, and splitting a geo-block into two or more geo-blocks based on its associated block-level meta data.

7. The method of claim 2, further comprising:
receiving, by a processor of the one or more computer systems, a second plurality of requests from the packet-based network, the second plurality of requests being associated with a second plurality of mobile devices communicating with the packet-based network;
processing, by a processor of the one or more computer systems, the second plurality of requests to generate a second plurality of entries in the one or more databases, the second plurality of entries corresponding, respectively, to the second plurality of requests; and
adjusting the meta data for the respective geo-block based on some of the second plurality of entries.

8. The method of claim 2, further comprising:
determining, by a processor of the one or more computer systems, a performance measure for each specific geo-block of a set of geo-blocks with respect to a group of one or more POIs;
selecting, by a processor of the one or more computer systems, one or more first geo-blocks from the set of geo-blocks, each of the one or more first geo-blocks having a performance measure above a first threshold;
receiving, by a processor of the one or more computer systems, a third request from the packet-based network, the third request being associated with a third mobile device communicating with the packet-based network and indicating a third location of the third mobile device;
determining, by a processor of the one or more computer systems, whether the third location triggers any of the one or more first geo-blocks; and
providing, by a processor of the one or more computer systems, the third request for fulfillment in response at least to the third location triggering one of the one or more first geo-blocks.

9. The method of claim 8, wherein each request of the first plurality of requests is associated with a user identification (UID), and wherein determining the performance measure for the specific geo-block with respect to the group of one or more POIs comprises:
searching the one or more databases for a first number of UIDs, each UID of the first number of UIDs being associated with at least one entry in the one or more databases that identifies the specific geo-block; and
determining a second number of UIDs, each UID of the second number of UIDs being among the first number of UIDs and associated with one or more entries in the one or more databases that identifies one or more POIs in the group of one or more POIs;
wherein the performance measure for the specific geo-block is determined based at least on the first number and the second number.

10. The method of claim 8, wherein determining the performance measure for the specific geo-block with respect to the group of one or more POIs comprises:
searching the one or more databases for a number of entries each identifying the specific geo-block;
wherein the performance measure for the specific geo-block is determined based at least on the number of entries each identifying the specific geo-block.

11. The method of claim 8, wherein the performance measure for the specific geo-block is determined based at least on one or more estimated key performance indices (KPI's) associated with the specific geo-block, wherein the one or more computer systems have access to additional databases storing therein one or more of an impression log, a click log and a secondary action rate (SAR) log, and wherein the KPI's include one or more of a click-through rate and a secondary action rate that are derived from the one or more of the impression log, the click log and the SAR log.

12. The method of claim 8, wherein the one or more first geo-blocks is further selected based at least on block-level meta data for each of the one or more first geo-blocks, wherein the block-level meta data for a particular geo-block include at least some of:
one or more neighborhood attributes, including a main functionality of a neighborhood associated with the particular geo-block;
POI data related to one or more POIs in the particular geo-block;
demographic data associated with the particular geo-block; and
human activity levels in the particular geo-block.

13. The method of claim 8, wherein at least one geo-block among the one or more first geo-blocks is separated from at least another geo-block among the one or more first geo-blocks by one or more other geo-blocks not among the one or more first geo-blocks.

14. The method of claim 8, further comprising:
monitoring, by a processor of the one or more computer systems, a rate at which requests among a fourth plurality of requests are being fulfilled;
in response to the rate indicating that more requests are needed to meet a pacing goal, selecting, by a processor of the one or more computer systems, one or more second geo-blocks from the set of geo-blocks, each of the one or more second geo-blocks having a performance measure above a second threshold below the first threshold;
receiving, by a processor of the one or more computer systems, a fifth request from the packet-based network, the fifth request indicating a fifth location of a fifth mobile device;
determining, by a processor of the one or more computer systems, whether the fifth location triggers any geo-block among the one or more first geo-blocks or the one or more second geo-blocks, and
providing, by a processor of the one or more computer systems, the fifth request for fulfillment in response at least to the fifth location triggering a geo-block among the one or more first geo-blocks or the one or more second geo-blocks.

15. The method of claim 8, further comprising:
monitoring, by a processor of the one or more computer systems, a rate at which requests among a sixth plurality of requests are being fulfilled;
in response to the rate indicating that less requests are needed to meet a pacing goal, selecting, by a processor of the one or more computer systems, a subset of the one or more first geo-blocks, each of the subset of the one or more first geo-blocks having a performance measure above a third threshold higher than the first threshold;

receiving, by a processor of the one or more computer systems, a seventh request from the packet-based network, the seventh request indicating a seventh location of a seventh mobile device;

determining, by a processor of the one or more computer systems, whether the seventh location triggers any geo-block among the subset of the one or more first geo-blocks, and providing, by a processor of the one or more computer systems, the seventh request for fulfillment in response at least to the seventh location triggering a geo-block among the subset of the one or more first geo-blocks.

16. The method of claim 2, wherein the geo-fences include polygon geo-fences corresponding to buildings or parking lots associated with at least some of the POIs.

17. A non-transitory computer readable medium storing therein computer readable instructions which, when executed by one or more processors, cause the one or more processors to carry out a method comprising:

extracting geo data related to real-world objects including transportation routes and natural boundaries in a geographical area;

partitioning the geographical area into geo-blocks using the geo data, each of the geo-blocks bordering one or more real-world objects within the geographical area, at least some of the geo-blocks each bordering on all sides or multiple sides by real-world objects;

enriching each respective geo-block of at least some of the geo-blocks with respective block-level meta data based on information extracted from related entries in one or more databases, wherein:

the one or more databases store therein entries including a first plurality of entries corresponding, respectively, to a first plurality of requests;

the first plurality of requests are associated with a first plurality of mobile devices communicating with a packet-based network, a respective request of the first plurality of requests including respective request data identifying an associated mobile device and indicating a location of the associated mobile device, the first plurality of requests including at least a first request and a second request;

the first plurality of entries including at least a first entry corresponding to the first request and a second entry corresponding to the second request, the first entry identifying one of the geo-blocks that is triggered by a first location indicated by the first request, the second entry identifying at least one POI of a plurality of POIs, the at least one POI having at least one geo-fence triggered by a second location indicated by the second request; and the related entries include entries identifying the respective geo-block.

18. The non-transitory computer readable medium of claim 17, wherein partitioning the geographical area into geo-blocks using the geo data comprises defining one or more boundaries of a particular geo-block to align with one or more major roads taking into account road widths of the one or more major roads so as to exclude requests associated with mobile users traveling on the one or more major roads from triggering the particular geo-block.

19. The non-transitory computer readable medium of claim 18, wherein the information extracted from the related entries include aggregated request data along one or more meta data dimensions, including one or more of:

an inventory of mobile supplies in the respective geo-block; and demographic data associated with the respective geo-block; and wherein the respective block-level meta data further includes:

one or more neighborhood attributes, including a main functionality of a neighborhood associated with the respective geo-block; and POI data related to one or more POIs in the respective geo-block.

20. The non-transitory computer readable medium of claim 19, wherein the method further comprises merging two or more of the geo-blocks based on their respective block-level meta data, and splitting a geo-block into two or more geo-blocks based on its associated block-level meta data.

21. A method performed by one or more computer systems, each of the one or more computer systems including at least one processor, the method comprising:

obtaining, by a processor of the one or more computer systems having access to map data, geo data related to real-world objects including transportation routes and natural boundaries in a geographical area;

partitioning, by a processor of the one or more computer systems, the geographical area into geo-blocks using the geo data, each of the geo-blocks bordering one or more real-world objects or natural boundaries within the geographical area, at least some of the geo-blocks each bordering on all sides or multiple sides by real-world objects including public roads; and enriching, by a processor of the one or more computer systems having access to one or more databases, each respective geo-block of at least some of the geo-blocks with respective block-level meta data, wherein:

the one or more databases store therein entries including a plurality of entries corresponding, respectively, to a plurality of requests;

the plurality of requests are associated with mobile devices communicating with a packet-based network, a respective request of the plurality of requests including respective request data identifying an associated mobile device and indicating a location of the associated mobile device, the plurality of requests including at least a first request and a second request;

the plurality of entries include at least a first entry corresponding to the first request and a second entry corresponding to a second request, the first entry identifying one of the geo-blocks that is triggered by a first location indicated by the first request, the second entry identifying at least one POI of a plurality of POIs, the at least one POI having at least one geo-fence triggered by a second location indicated by the second request; and the respective block-level meta data include data extracted from related entries in the one or more databases, the related entries including entries identifying the respective geo-block.

22. The method of claim 21, wherein partitioning the geographical area into geo-blocks using the geo data comprises:

defining one or more boundaries of a particular geo-block to align with one or more major roads taking into account road widths of the one or more major roads so as to exclude requests associated with mobile users traveling on the one or more major roads from triggering the particular geo-block.

23. The method of claim 21, wherein the respective block-level meta data includes at least some of:
one or more neighborhood attributes, including a main functionality of a neighborhood associated with the respective geo-block;
POI data related to one or more POIs in or near the respective geo-block;
demographic data associated with the respective geo-block; and
human activity levels in the respective geo-block.

24. The method of claim 21, further comprising merging two or more of the geo-blocks based on their respective block-level meta data, and splitting a geo-block into two or more geo-blocks based on its associated block-level meta data.

\* \* \* \* \*